US011217031B2

(12) United States Patent
Lee et al.

(10) Patent No.: US 11,217,031 B2
(45) Date of Patent: Jan. 4, 2022

(54) ELECTRONIC DEVICE FOR PROVIDING SECOND CONTENT FOR FIRST CONTENT DISPLAYED ON DISPLAY ACCORDING TO MOVEMENT OF EXTERNAL OBJECT, AND OPERATING METHOD THEREFOR

(71) Applicant: Samsung Electronics Co., Ltd., Suwon-si (KR)

(72) Inventors: Thae Geol Lee, Suwon-si (KR); Hyun Soo Kwak, Suwon-si (KR); Yeon Hee Rho, Suwon-si (KR); Ki Huk Lee, Suwon-si (KR); Sung Hyo Jeong, Suwon-si (KR); Cheol Ho Cheong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/970,223

(22) PCT Filed: Nov. 5, 2018

(86) PCT No.: PCT/KR2018/013321
§ 371 (c)(1),
(2) Date: Aug. 14, 2020

(87) PCT Pub. No.: WO2019/164092
PCT Pub. Date: Aug. 29, 2019

(65) Prior Publication Data
US 2020/0410769 A1 Dec. 31, 2020

(30) Foreign Application Priority Data
Feb. 23, 2018 (KR) .......................... 10-2018-0022244

(51) Int. Cl.
*G06T 19/00* (2011.01)
*G02B 27/00* (2006.01)
*G06F 3/01* (2006.01)

(52) U.S. Cl.
CPC ........ *G06T 19/006* (2013.01); *G02B 27/0093* (2013.01); *G06F 3/011* (2013.01); *G06T 19/003* (2013.01)

(58) Field of Classification Search
None
See application file for complete search history.

(56) References Cited

U.S. PATENT DOCUMENTS

2012/0113223 A1* 5/2012 Hilliges .................... G06F 3/00
348/46
2012/0177067 A1 7/2012 Cho et al.
(Continued)

FOREIGN PATENT DOCUMENTS

JP 2015-212946 A 11/2015
KR 10-2016-0054840 A 5/2016
(Continued)

OTHER PUBLICATIONS

Winkler et al., "Pervasive information through constant personal projection: the ambient Mobile Pervasive Display (AMP-D)", Toronto, ON, Canada, Apr. 26, 2014.
(Continued)

*Primary Examiner* — Vu Nguyen
(74) *Attorney, Agent, or Firm* — Jefferson IP Law, LLP

(57) ABSTRACT

An electronic device and its operating method according to various embodiments, may be configured to provide first content received from an external electronic device to a user waring the electronic device on his/her face using a display of the electronic device, identify a movement of an external object in a visible direction of the user see-through or using
(Continued)

the display which provides the first content, and provide second content to the user through at least part of the display so as to display the second content related to the first content in relation to the external object according to the movement.

15 Claims, 68 Drawing Sheets

(56) References Cited

U.S. PATENT DOCUMENTS

| | | |
|---|---|---|
| 2014/0062854 A1 | 3/2014 | Cho |
| 2014/0063060 A1 | 3/2014 | Maciocci et al. |
| 2016/0133052 A1 | 5/2016 | Choi et al. |
| 2016/0133230 A1* | 5/2016 | Daniels ................ G06T 19/006 345/633 |
| 2016/0140930 A1 | 5/2016 | Pusch et al. |
| 2017/0206688 A1 | 7/2017 | Chun et al. |
| 2017/0255255 A1 | 9/2017 | Levesque et al. |

FOREIGN PATENT DOCUMENTS

| | | |
|---|---|---|
| KR | 10-2017-0074555 A | 6/2017 |
| KR | 10-2017-0090392 A | 8/2017 |

OTHER PUBLICATIONS

European Search Report dated Mar. 11, 2021, issued in European Application No. 18906928.9.

* cited by examiner (A)

(B)

(A)

(B)

ELECTRONIC DEVICE FOR PROVIDING SECOND CONTENT FOR FIRST CONTENT DISPLAYED ON DISPLAY ACCORDING TO MOVEMENT OF EXTERNAL OBJECT, AND OPERATING METHOD THEREFOR

TECHNICAL FIELD

Various embodiments relate to an electronic device for providing second content for first content displayed on a display according to a movement of an external object and an operating method thereof

BACKGROUND ART

With development of technology, an electronic device provides various services, by performing various functions. Accordingly, the electronic device may provide augmented reality. The augmented reality is a technology which superimposes virtual content on a real environment. That is, a user may view the virtual content superimposed on the real environment through the electronic device.

DISCLOSURE OF INVENTION

Technical Problem

However, such an electronic device does not provide a flexible interface between the electronic device and a user. That is, the electronic device merely provides set content in a set environment, and does not provide appropriate content according to a user's situation. Hence, there are problems that user convenience of the electronic device is low and use efficiency of the electronic device is low.

Solution to Problem

An electronic device according to various embodiments, may include a communication module, a display, at least one sensor module and a processor. According to various embodiments, the processor may be configured to provide first content received from an external electronic device using the communication module to a user using the display, identify a movement of an external object in a visible direction of the user see-through or using the display which provides the first content, using the at least one sensor module, and provide second content to the user through at least part of the display so as to display the second content related to the first content in relation to the external object according to the movement.

An electronic device according to various embodiments, may include a display, at least one sensor module and a processor. According to various embodiments, the processor may be configured to provide first content using the display, identify a movement of an external object in a visible direction of a user see-through or using the display which provides the first content, using the at least one sensor module, and provide second content to the user through at least part of the display so as to display the second content related to the first content according to the movement in relation to the external object.

An electronic device according to various embodiments, may include a display, a camera module, at least one sensor module and a processor. According to various embodiments, the processor may be configured to provide an image acquired through the camera and first content using the communication module to a user using the display, identify a movement of an external object in a direction for acquiring the image through the camera module, using the at least one sensor module, and provide second content to the user through at least part of the display so as to display the second content related to the first content in relation to the external object according to the movement.

An operating method of an electronic device according to various embodiments, may include providing first content using a display of the electronic device, identifying a movement of an external object in a visible direction of a user see-through or using the display which provides the first content, using at least one sensor module, and providing second content to the user through at least part of the display so as to display the second content related to the first content according to the movement in relation to the external object.

Advantageous Effects of Invention

According to various embodiments, if an electronic device provides augmented reality for a user, a flexible interface may be provided between the electronic device and the user. That is, the electronic device may provide content received from an external electronic device. In addition, the electronic device may flexibly provide the content, based on a movement of an external object. Thus, the electronic device may provide appropriate content according to a user's situation. Hence, user convenience of the electronic device may be improved, and use efficiency of the electronic device may be improved.

BEST MODE FOR CARRYING OUT THE INVENTION

Hereinafter, various embodiments of the present document will be described with reference to the accompanying drawings.

Figure 1:
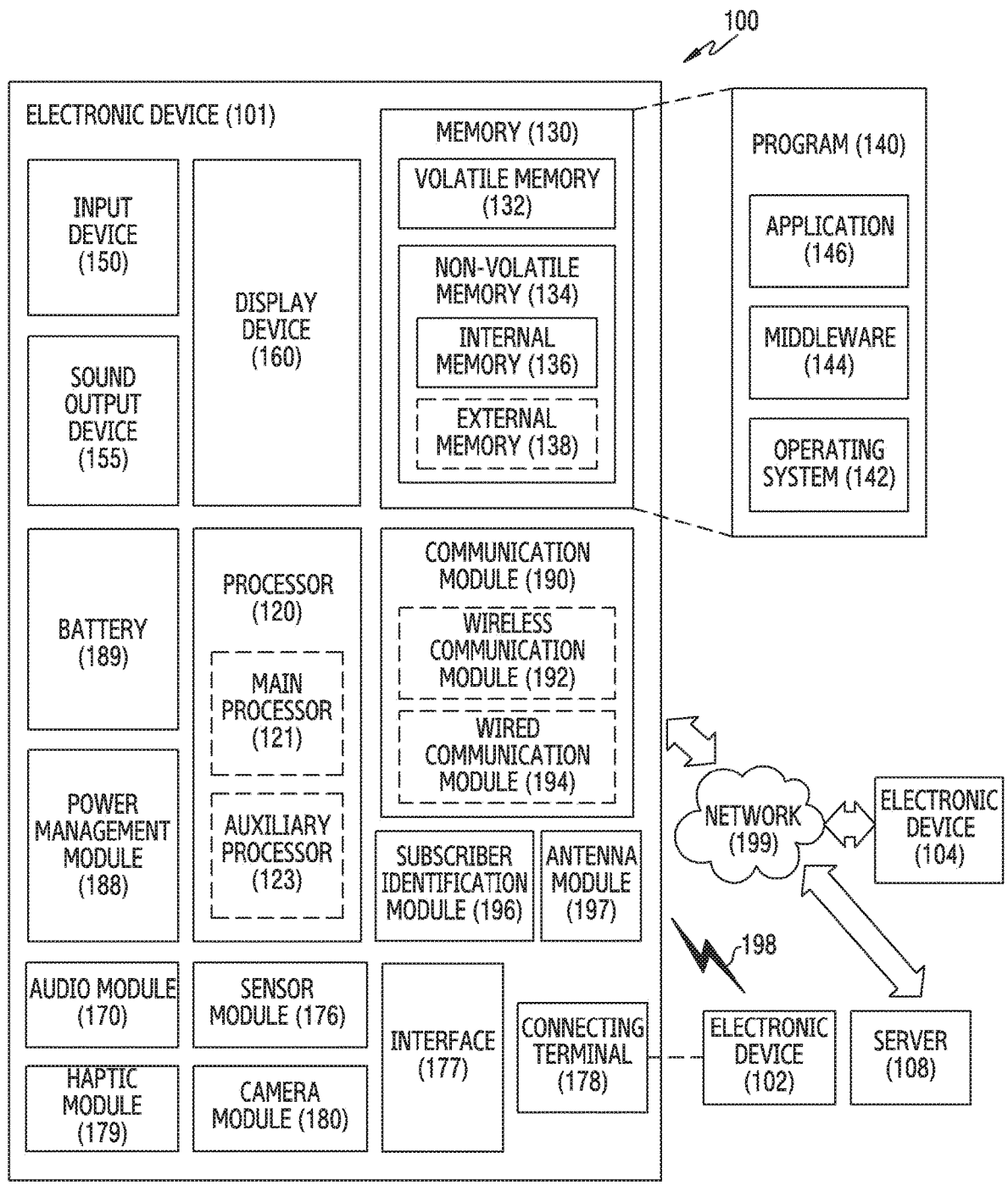
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
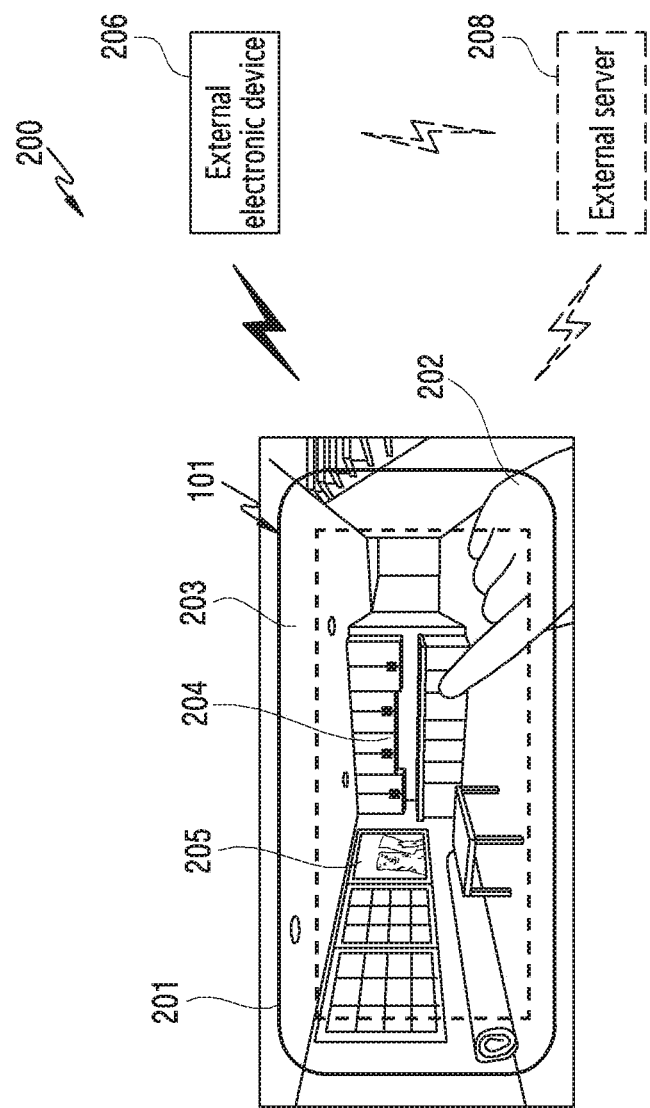
FIG. 2 is a block diagram of a system including an electronic device according to various embodiments.
Figure 3A:
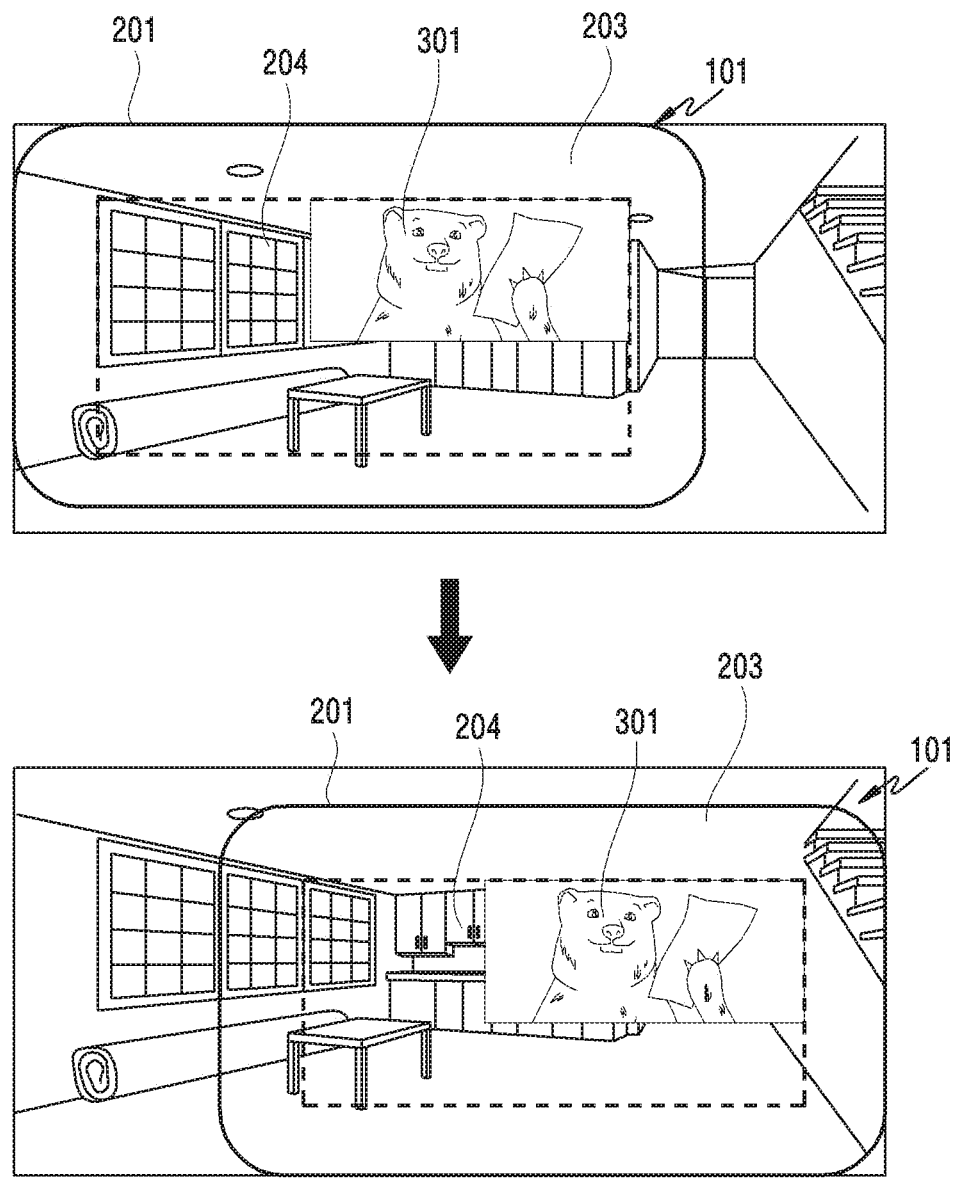
FIG. 3A, FIG. 3B and FIG. 3C are exemplary diagrams for explaining examples in which an electronic device selects a candidate area.
Figure 3B:
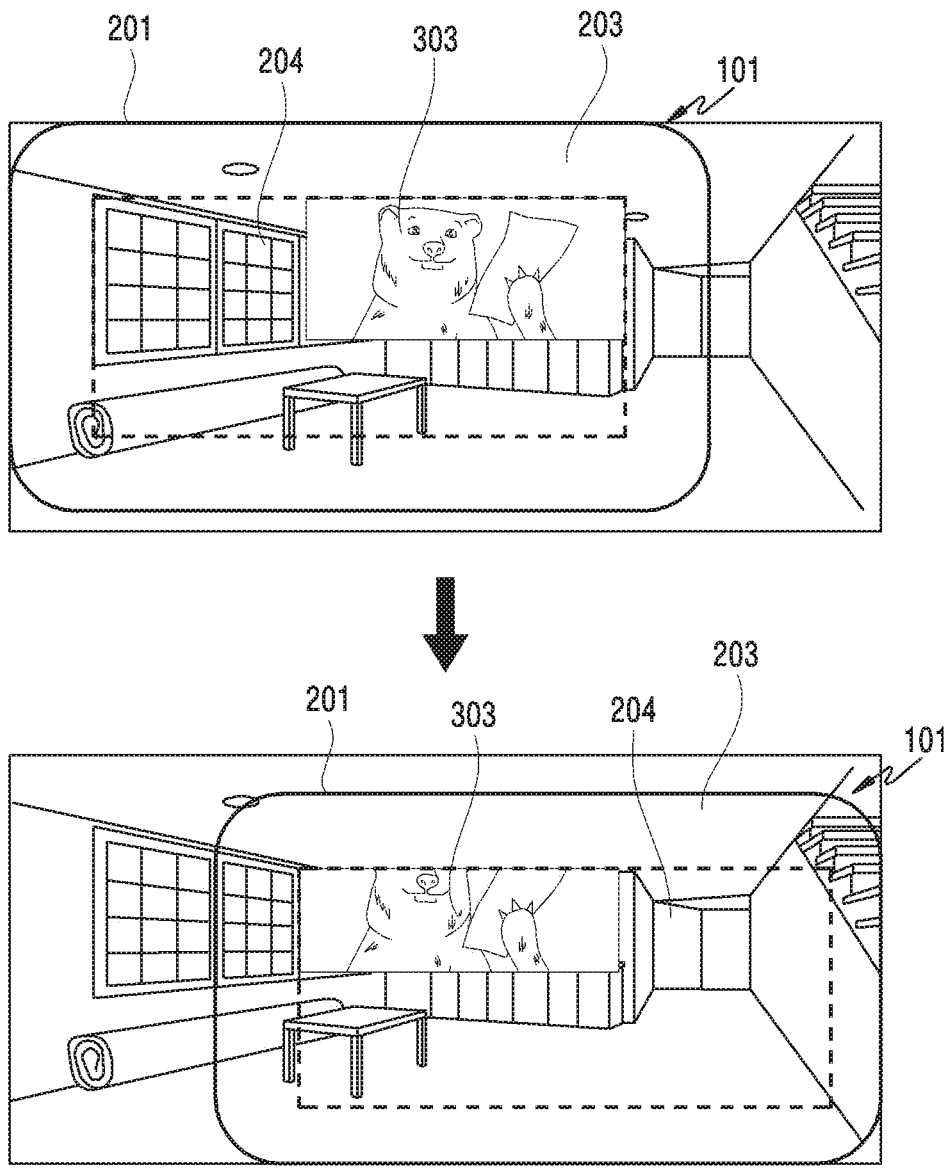
Figure 3C:
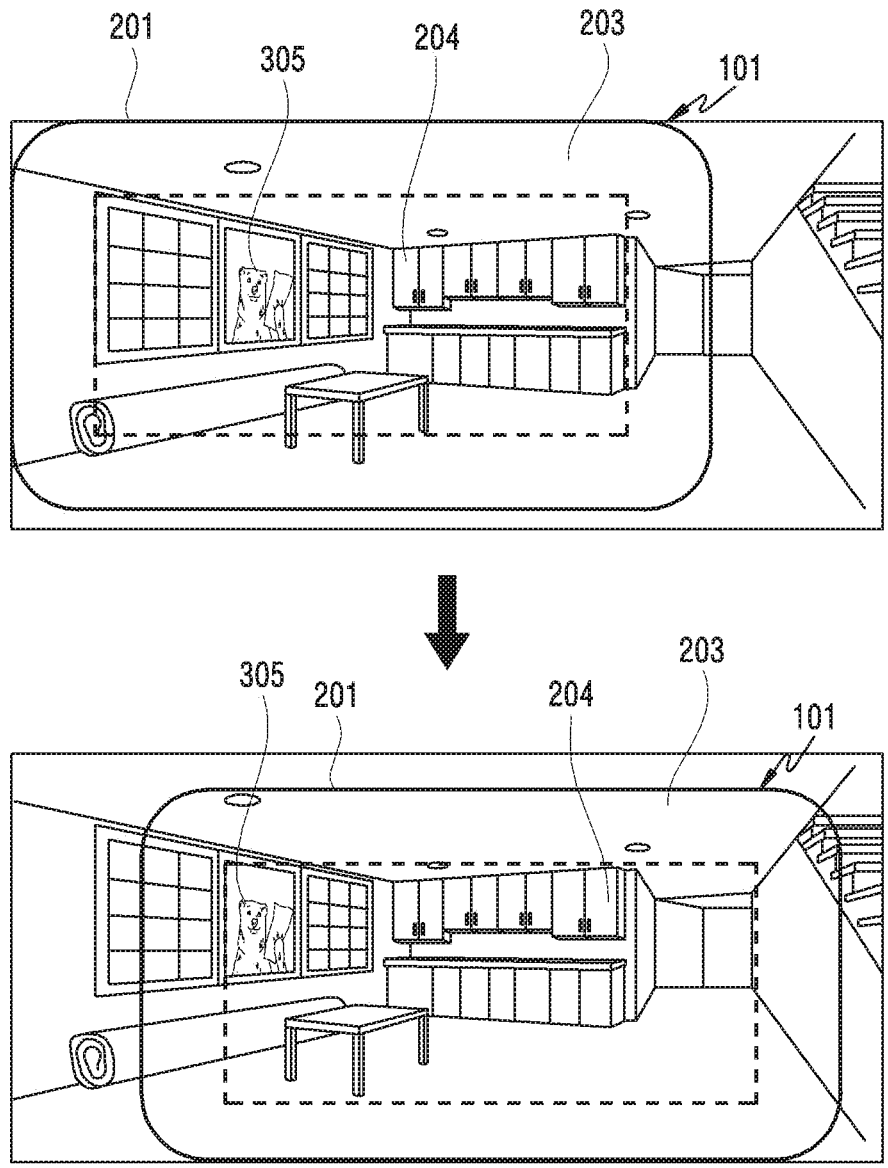
Figure 4A:
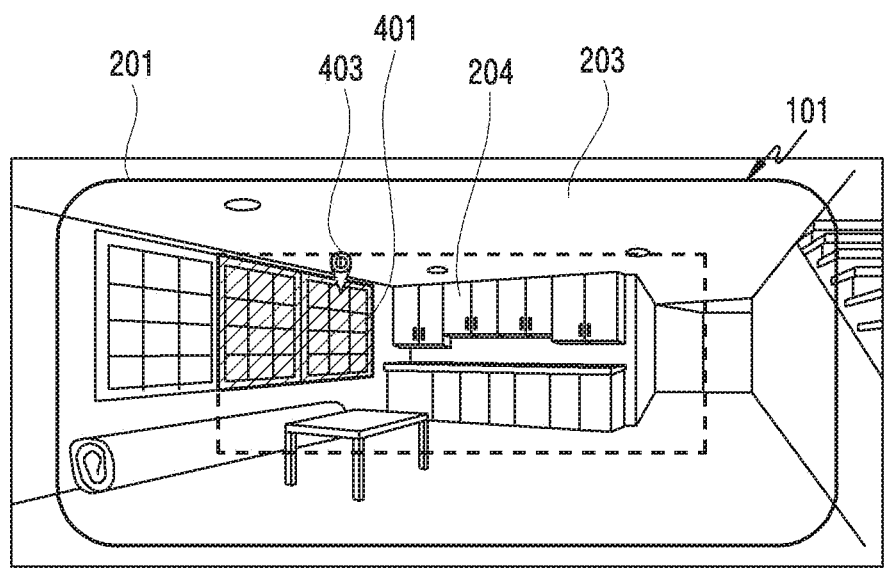
FIG. 4A and FIG. 4B are exemplary diagrams for explaining examples in which an electronic device displays a candidate area.
Figure 4B:
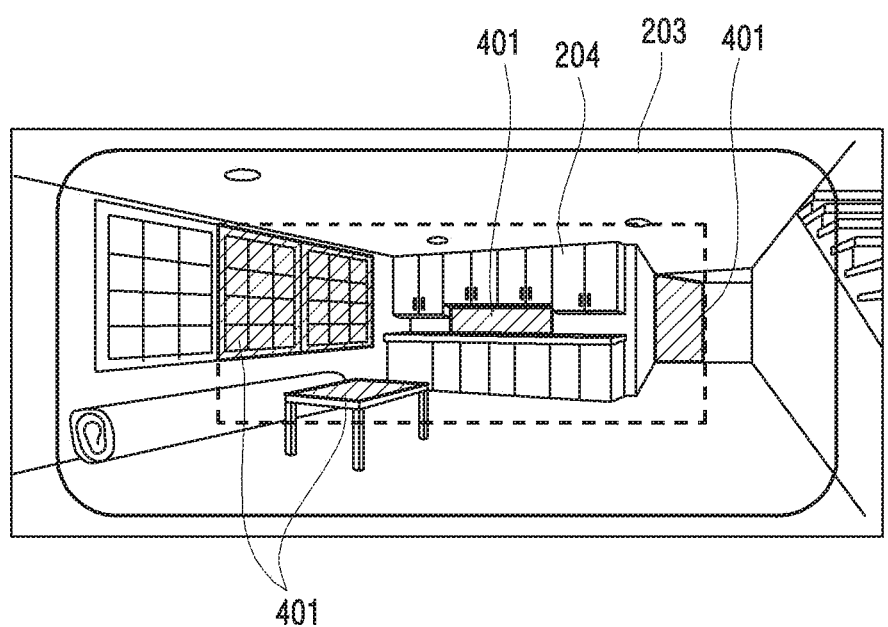
Figure 5A:
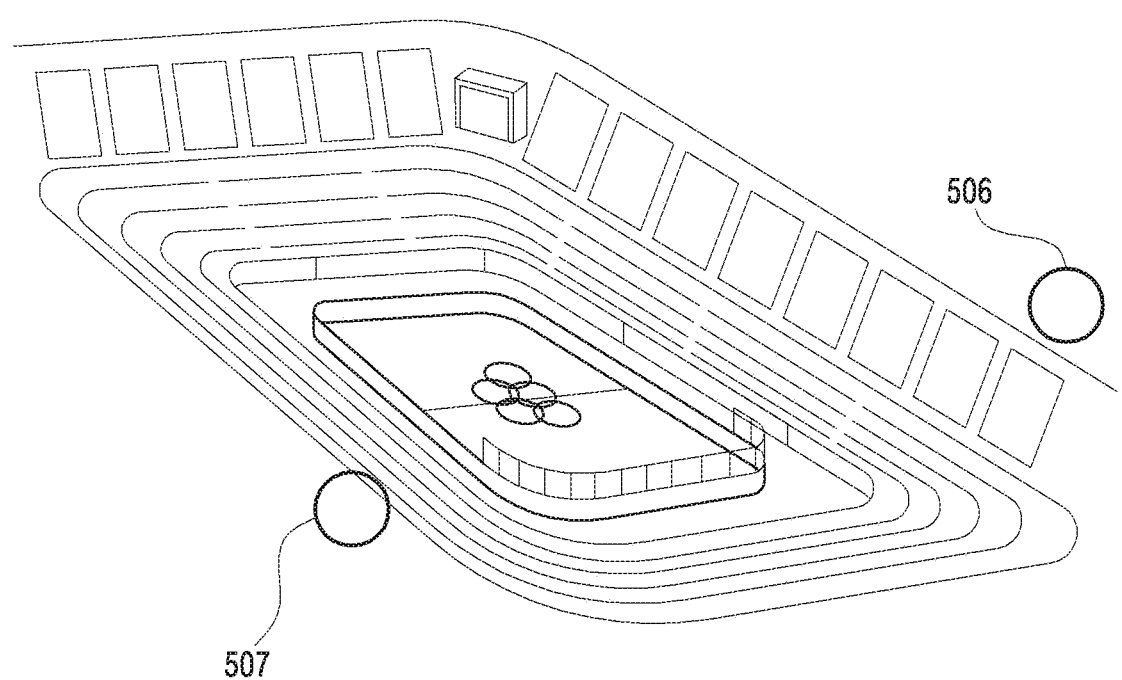
FIG. 5A, FIG. 5B and FIG. 5C are exemplary diagrams for explaining examples in which an electronic device displays content in a candidate area.
Figure 5B:
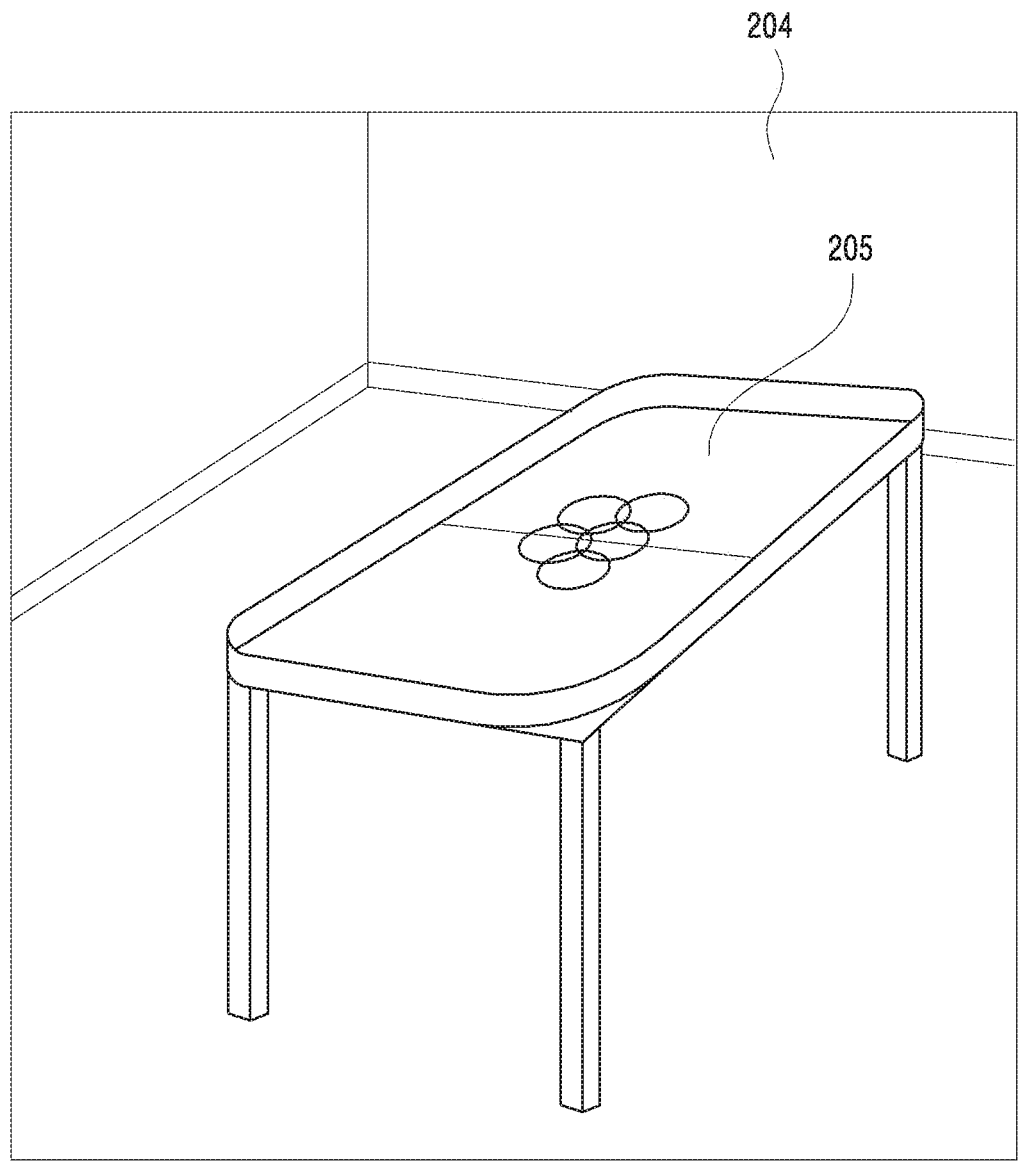
Figure 5C:
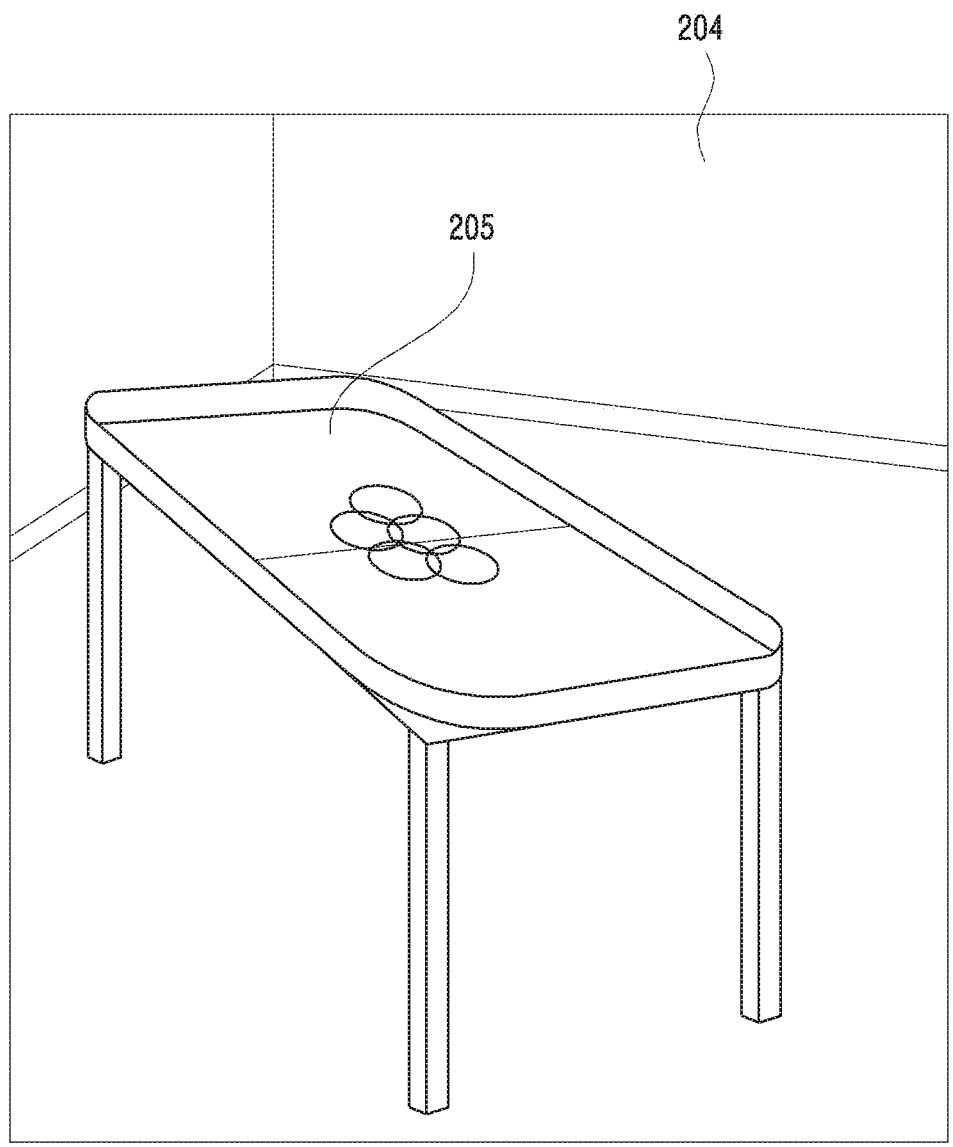

FIG. 2 is a block diagram of a system 200 including an electronic device 101 according to various embodiments. FIG. 3A, FIG. 3B and FIG. 3C are exemplary diagrams for explaining examples in which an electronic device 101 selects a candidate area 205. FIG. 4A and FIG. 4B are exemplary diagrams for explaining examples in which an electronic device 101 displays a candidate area 205. FIG. 5A, FIG. 5B and FIG. 5C are exemplary diagrams for explaining examples in which an electronic device 101 displays content in a candidate area 205.

Referring to FIG. 2, the system 200 may include an electronic device 101, and at least one of an external electronic device 206 (e.g., the electronic devices 102 and 104) or an external server 208 (e.g., the external server 108).

The electronic device 101 may provide augmented reality (AR) for the user. The electronic device 101 may be put on a user's face. For example, the electronic device 101 may be a head mount display (HMD) device or an AR glass. The electronic device 101 may include a (translucent) display 201 (e.g., the display device 160). The display 201 may be disposed in front of user's eyes wearing the electronic device 101. The display 201 may be different in its displaying method depending on the type of the electronic device 101. According to an embodiment, if the electronic device 101 is an optical see-through, at least part of the display 201 is formed of a transparent or translucent material, and the user wearing the electronic device 101 may view a real environment through the display 201 along a user's gaze. According to another embodiment, if the electronic device 101 is a video see-through, as an image of the real environment received through at least one of the camera module 180 or at least one sensor module 176 (e.g., a color sensor) is displayed on the display 201, the user may view the real environment through the display 201. According to various embodiments, a movement of the external object 202 may indicate at least one of a locational movement of the external object 202 or a shape change of the external object 202 (e.g., rotation of a hand or folding of a finger, etc.).

Thus, the user of the electronic device 101 may view the movement of the external object 202 through the display 201. For example, the external object 202 may include at least one of a user's body part or an object such as a remote controller. The electronic device 101 includes a plurality of displays 201, and the user may view an external real environment or the external object 202 through each display 201. For example, two displays 201 may correspond to the user's left and right eyes respectively and thus provide a stereo image.

The electronic device 101 may provide content through at least part of the display 201. The electronic device 101 may provide the content to the user, to superimpose the virtual content on the real environment through the display 201. For example, the electronic device 101 may overlay the content on the real environment transmitted through the display 201. As another example, the electronic device 101 may synthesize a content image and a real environment image, or may mix content light and real environment light. Hence, the user wearing the electronic device 101 may view the content, based on the real environment through the display 201. The content may include at least one of, for example, moving image data, still image data, text data or audio data (e.g., provide through the sound output device 155 rather than the display 201). For example, if moving image data or still image data is displayed on the display 201, audio data associated with the moving image data or the still image data may be reproduced through the sound output device 155. While the electronic device 101 displays the content on at least part of the display 201, the user wearing the electronic device 101 may view the movement of the external object 202 through the display 201. For doing so, the display 201 may be divided into a plurality of areas. For example, the display 201 may include a first area 203 and a second area 204. For example, the first area 203 may indicate the entire area of the display 201, and the second area 204 may indicate a partial area of the first area 203. As another example, the first area 203 and the second area 204 may be the same.

According to an embodiment, if the electronic device 101 is the optical see-through, the first area 203 of the display 201 may include a transparent or translucent material. Hence, the electronic device 101 may allow light incoming from the opposite side of the user wearing the electronic device 101 to pass through, and transmit it to the eyes of the user wearing the electronic device 101. Thus, the user wearing the electronic device 101 may view the real environment through the first area 203. In addition, the user wearing the electronic device 101 may see the movement of the external object 202 through the first area 203.

The second area 204 may refract or reflect light of the content (e.g., the virtual content of the AR) generated on the display 201, and thus transmit it to the eyes of the user wearing the electronic device 101. For example, the display 201 includes a small beam projector for outputting the light of the content, and may display the light of the content outputted from the small beam projector in the second area 204 and thus transmit it to the user's eyes. For doing so, the display 201 may further include at least one of a reflective mirror, a prism, a lens, a reflective coating, a polarizing material or a transparent AMOLED corresponding to the second area 204. To implement the electronic device 101 as the optical see-through, at least one of a half-reflection curved mirror, a light guide or a wave guide scheme may be applied. As the wave guide scheme, at least one of diffraction, holographic, polarization or reflection may be applied.

Thus, the user wearing the electronic device 101 may view the content through at least part of the second area 204. Accordingly, the user wearing the electronic device 101 may view the content, on a background of the real environment through the display 201.

According to another embodiment, if the electronic device 101 is the video see-through, the first area 203 of the display 201 may display an image received through the camera module 180 or the sensor module 179 included in the electronic device 101. The camera module 180 may be disposed in the electronic device 101, to receive an image corresponding to a facing direction of the user's head or a facing direction of the gaze. To acquire a stereo image, the electronic device 101 may include a plurality of camera modules 180, and the sensor module 176 may include a depth sensor to determine a distance between the electronic device 101 and the object. For example, the second area 204 of the display 201 is included in the first area 203, and may be an area for displaying the content. As another example, the second area 204 of the display 201 is included in the first area 203, and may be an area for corresponding to a user input (e.g., at least one of the locational movement or the shape change of the external object 202). That is, if the locational movement or the shape change of the external object 202 occurs in response to the second area 204, the electronic device 101 may recognize and process it as a user input. Hence, the user of the electronic device 101 may view the content through at least part of the second area 204. Accordingly, the user of the electronic device 101 may view the content, on the background of the real environment through the display 201.

According to various embodiments, the electronic device 101 may set at least part of the display 201 as at least one display area 205, and display content in the display area 205. The electronic device 101 may overlay the content in the display area 205 or synthesize and display an image corresponding to the display area 205 with the content. For doing so, the electronic device 101 may apply geometric and optical distortion to the content, based on at least one of a distance from the electronic device 101 to the object (e.g., a wall, a window, an electronic product, a floor, a ceiling, a person) corresponding to the display area 205, relatively positions between the electronic device 101 and the object, a shape of the display area 205, a size of the display area 205, an ambient illumination, a color in the display area 205 or a texture in the display area 205. For doing so, the processor 120 of the electronic device 101 may receive and analyze one or more of the image, the distance between the electronic device 101 and the object or the illuminance using at least one of the camera module 180 or the sensor module 176.

According to an embodiment, the electronic device 101 may set at least part of the second area 204 on the display 201 as at least one candidate area, based on a user input. The electronic device 101 may detect a user input received through the input device 150. Alternatively, the electronic device 101 may detect a user input from the movement of the external object 202 identified using the sensor module 176. Thus, the electronic device 101 may determine at least part of the second area 204 on the display 201 as a candidate area, and store information related to the candidate area. Hence, the electronic device 101 may determine any one of the candidate areas as the display area 205, and display content in the display area 205.

For example, the electronic device 101 may store the information related to the candidate area at a set position of the display 201. Thus, the electronic device 101 may, as shown in FIG. 3A, determine the candidate area at the set position location on the display 201 as a display area 301 (e.g., the display area 205) regardless of the movement of the electronic device 101, and display content in the display areas 205 and 301. This displaying scheme may be referred to as a non-projection scheme, wherein the content is not projected to a virtual space or an object of a real image, and may be displayed at the set position of the display 201 regardless of the movement of the electronic device 101.

As another example, the electronic device 101 may store the information related to the candidate area at a set location of the virtual space associated with the real environment using location information and motion information of the electronic device 101. For doing so, the electronic device 101 may identify the location information (e.g., WiFi fingerprint, cell of origin, global positioning system (GPS) information) through at least one of the communication module 190 or the positioning module (not shown), and identify the motion information using the camera module 180 or a motion sensor (e.g., at least one of an acceleration sensor, a gyro sensor, a geomagnetic sensor, or an inertial measurement unit (IMU) or a distance measurement sensor) of the sensor module 176. Thus, the electronic device 101 may, as shown in FIG. 3B, determine the candidate area of the set location in the real environment as a display area 303 (e.g., the display area 205) according to the movement of the electronic device 101, and display content in the display area 205 and 303. According to various embodiments, the electronic device 101 may identify the motion information using the camera module 180 or the sensor module 176 included in an external device (e.g., the external electronic device 102 and 104). For example, it may generate a virtual 3D space such as an indoor 3D map corresponding to the real environment using the location information and the motion information of the electronic device 101, set orientation information (e.g., three-dimensional location information such as location and azimuth) corresponding to the display area 205 and 303 in the virtual 3D space, and display at least part of the content in an overlapping area of the second area 204 and the display area 205 and 303 of the display 201. This displaying scheme may be referred to as a virtual 3D space mapping scheme. As another example, the electronic device 101 may store the information related to the candidate area at a set position of an image acquired through the camera module 180 or the sensor module 176 at a user input. For doing so, the electronic device 101 may determine feature points or a feature pattern corresponding to the candidate area in the image acquired through the camera module 180 or the sensor module 176, and store the feature points or the feature pattern as the information related to the candidate area. Hence, as shown in FIG. 3C, the electronic device 101 may determine the candidate area corresponding to the feature points or the feature pattern identified in the image acquired through the camera module 180 or the sensor module 176 of the electronic device 101 as a display area 305 (e.g., the display area 205), and display content in the display area 205 and 303. This displaying scheme may be referred to as a real image mapping scheme. For example, the electronic device 101 may identify the feature points or the feature pattern or determine similarity in the image acquired through the camera module 180 or the sensor module 176 in a template matching or dynamic matching scheme. For example, it may identify a shape or a pattern of a specific object (e.g., a door, a window, a TV, a refrigerator, a plane of a wall or a table) and thus identify the candidate area from it.

According to another embodiment, the electronic device 101 may determine at least one display area 205, based on a preset criterion. Based on the preset criterion, the electronic device 101 may set a candidate area corresponding to the shape of at least one of a plurality of objects in the image acquired through the camera module 180 or the sensor module 176 as the display area 205. The preset criterion may include, for example, at least one of the shape (e.g., square, circle, and triangle), a ratio of a height and a width (e.g., 16:9) or the distance between the electronic device 101 and the object. As an example, with respect to the rectangular display area 205, the electronic device 101 may display the content, based on a transform parameter indicating a distorted degree from a preset basic form, for example, at least one of perspective, scaling, rotation or affine.

For example, the electronic device 101 may designate priorities among a plurality of candidate areas according to a degree of meeting the set criterion. The electronic device 101 may calculate goodness of fit of at least one of attributes of the content to display in each candidate area, for example, a type, a ratio, or a resolution of the content and at least one of attributes of each candidate area, for example, a shape, a color, a complexity, reflected light or size of the object, and designate the priority to each candidate area based on it. For example, if the resolution of the content to display is greater than or equal to a preset value, the electronic device 101 may designate a high priority to a candidate area having the size corresponding to at least the resolution of the content, so as to represent the content according to at least one of the complexity of the content, for example, the type of the pattern, the number of line segments, the number of figures or the number of colors. As another example, if the ratio of the height and the width of the content to display is 4:3, the electronic device 101 may designate a high priority to the rectangular candidate area having the ratio of the height and the width close to 4:3. Thus, the electronic device 101 may determine any one of the candidate areas as the display area 205 based on the priority.

According to another embodiment, the electronic device 101 may determine at least one display area 205, based on a marker recognized through the sensor module 176 or the camera module 180. The marker may include, for example, at least one of a barcode, a two-dimensional barcode, a specific character image or a color block. For example, the marker may be displayed on or attached to the object such as a wall, an electronic picture frame, a TV screen or a table. By recognizing the marker, The electronic device 101 may determine at least one of a size, a direction, a position of the display area 205, or a type of the content to display in the display area 205, based at least on an attribute associated with the marker. For example, if the marker is a quick response (QR) code which is a kind of the two-dimensional barcode, the electronic device 101 may recognize a location size or a data pattern of types of patterns constituting the QR code, and thus determine the size, the direction and the position of the display area 205. As another example, if the specific character image is displayed on the TV screen, the electronic device 101 may determine the TV screen as the display area 205, based on the position of the specific character image. Hence, the electronic device 101 may determine the display area 205 based on the marker, and display the content in the display area 205.

According to another embodiment, if the electronic device 101 is configured to allow a plurality of users to access, the electronic device 101 may process and display content differently for each user in the display area 205. To this end, the electronic device 101 may differently set at least one of information related to the candidate area, the type of the content to display, the attribute of the candidate area or an immersive degree per user, as shown in Table 1 as below. The electronic device 101 may identify the user of the electronic device 101 or display the content according to a unique identifier (e.g., a phone number, a network ID, an application user ID) prestored in the electronic device 101. For example, if displaying moving images corresponding to a movie in the display area 205 while a window is transmitted/projected/displayed in the display area 205, the electronic device 101 may apply a low immersive degree. The electronic device 101 may lower transmittance/projection/transparency of the candidate area 205 or increase opacity of the moving images on the display 201, not to show muntins of the window through the moving images. As another example, if displaying a still image corresponding to a landscape image in the candidate area 205 while the window is transmitted/projected/displayed in the candidate area 205, the electronic device 101 may apply a high immersive level. The electronic device 101 may increase the transmittance of the candidate area 205 or to synthesize the two images, to place the muntins of the window on the landscape image.

TABLE 1

| A candidate area | A user | A type of a content | An attribute of a candidate area | An immersive degree |
|---|---|---|---|---|
| 1 | A | Map/Album | Semi transparent | HIGH |
| 2 | B | A recipe | Indirect lighting/ Rough surface | MIDDLE |
| 3 | C | A movie | Dark lights | LOW |
|   | D | A landscape image | A window | HIGH |
| 4 | A | A music | Inside | LOW |

According to various embodiments, the electronic device 101 may display an identifier 401 for at least one candidate area in the second area 204 as shown in FIG. 4A or FIG. 4B. The identifier 401 may include, for example, at least one of a border, a figure or a thumbnail image of the candidate area. If the content to display at the electronic device 101 is determined, the electronic device 101 may determine at least one candidate area based on the content, and display the identifier 401 in each candidate area.

For example, in response to the candidate area as shown in FIG. 4A, the electronic device 101 may display at least one indicator 403 indicating the type of the content to be displayed. The indicator 403 may include, for example, at least one of an icon, a text or a thumbnail image associated with the content. While displaying the identifier 401 and the indicator 403 in the candidate area, the electronic device 101 may determine the selected candidate area as the display area 205, based on a user input for selecting the candidate area, and display the content in the display area 205.

As another example, the electronic device 101 may display identifiers 401 for a plurality of candidate areas as shown in FIG. 4B. While displaying the identifiers 401 in the candidate areas, the electronic device 101 may display the indicator 403 in the selected candidate area, based on a user input for selecting any one of the candidate areas. While displaying the identifier 401 and the indicator 403 in the selected candidate area, based on a user input for reselecting the selected candidate area, the electronic device 101 may determine the reselected candidate area to the display area 205, and display the content in the display area 205.

According to various embodiments, the electronic device 101 may display content stored in the memory 130. The electronic device 101 may determine the content stored in the memory 130, based on a user input. Hence, the electronic device 101 may display the content on the display 201. The content may include, for example, at least one of moving image data, still image data, text data or audio data (e.g., provide through the sound output device 155 rather than the display 201). The electronic device 101 may identify the movement of the external object 202 using the at least one sensor module 176, while displaying the content on the display 201.

According to various embodiments, the electronic device 101 may display content received from at least one of the external electronic device 206 or the external server 208. For example, the electronic device 101 may receive the content from the external electronic device 206. As another example, the electronic device 101 may receive the content from either the external electronic device 206 or the external server 208, in cooperation with the external electronic device 206 and the external server 208. The external electronic device 206 may include, for example, at least one of a portable communication device (e.g., a smart phone), a computer device, a portable multimedia device, a portable medical device, a camera, a wearable device (e.g., an AR glass, a digital globe) or a home appliance. According to an embodiment, the electronic device 101 may display the content on the display 201, and identify the movement of the external object 202 using at least one sensor module 176. According to another embodiment, the electronic device 101 may further receive information related to the movement of the external object 202 from at least one of the external electronic device 206 or the external server 208.

For example, with respect to the same object as shown in FIG. 5A, the electronic device 101 may receive first image data captured by a first external electronic device 506 (e.g., the external electronic device 206) and second image data captured by a second external electronic device 507 (e.g., the external electronic device 206). The first external electronic device 506 may capture the first image data at a first viewpoint based on the object, and the second external electronic device 507 may capture the second image data at a second viewpoint based on the object. If the electronic device 101 determines the display area 205 at the first viewpoint, the electronic device 101 may display the first image data received from the first external electronic device 506 in the display area 205 as shown in FIG. 5B. Alternatively, if the electronic device 101 determines the display area 205 at the second viewpoint, the electronic device 101 may display the second image data received from the second external electronic device 507 in the display area 205 as shown in FIG. 5C. Alternatively, if the electronic device 101 moves from the first viewpoint to the second viewpoint, the electronic device 101 may switch displaying the first image data received from the first external electronic device 506 to displaying the second image data received from the second external electronic device 507 in the display area 205 as shown in FIG. 5B. For doing so, the electronic device 101 may receive orientation information together with the first image data and the second image data from the first external electronic device 506 and the second external electronic device 507 respectively.

Figure 6:
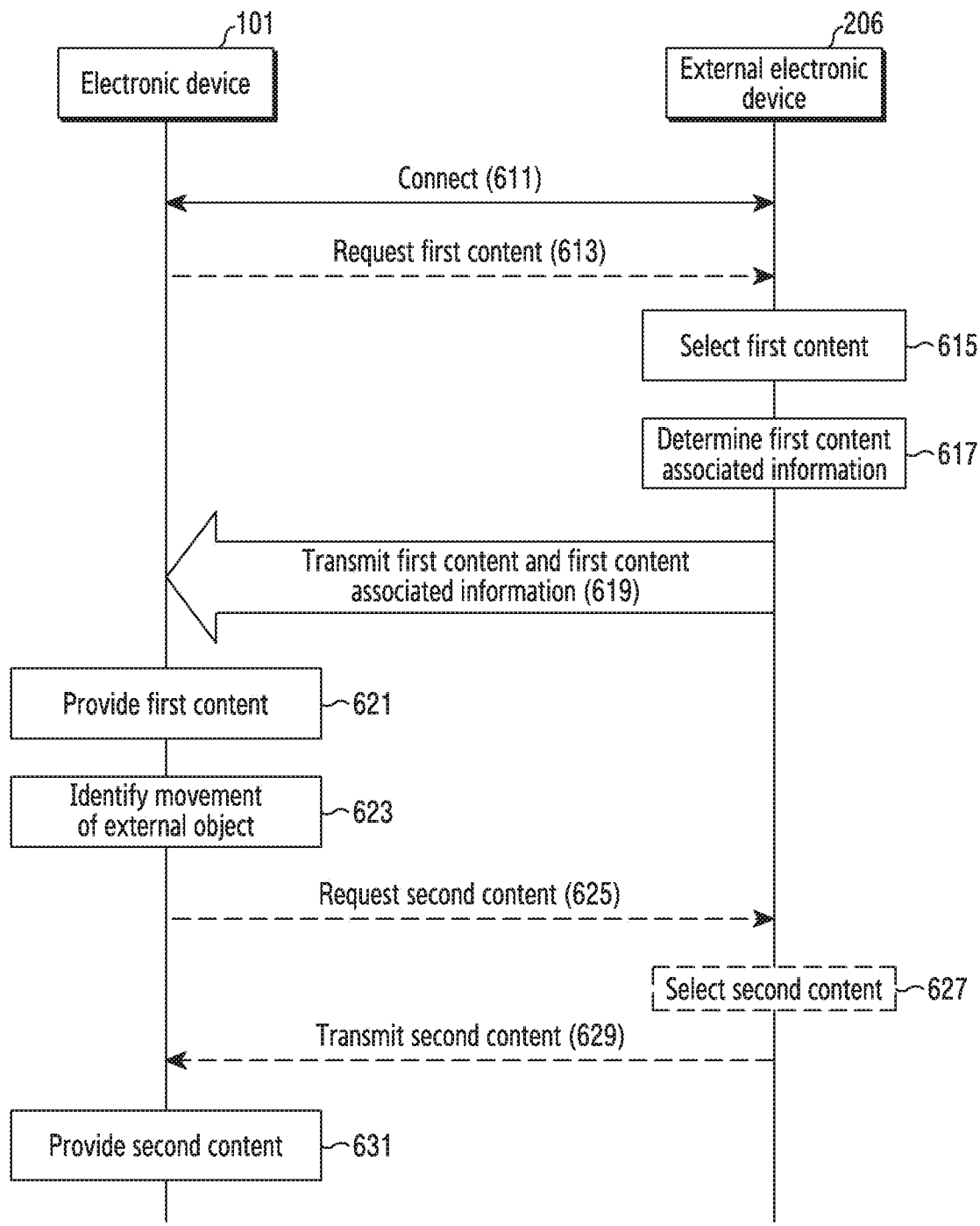
FIG. 6 and FIG. 7 are signal flow diagram in a system including an electronic device according to various embodiments.

FIG. 6 is signal flow diagram in a system 200 including an electronic device 101 according to an embodiment.

Referring to FIG. 6, the electronic device 101 and the external electronic device 206 may be connected to each other in operation 611. The electronic device 101 and the external electronic device 206 may be connected wirelessly or by wire (e.g., USB, HDMI). The electronic device 101 and the external electronic device 206 may be connected via the first network 198, for example, the short-range wireless communication network such as Bluetooth, WiFi or WiFi direct, or the second network 199, for example, the long-range wireless communication network such as a cellular network.

The external electronic device 206 may select first content in operation 615. The external electronic device 206 may select the first content being displayed. Alternatively, the external electronic device 206 may select the first content to display on the display 201, based on a user input generated from the external electronic device 206. Alternatively, the electronic device 101 may request the first content from the external electronic device 206 in operation 613, and the external electronic device 206 may select the first content, in response to the request of the electronic device 101 in operation 615. For doing so, the electronic device 101 may request the first content from the external electronic device 206, based on a user input generated from the electronic device 101. For example, the electronic device 101 may transmit a display scheme or display performance (e.g., a resolution, a frame rate, or a size of the display area 205) of the display 201 to the external electronic device 206. Hence, the external electronic device 206 may select the first content, based on the display scheme or the display performance of the display 201.

The external electronic device 206 may determine information associated with the first content in operation 617. The information associated with the first content may include at least one of a transmission scheme (e.g., mirroring, all share, DLNA, streaming, URL) for the first content, the display scheme (e.g., non-projection), virtual 3D spatial mapping, real image mapping), a playback scheme (e.g., a playback time, a resolution, a frame rate, control information) or identification information (e.g., a name, storage location, metadata) of the first content.

The external electronic device 206 may transmit the first content and the information associated with the first content to the electronic device 101 in operation 619. For example, the external electronic device 206 may transmit the first content and the information associated with the first content directly to the electronic device 101. As another example, the external electronic device 206 may transmit the first content processed based on the display scheme or the display performance of the electronic device 101 and the information associated with the first content to the electronic device 101. As another example, the external electronic device 206 may transmit the information associated with the first content to the electronic device 101, so that the electronic device 101 receives the first content from the external server 208.

The electronic device 101 may provide the first content to the user through the display 201 in operation 621. The electronic device 101 may provide the first content to the user, to superimpose the first content on the real environment through the display 201. The electronic device 101 may determine at least part of the second area 204 as the display area 205 on the display 201, and display the first content in the display area 205. Hence, the user wearing the electronic device 101 on the head may view the first content, in the background of the real environment through the display 201. In addition, the user wearing the electronic device 101 may view the movement of the external object 202 in the direction visible through the display 201. If the electronic device 101 is the optical see-through, the user wearing the electronic device 101 may view the reflected light of the external object 202 passing through the display 201, and determine the visible direction by the movement of the user's head and gaze. According to another embodiment, if the electronic device 101 is the video see-through, the user of the electronic device 101 may view the real environment and the image of the external object 202 received through at least one of the camera module 180 or the sensor module 176 on the display 201, and the visible direction may be determined by the facing direction of the camera module 180 or the sensor module 176.

The electronic device 101 may identify the movement of the external object 202 in operation 623. Using the camera module 180 or the sensor module 176, the electronic device 101 may detect the movement of the external object 202 which transmits through the display 201 or is displayed on the display 201. The movement of the external object 202 may mean the locational movement of the external object 202 and the shape change of the external object 202 (e.g., rotation of the hand or folding of the finger, etc.). The shape change of the external object 202 may be detected, based on at least one of a change of the location, maintenance of a pose for a specific time (e.g., 0.3 seconds), a pointing operation, a tilt, or a rotation operation. According to the movement of the external object 202, the processor 120 may detect at least one of the location change of the external object 202, pitch, yaw, and roll change of 3D space orientation, a static shape detection such as a pose, or shape recognition of the external object 202. The processor 120 may further determine an associated function, if the movement of the external object 202 is a specific movement or has a high similarity. For example, if detecting a specific movement, the processor 120 may determine a function associated with the specific movement using information (e.g., an association between the movement and the function, or a file, database, a mapping table, which defines associations between the movement and contents) stored in the memory 130 or a memory of the external electronic device 102, 108, and 104, and provide the determined function. The electronic device 101 may provide second content related to the first content to the user through the display 201, according to the movement of the external object 202 in operation 631. The electronic device 101 may provide the second content to the user, to superimpose the second content on the image of the real environment through the display 201. The electronic device 101 may display the second content in relation to the external object 202, in at least part of the second area 204 on the display 201. For example, the electronic device 101 may display the second content, together with (e.g., to at least partially overlap) the first content in the second area 204. As another example, the electronic device 101 may display the second content, without the first content in the second area 204. In various examples, the processor 120 of the electronic device 101 may, if the external object 202 is transmitted or displayed in the second area 204 included in the display 201, display the second content in at least part of the second area 204.

The electronic device 101 may display the second content determined from the memory 130. Alternatively, the electronic device 101 may request the second content from the external electronic device 206 in operation 625. In response to the request of the electronic device 101, the external electronic device 206 may select the second content in operation 627, and transmit the second content to the electronic device 101 in operation 629. Thus, the electronic device 101 may provide the second content received from the external electronic device 206 in operation 631.

Figure 7:
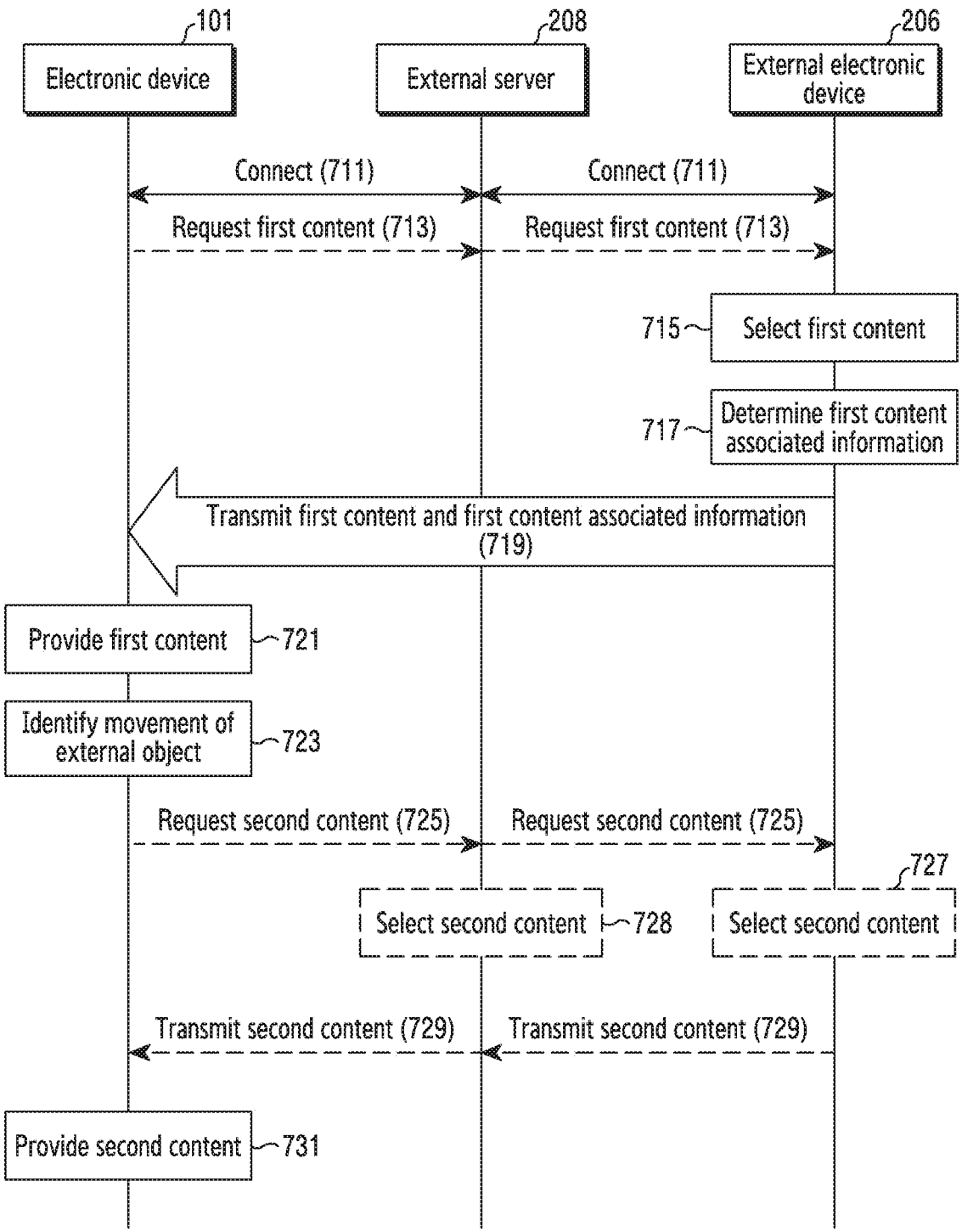

FIG. 7 is a signal flow diagram in a system 200 including an electronic device 101 according to various embodiments.

Referring to FIG. 7, the electronic device 101 and the external server 208 may be connected to each other in operation 711, and the external electronic device 206 and the external server 208 may be connected to each other in operation 711. The electronic device 101 and the external server 208 may be connected wirelessly or by wire, and the external electronic device 206 and the external server 208 may be connected wirelessly or by wire. The electronic device 101 and the external server 208 may be connected via the first network 198, for example, the short-range wireless communication network such as Bluetooth, WiFi or WiFi direct, or the second network 199, for example, the long-range wireless communication network such as a cellular network. The external electronic device 206 and the external server 208 may be connected via the first network 198, for example, the short-range wireless communication network such as Bluetooth, WiFi or WiFi direct, or the second network 199, for example, the long-range wireless communication such as a cellular network.

The external electronic device 206 may select first content in operation 715. The external electronic device 206 may select the first content being displayed. Alternatively, the external electronic device 206 may select the first content to display on the display 201, based on a user input generated from the external electronic device 206. Alternatively, the electronic device 101 may request the first content from the external electronic device 206 through the external server 208 in operation 713, and the external electronic device 206 may select the first content, in response to the request of the electronic device 101 in operation 715. The electronic device 101 may request the first content from the external electronic device 206, based on a user input generated from the electronic device 101. For example, the electronic device 101 may transmit the display scheme or the display performance (e.g., a resolution, a frame rate, or a size of the display area 205) of the display 201 to the external electronic device 206. Hence, the external electronic device 206 may select the first content, based on the display scheme or the display performance of the display 201.

The external electronic device 206 may determine information associated with the first content in operation 717. The information associated with the first content may include at least one of the transmission scheme (e.g., mirroring, all share, DLNA, streaming, URL) for the first content, the display scheme (e.g., non-projection), virtual 3D spatial mapping, real image mapping), the playback scheme (e.g., a playback time, a resolution, a frame rate, control information) or the identification information (e.g., a name, storage location, metadata) of the first content.

The external electronic device 206 may transmit the first content and the information associated with the first content to the electronic device 101 in operation 719. For example, the external electronic device 206 may transmit the first content and the information associated with the first content to the electronic device 101 via the external server 208. As another example, the external electronic device 206 may transmit the first content and the information associated with the first content to the external server 208, and the external server 208 may transmit the first content processed based on the display scheme or the display performance of the electronic device 101 and the information associated with the first content to the electronic device 101. As another example, the external electronic device 206 may transmit the information associated with the first content to the electronic device 101 via the external server 208, so that the electronic device 101 receives the first content from the external server 208.

The electronic device 101 may provide the first content to the user through the display 201 in operation 721. The electronic device 101 may provide the first content to the user, to superimpose the first content on the real environment through the display 201. The electronic device 101 may determine at least part of the second area 204 as the display area 205 on the display 201, and display the first content in the display area 205. Hence, the user of the electronic device 101 may view the first content, in the background of the real environment through the display 201. Further, the user wearing the electronic device 101 may view the movement of the external object 202 see-through or using through the display 201. The electronic device 101 may detect the movement of the external object 202 in operation 723. Using the camera module 180 or the sensor module 176, the electronic device 101 may identify the movement of the external object 202 in the visible direction through the display 201.

The electronic device 101 may provide the user with second content related to the first content through the display 201, according to the movement of the external object 202 in operation 731. The electronic device 101 may provide the second content to the user, to superimpose the second content on the real environment on the display 201. The electronic device 101 may display the second content in relation to the external object 202, in at least part of the second area 204 on the display 201. For example, the electronic device 101 may display the second content, together with the first content in the second area 204. As another example, the electronic device 101 may display the second content, without the first content in the second area 204. For example, the processor 120 may display the second content in at least part of the second area 204, only if the external object 202 is viewed or displayed through the second area 204 included in the display 201.

The electronic device 101 may display the second content determined from the memory 130. Alternatively, the electronic device 101 may request the second content from the external electronic device 206 through the external server 208 in operation 725. The external electronic device 206 may select the second content, in response to the request of the electronic device 101 in operation 727, and transmit the second content to the electronic device 101 via the external server 208 in operation 729. Thus, the electronic device 101 may provide the second content received from the external electronic device 206 in operation 731. Alternatively, the electronic device 101 may request the second content from the external server 208 in operation 725. The external server 208 may select the second content, in response to the request of the electronic device 101 in operation 728, and transmit the second content to the electronic device 101 in operation 729. Thus, the electronic device 101 may provide the second content received from the external electronic device 206 in operation 731.

Figure 8:
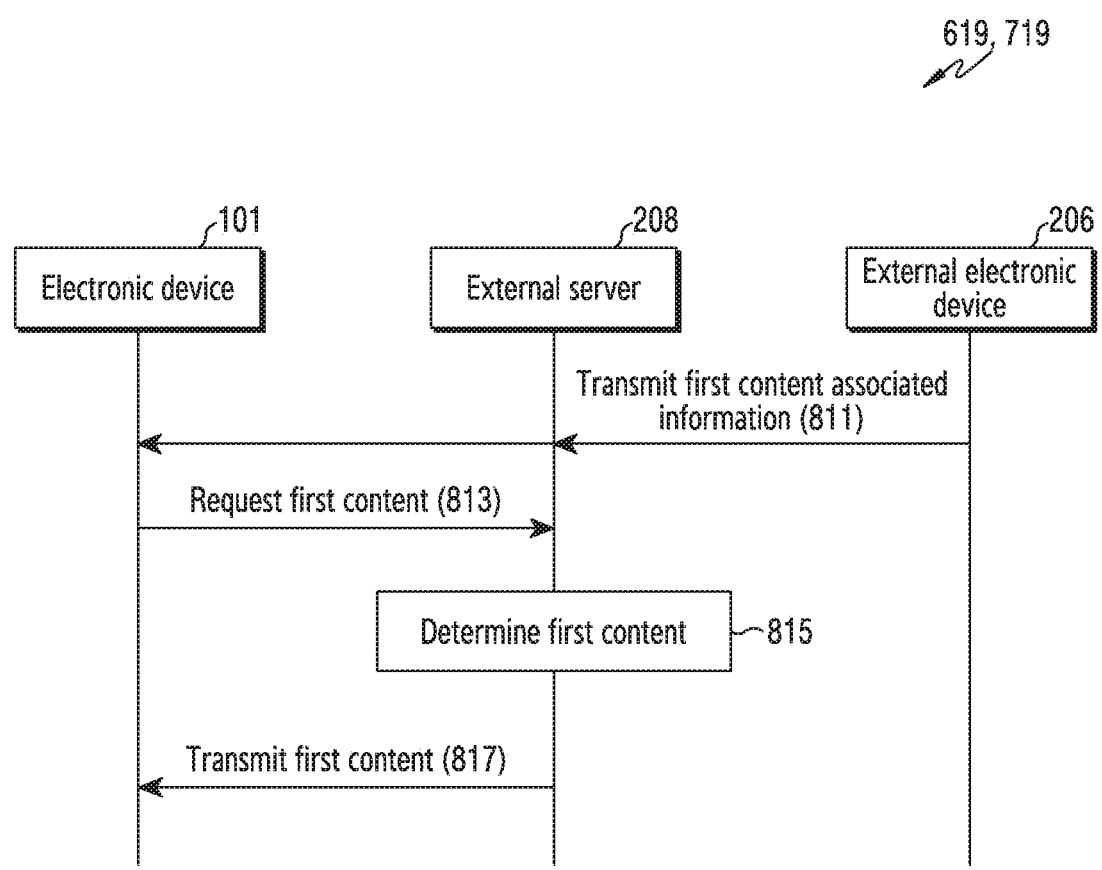
FIG. 8 is a signal flow diagram of an operation for transmitting first content and first content associated information according to an example in FIG. 6 and FIG. 7.

FIG. 8 is a signal flow diagram of an operation for transmitting first content and first content associated information according to an example in FIG. 6 and FIG. 7.

Referring to FIG. 8, the external electronic device 206 may transmit the information associated with the first content to the electronic device 101 in operation 811. The external electronic device 206 may transmit the information associated with the first content directly to the electronic device 101. Alternatively, the external electronic device 206 may transmit the information associated with the first content to the electronic device 101 via the external server 208. The electronic device 101 may request the first content from the external server 208, based on the information associated with the first content in operation 813. The external server 208 may determine the first content, in response to the request of the electronic device 101 in operation 815. The external server 208 may transmit the first content to the electronic device 101 in operation 817.

An electronic device 101 according to various embodiments, may include a communication module 190, a display 201, at least one sensor module 176 and a processor 120. According to various embodiments, the processor 120 may be configured to, provide first content received from an external electronic device 260 using the communication module 190 to a user using the display 201, identify a movement of an external object 202 in a visible direction of the user see-through or using the display 201 which provides the first content, using the at least one sensor module 176, and provide second content to the user through at least part of the display 201 so as to display the second content related to the first content in relation to the external object 202 according to the movement.

According to various embodiments, the second content may include control content for controlling the first content.

According to various embodiments, the processor 120 may be configured to, identify a first movement which is set to select at least part of the first content from the movement, identify a second movement which is set to select the second content from the movement in relation to the external object 202, and based on the second movement, provide the second content in relation to the external object 202.

According to various embodiments, the processor 120 may be configured to, based on the first movement, provide guide content for guiding the second movement on at least part of the display 201 which provides the first content.

According to various embodiments, the processor 120 may be configured to, identify another movement of the external object 202 or another external object 1602 and 1702 through the display 201 which provides the first content and the second content, using the at least one sensor module 176, and display the first content and the second content and control the second content on the display 201 based at least on the another movement.

According to various embodiments, the processor 120 may be configured to, control the first content based at least on the control for the second content.

According to various embodiments, an electronic device 101 may include a display 201, at least one sensor module 176 and a processor 120. According to various embodiments, the processor 120 may be configured to, provide first content using the display 201, identify a movement of an external object 202 in a visible direction of a user see-through or using the display 201 which provides the first content, using the at least one sensor module, and provide second content to the user through at least part of the display 201 so as to display the second content related to the first content according to the movement in relation to the external object 202.

According to various embodiments, the second content may include control content for controlling the first content.

According to an embodiment, the electronic device 101 may further include a communication module 190. According to an embodiment, the processor 120 may be configured further to, receive first content from the external electronic device 206 through the communication module 190, and provide the first content through at least part of the display 201.

According to another embodiment, the processor 120 may be configured further to, recognize an object in a visible direction of the user see-through or using the display 201, using the at least one sensor module 176, and provide the first content related to the object through at least part of the display 201.

According to various embodiments, the processor 120 may be configured to, identify a first movement which is set to select at least part of the first content from the movement, identify a second movement which is set to display the second content from the movement in relation to the external object 202, and based on the second movement, provide the second content related to at least part of the first content in relation to the external object 202 through at least part of the display 201 which provides the first content.

According to various embodiments, an electronic device 101 may include a display 201, a camera module 180, at least one sensor module 176 and a processor 120. According to various embodiments, the processor 120 may be configured to, provide an image acquired through the camera module 180 and first content using the display 201, identify a movement of an external object 202 in a direction for acquiring the image through the camera module 180, using the at least one sensor module 176, and provide second content to the user through at least part of the display 201 so as to display the second content related to the first content according to the movement in relation to the external object 202.

According to various embodiments, the second content may include control content for controlling the first content.

According to various embodiments, the processor 120 may be configured to, identify a first movement which is set to select at least part of the first content from the movement, identify a second movement which is set to display the second content from the movement in relation to the external object 202, and based on the second movement, provide the second content in relation to the external object 202.

According to various embodiments, the processor 120 may be configured to, based on the first movement, provide guide content for guiding the second movement on at least part of the display 201 which provides the first content.

According to various embodiments, the processor 120 may be configured to, identify another movement of the external object 202 or another external object 1602 and 1702 through the display 201 which provides the first content and the second content, using the at least one sensor module 176, and display the first content and the second content and control the second content on the display 201 based at least on the another movement.

According to various embodiments, the processor 120 may be configured to, control the first content based at least on the control for the second content.

Figure 9:
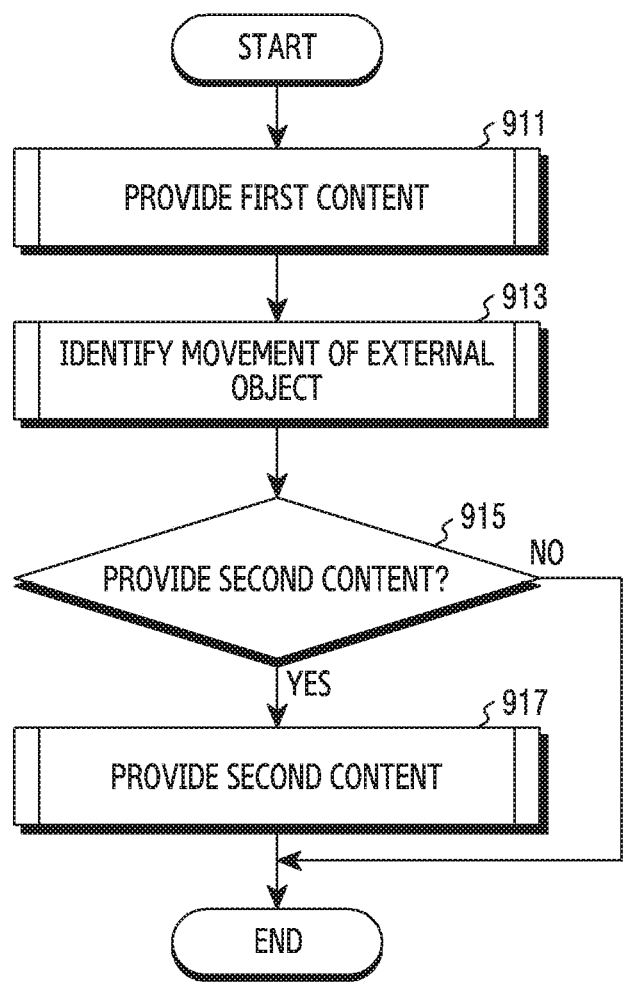
FIG. 9 is a flowchart of an operating method of an electronic device according to various embodiments.

FIG. 9 is a flowchart of an operating method of an electronic device 101 according to various embodiments.

Referring to FIG. 9, the electronic device 101 may provide first content (1105 of FIG. 11) on the display 201 in operation 911. The electronic device 101 may provide the first content 1105 to the user, to superimpose the first content 1105 on the real environment through the display 201. The first content 1105 may include at least one of, for example, moving image data, still image data, text data or audio data (e.g., provide through the sound output device 155 rather than the display 201). The processor 120 may display the first content 1105 in at least part of the second area 204 on the display 201. Hence, the user of the electronic device 101 may view the first content 1105, in the background of the real environment on the display 201. The user wearing the electronic device 101 may view the movement of the external object 202 in a visible direction through the display 201. In addition, the processor 120 may output audio data of the first content 1105 through the sound output device 155.

Figure 10:
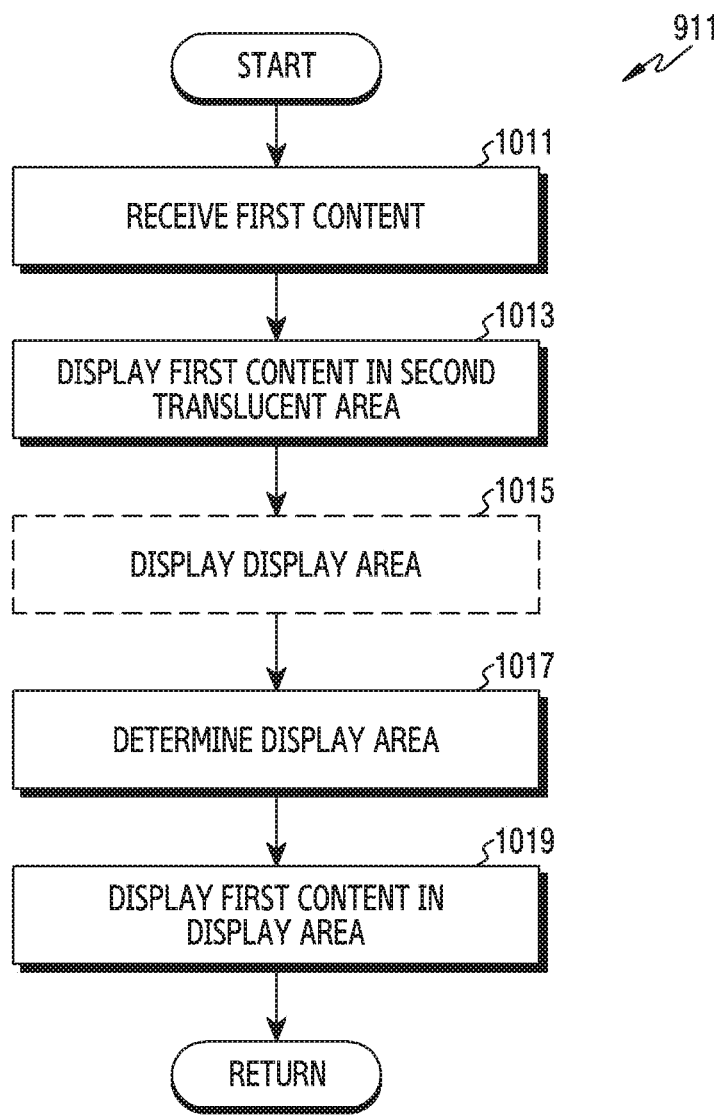
FIG. 10 is a flowchart of a first content providing operation in FIG. 9.

FIG. 10 is a flowchart of an operation 911 for providing first content 1105 in FIG. 9. FIG. 11A, FIG. 11B, FIG. 11C and FIG. 11D are exemplary diagrams of the operation 911 for providing the first content 1105 in FIG. 9.

Figure 11A:
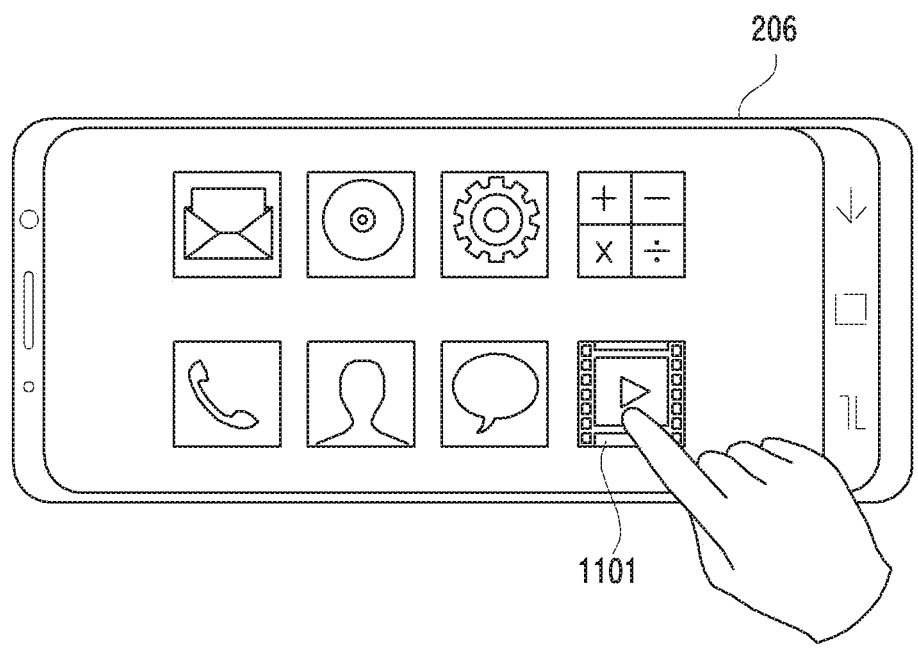
FIG. 11A, FIG. 11B, FIG. 11C and FIG. 11D are exemplary diagrams of a first content providing operation in FIG. 9.
Figure 11B:
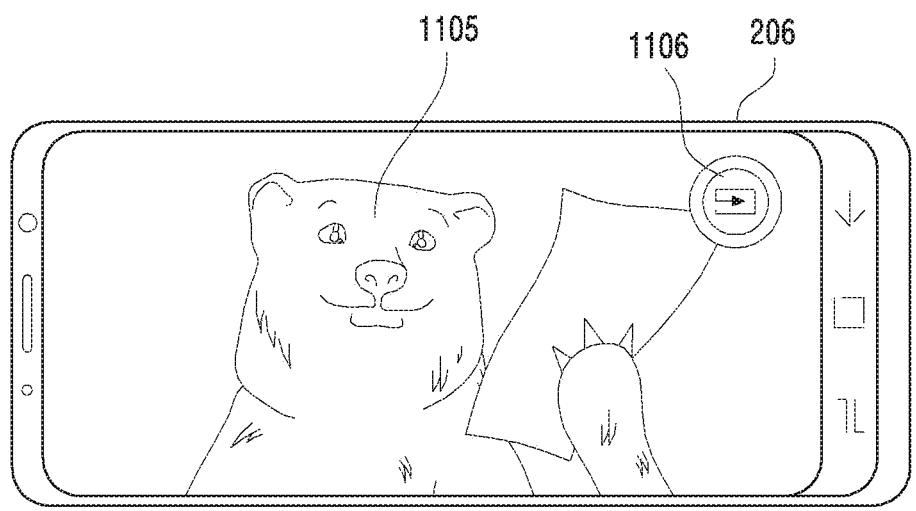

Referring to FIG. 10, the electronic device 101 may receive the first content 1105 in operation 1011. According to an embodiment, the processor 120 may receive the first content 1105 from the external electronic device 206 or the external server 208 through the communication module 190. The external electronic device 206 may display a plurality of first icons 1101 as shown in FIG. 11A. The external electronic device 206 may play the first content 1105 as shown in FIG. 11B, based on a user input for selecting any one of the first icons 1101. While playing the first content 1105, the external electronic device 206 may display a second icon 1106 for transmitting the first content 1105 to the electronic device 101. The external electronic device 206 may transmit the first content 1105 to the electronic device 101, based on a user input for selecting the second icon 1106.

Figure 11C:
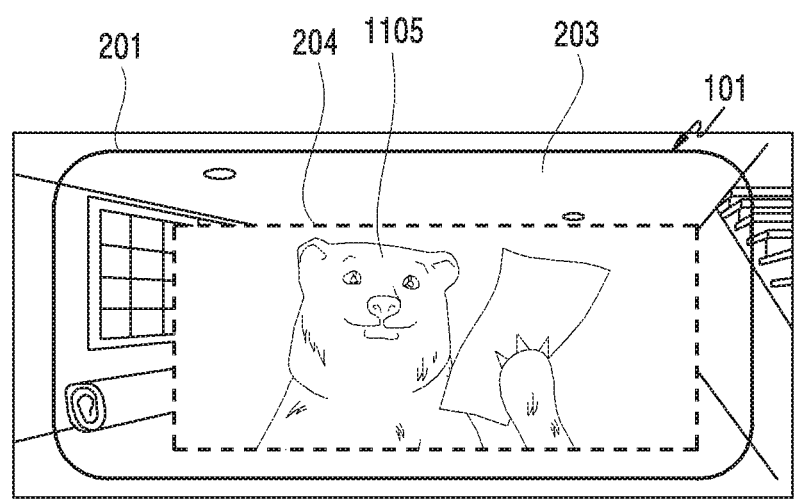

The electronic device 101 may display the first content 1105 through at least part of the second area 204 of the display 201 in operation 1013. The processor 120 may display the first content 1105 in at least part of the second area 204, to superimpose the first content 1105 on the real environment on the display 201. The processor 120 may display the first content 1105 in the second area 204 of the display 201 as shown in FIG. 11C.

The electronic device 101 may determine at least part of the second area 204 as at least one display area 205 in operation 1017. According to an embodiment, the processor 120 may determine a preset candidate area as the display area 205. According to another embodiment, the processor 120 may determine the display area 205, based on at least one of a user input received through the input device 150 or a movement of the external object 202 identified using the sensor module 176. According to another embodiment, the processor 120 may determine a shape of an object corresponding to the second area 204 in an image acquired through the camera module 180 or the sensor module 176 as the display area 205, based on a preset criterion. According to another embodiment, the processor 120 may determine the display area 205, based on a marker recognized through the sensor module 176 or the camera module 180.

According to an embodiment, the electronic device 101 may display at least one candidate area in the second area 204 in operation 1015. For example, the processor 120 may display the identifier 401 for the candidate area in the second area 204. The identifier 401 may include, for example, at least one of a border, a figure, or a thumbnail image of the candidate area. Next, the processor 120 may select at least one identifier 401, based on at least one of a user input received through the input device 150 or a movement of the external object 202 identified using the sensor module 176. In response to this, the processor 120 may determine at least one candidate area as the display area 205 in operation 1017.

According to another embodiment, the electronic device 101 may determine the display area 205, without displaying the candidate area in operation 1017. If one candidate area is set in the second area 204, the processor 120 may determine the candidate area as the display area 205, without displaying the candidate area or the identifier 401.

Figure 11D:
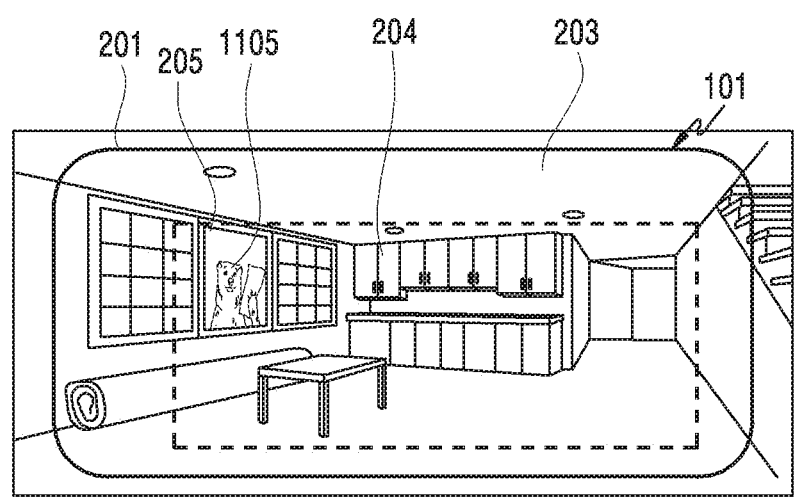

The electronic device 101 may display the first content 1105 in the display area 205 in the second area 204 in operation 1019. The processor 120 may modify the first content 1105 corresponding to the display area 205. The processor 120 may modify the first content 1105 according to at least one of an attribute of the first content 1105, an attribute of the display area 205, or an immersive degree related to the display area 205. The attribute of the first content 1105 may include, for example, at least one of a type, a ratio, or a resolution of the first content 1105. The attribute of the display area 205 may include, for example, at least one of a shape, a color, a complexity, reflected light, or a size of the object. The immersive degree may be divided into, for example, at least one of a high level, a middle level, or a low level. Hence, the processor 120 may display the first content 1105 in the display area 205 in the second area 204 as shown in FIG. 11D. Thus, the electronic device 101 may return to FIG. 9.

The electronic device 101 may identify a movement of the external object 202 in operation 913. While providing the first content 1105 through the display 201, the processor 120 may identify the movement of the external object 202 in a visible direction of the user wearing the electronic device 101 through the display 201. The processor 120 may identify the movement of the external object 202 using the sensor module 176.

Figure 12:
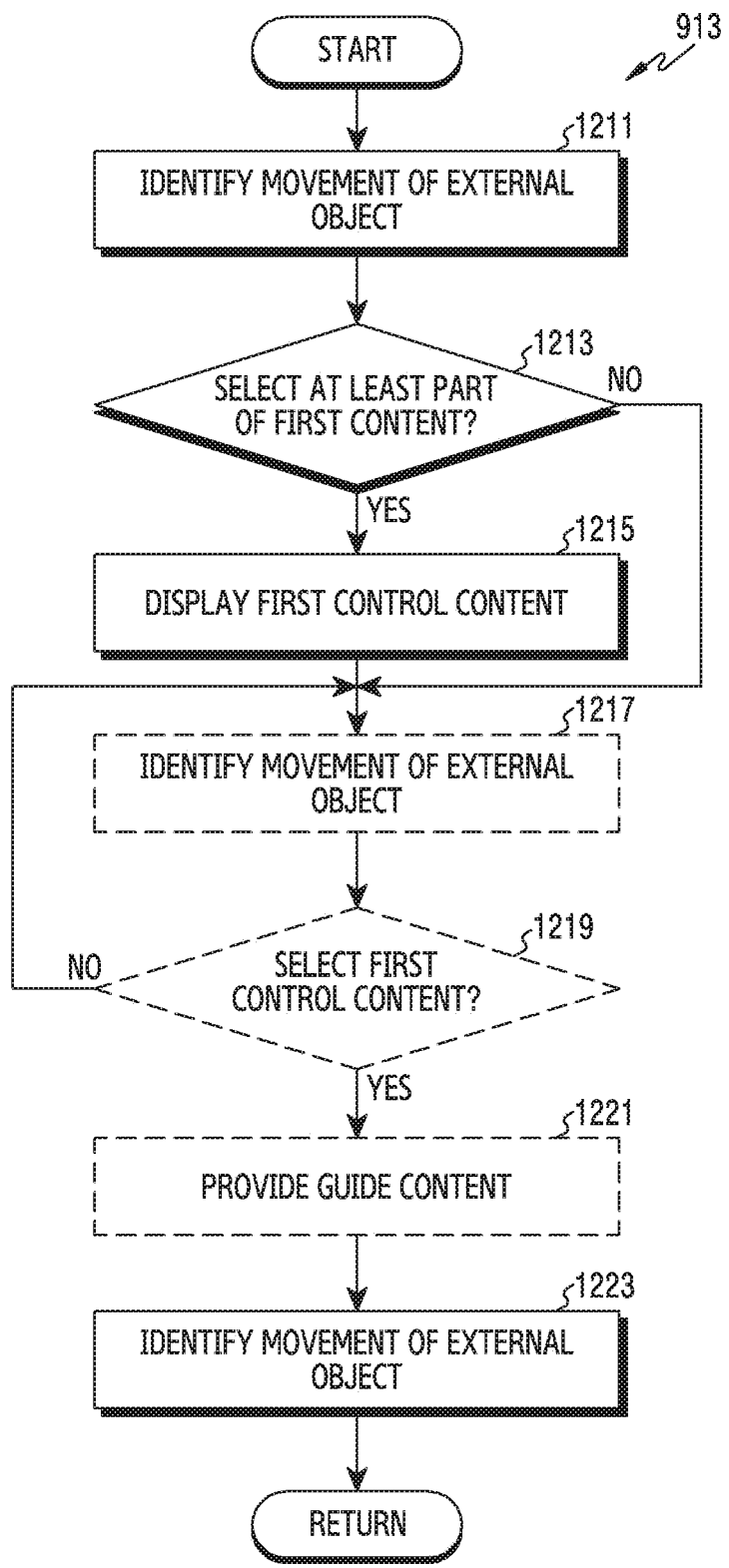
FIG. 12 is a flowchart of an operation for identifying a movement of an external object in FIG. 9.

FIG. 12 is a flowchart of an operation 913 for identifying a movement of an external object 202 in FIG. 9. FIG. 13A, FIG. 13B, FIG. 13C and FIG. 13D are exemplary diagrams of the operation 913 for identifying the movement of the external object 202 in FIG. 9.

Figure 13A:
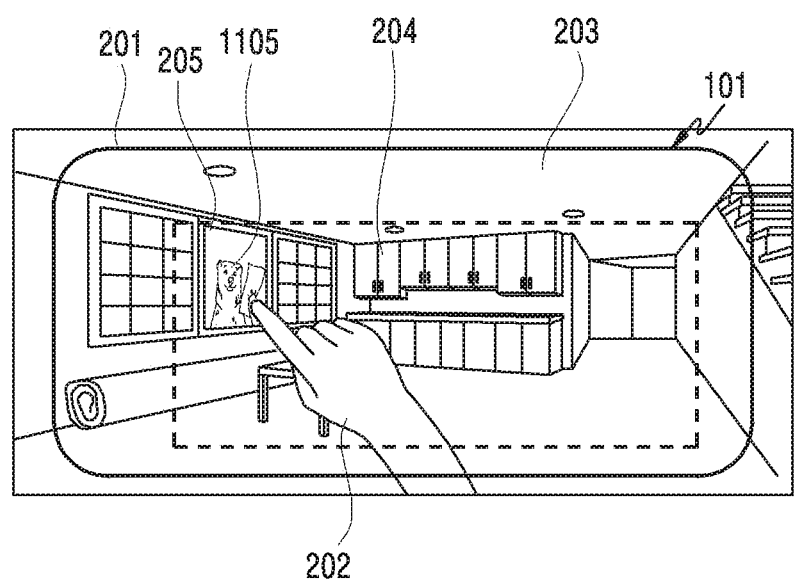
FIG. 13A, FIG. 13B, FIG. 13C and FIG. 13D are exemplary diagrams of an operation for identifying a movement of an external object in FIG. 9.
Figure 13B:
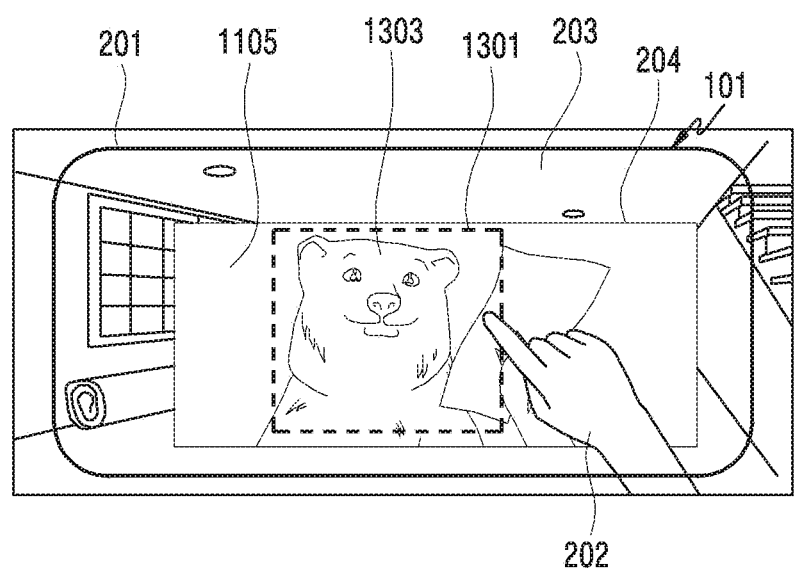

Referring to FIG. 12, the electronic device 101 may identify the movement of the external object 202, while displaying the first content 1105 on the display 201 in operation 1211. The processor 120 may identify the movement of the external object 202 using the sensor module 176, while displaying the first content 1105 in the candidate area 205. For example, the processor 120 may determine whether the movement of the external object 202 is to select the first content 1105 in the candidate area 205 as shown in FIG. 13A. If determining that the movement of the external object 202 is to select the first content 1105 in the candidate area 205, the processor 120 may display the first content 1105 in at least part of the second area 204 as shown in FIG. 13B. While displaying the first content 1105 in at least part of the second area 204, the processor 120 may continuously identify the movement of the external object 202 using the sensor module 176.

The electronic device 101 may determine whether the movement of the external object 202 is to select at least part of the first content 1105 in operation 1213. The processor 120 may determine whether the movement of the external object 202 is a first movement 1301 which is set to select at least part of the first content 1105 as illustrated in FIG. 13B. If determining that the movement of the external object 202 is the first movement 1301, the processor 120 may determine whether at least part of the content 1105 selected by the first movement 1301 includes an item 1303. For example, the first content 1105 may include a plurality of items (e.g., at least one of a character, a person, a product, a barcode, or text), and at least one of the items may be selected by the first movement 1301 (e.g., an area setting gesture, a pointing gesture, digit indication with fingers, etc.) of the external object 202.

Figure 13C:
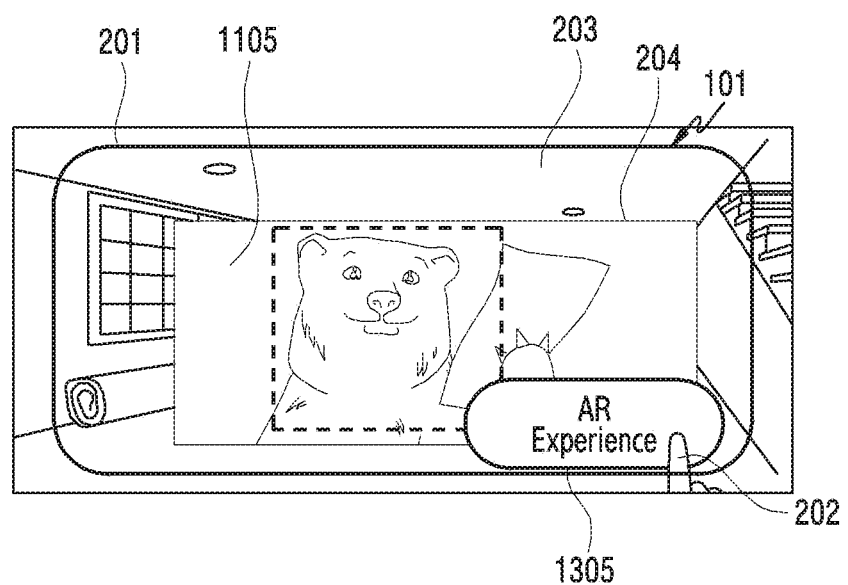

If determining that the movement of the external object 202 is to select at least part of the first content 1105 in operation 1213, the electronic device 101 may display first control content 1305 on the display 201 in operation 1215. The processor 120 may display the first control content 1305 together with the first content 1105 through the second area 204 as shown in FIG. 13C. The first control content 1305 may determine second content 1515, 1615, and 1715 related to the first content 1105. According to an embodiment, the first control content 1305 may search for (e.g., image product search, text recognition based keyword search, barcode recognition based text/character search) at least one item 1303 selected by the first motion 1301. Accordingly, a plurality of functions is determined according to the item 1303 selected by the first movement 1301, and may be selected by a user input, after a plurality of control contents (not shown) is displayed. The electronic device 101 may identify the movement of the external object 202, while displaying the first content 1105 on the display 201 in operation 1223. The processor 120 may identify the movement of the external object 202 using the sensor module 176 or the camera module 180, while displaying the first content 1105 in the second area 204. Thus, the electronic device 101 may return to FIG. 9.

According to an embodiment, the electronic device 101 may continuously identify the movement of the external object 202, while displaying the first content 1105 on the display 201 in operation 1217. The processor 120 may identify the movement of the external object 202 using the sensor module 176 or the camera module 180, while displaying the first content 1105 and the first control content 1305 in the second area 204. The electronic device 101 may determine whether the movement of the external object 202 is to select the first control content 1305 in operation 1219. The processor 120 may determine whether the movement of the external object 202 is to select the first control content 1305 as shown in FIG. 13C.

Figure 13D:
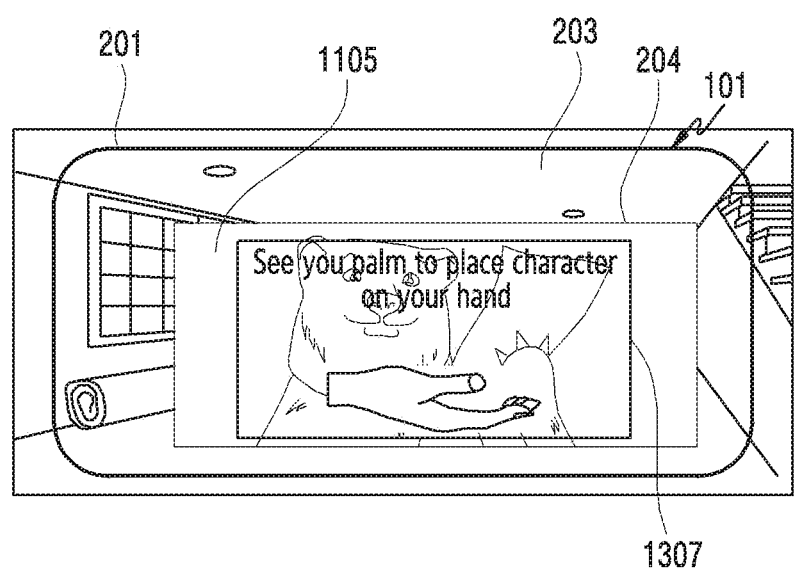

According to an embodiment, if determining in operation 1219 that the movement of the external object 202 is to select the first control content 1305, the electronic device 101 may display guide content 1307 for the user on the display 201 in operation 1221. As an example, the processor 120 may display the first content 1105 in the second area 204, and display the guide content 1307 as visual guide as shown in FIG. 13D. The processor 120 may superimpose and display the guide content 1307 on the first content 1105. The guide content 1307 may include descriptions on a user interface for a function associated with the movement of the external object 202 or an icon or a menu related to the function associated with the movement of the external object 202. As another example, the processor 120 may output the guide content 1307 as audio guide using the sound output device 155, while displaying the first content 1105 in the second area 204. The electronic device 101 may continuously identify the movement of the external object 202, while displaying the first content 1105 on the display 201 in operation 1223. The processor 120 may remove the guide content 1307 from the second area 204. The processor 120 may identify the movement of the external object 202 using the sensor module 176, while displaying the first content 1105 in the second area 204. Thus, the electronic device 101 may return to FIG. 9.

According to an embodiment, instead of identifying the movement of the external object 202 in at least one of operation 1211 or operation 1217, the processor 120 may identify a user input (e.g., at least one of touch, pointing, dragging, grip, button input, motion, and gesture) received through the input device 150 of the electronic device 101 or an input device of the external electronic device (e.g., the electronic device 102, 104, and 108). The processor 120 may select at least part of the first content 1105 or select the first control content, based on the user input in at least one of operation 1213 or operation 1219. For example, the processor 120 may receive the user input through a touch input device or a button input device of the electronic device 101, or receive the user input through at least one of a remote controller, a mouse or a digital globe connected to the electronic device 101 wirelessly or by wire.

The electronic device 101 may determine in operation 915 whether the movement of the external object 202 is to provide the second content 1515, 1615, and 1715 related to the first content 1105. If determining in operation 915 that the movement of the external object 202 is to provide the second content 1515, 1615, and 1715, the electronic device 101 may provide the second content 1515, 1615, and 1715 through the display 201 in operation 917. The electronic device 101 may provide the second content 1515, 1615, and 1715 to the user, to superimpose the second content 1515, 1615, and 1715 on the real environment through the display 201. The second content 1515, 1615, and 1715 may include, for example, at least one of moving image data, still image data, audio data or a menu which set to control the first content 1105. The processor 120 may display the second content 1515, 1615, and 1715 in relation to the external object 202, in at least part of the second area 204 on the display 201. For example, the processor 120 may display the second content 1515, 1615, and 1715, together with the first content 1105 in the second area 204. As another example, the processor 120 may display the second content 1515, 1615, and 1715, without the first content 1105 in the second area 204.

Figure 14:
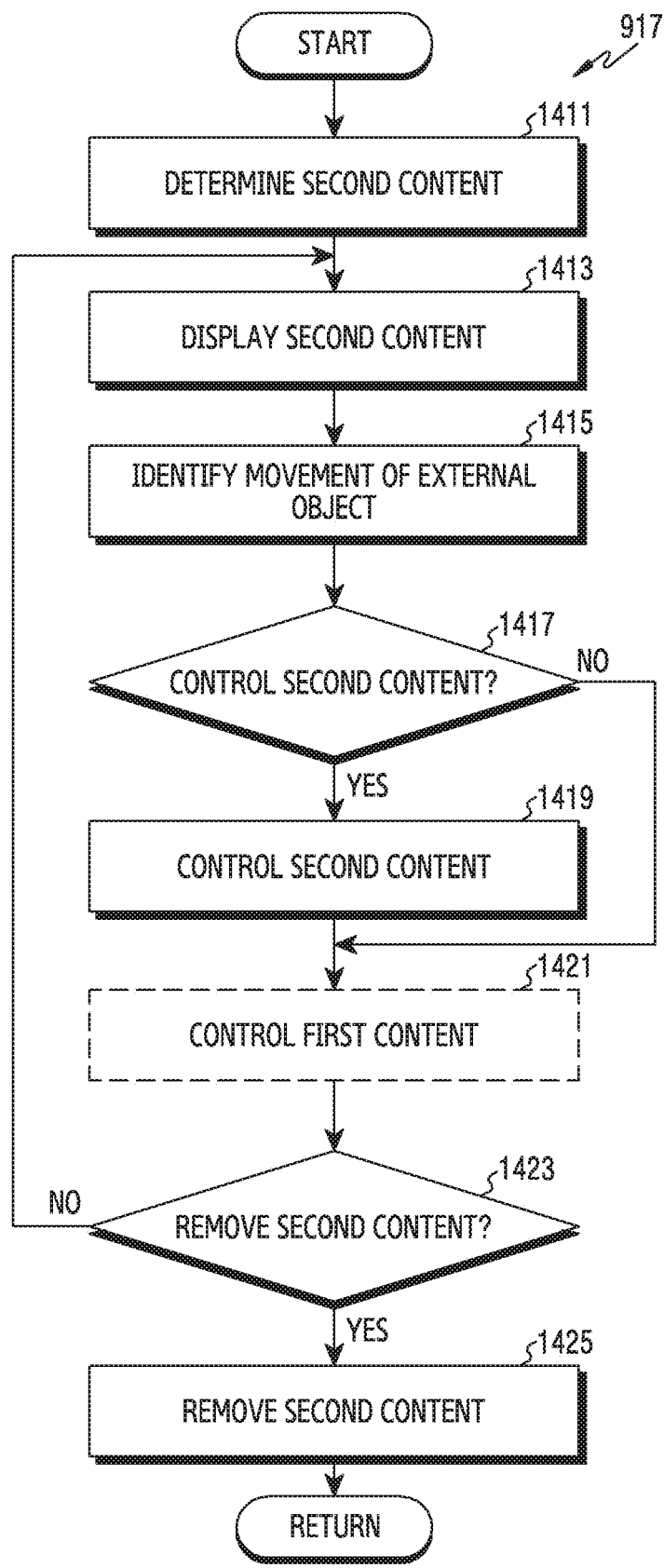
FIG. 14 is a flowchart of a second content providing operation in FIG. 9.
Figure 15A:
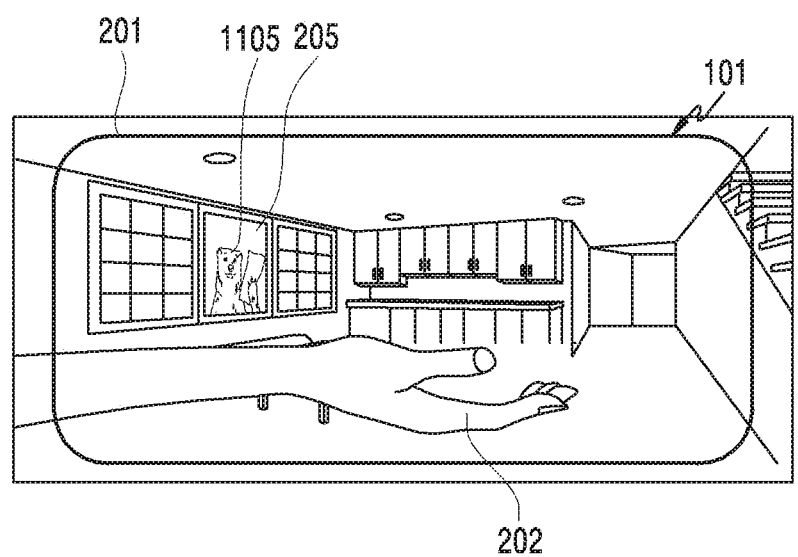
FIG. 15A and FIG. 15B are exemplary diagrams of a second content providing operation according to an example in FIG. 9.
Figure 15B:
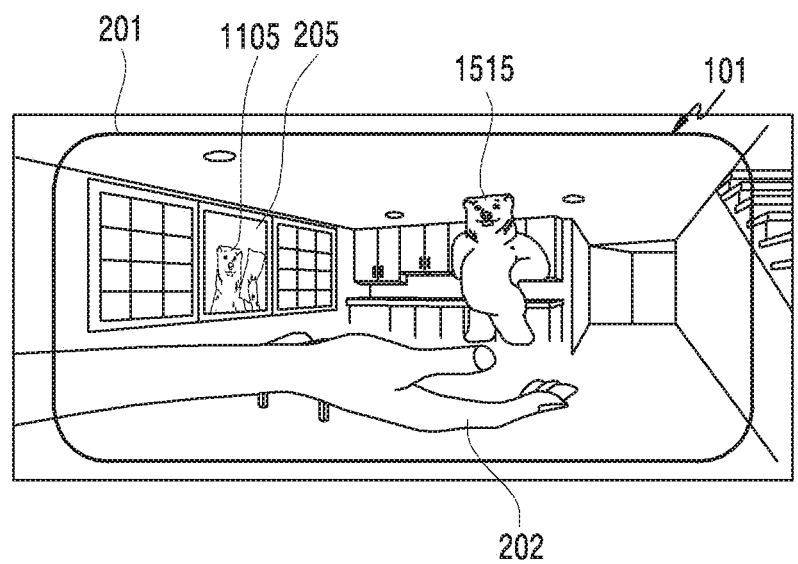

FIG. 14 is a flowchart of an operation 917 for providing second content 1515, 1615, and 1715 in FIG. 9. FIG. 15A and FIG. 15B are exemplary diagrams of the operation 917 for providing the second content 1515 according to an example in FIG. 9. FIG. 16A, FIG. 16B, FIG. 16C and FIG. 16D are exemplary diagrams of the operation 917 for providing the second content 1615 according to another example in FIG. 9. FIG. 17A, FIG. 17B, FIG. 17C and FIG. 17D are exemplary diagrams of the operation 917 for providing the second content 1715 according to another example in FIG. 9. FIG. 18A and FIG. 18B are exemplary diagrams for explaining disappearance of an external object 202 in FIG. 14.

Referring to FIG. 14, the electronic device 101 may determine the second content 1515, 1615, and 1715 in operation 1411. The processor 120 may determine whether the movement of the external object 202 is a second movement set to display the second content 1515, 1615, and 1715. If determining that the movement of the external object 202 is the second movement, the processor 120 may determine the second content 1515, 1615, and 1715. The processor 120 may determine the second content 1515, 1615, and 1715, based on the item 1303 of at least part of the first content 1105 selected by the first motion 1301. According to an embodiment, the processor 120 may acquire the second content 1515, 1615, and 1715 from the memory 130. According to another embodiment, the processor 120 may obtain the second content 1515, 1615, and 1715 from the external electronic device 206 or the external server 208 through the communication module 190.

For example, the processor 120 may compare the movement of the external object 202 with a plurality of second movements. The processor 120 may determine any one of the second movements, according to at least one of the position, the shape, or the direction of the external object 202. Thus, the processor 120 may determine the second content 1515, 1615, and 1715, in response to the determined second movement. The processor 120 may determine a display size of the second content 1515, 1615, and 1715, according to the distance between the electronic device 101 and the external object 202. The processor 120 may determine a display direction of the second content 1515, 1615, and 1715, according to the direction of the external object 202. The processor 120 may determine at least one of the acquisition scheme or the display scheme of the second content 1515, 1615, and 1715, according to the shape of the external object 202. For example, the processor 120 may determine to acquire the second content 1515, 1615, 1715 through Internet search. As another example, the processor 120 may determine to display the second content 1515, 1615, 1715 by adding a moving animation function. For the user's hand of the external object 202, the processor 120 may determine an animation function which moves differently according to the number of fingers.

In operation 1413, the electronic device 101 may display the second content 1515, 1615, and 1715 through at least part of the second area 204 of the display 201. The processor 120 may display the second content 1515, 1615, and 1715 in at least part of the second area 204, to superimpose the second content 1515, 1615, and 1715 on the real environment through the display 201.

While displaying the second content 1515, 1615, and 1715 on the display 201, the electronic device 101 may identify an additional movement of the external object 202 in operation 1415. The processor 120 may identify the additional movement of the external object 202 using the sensor module 176 or the camera module 180, while displaying the second content 1515, 1615, and 1715 in the second area 204. The electronic device 101 may determine whether the additional movement of the external object 202 is to control the second content 1515, 1615, and 1715 in operation 1417. If determining in operation 1417 that the additional movement of the external object 202 is to control the second content 1515, 1615, and 1715, the electronic device 101 may display the second content 1515, 1615, and 1715 on the display 201, and control the second content 1515, 1615, and 1715 in operation 1419. The processor 120 may control the second content 1515, 1615, and 1715, according to the additional movement of the external object 202. According to an embodiment, the electronic device 101 may further control the first content 1105 in operation 1421. The processor 120 may control the first content 1105, while controlling the second content 1515, 1615, and 1715.

According to an embodiment, if identifying the movement of the external object 202 as shown in FIG. 15A, the processor 120 may display the second content 1515 in relation to the external object 202 in the second area 204 of the display 201 as shown in FIG. 15B. For example, the processor 120 may display still image data indicating a product or a character associated with the item 1303 of the first content 1105, as the second content 1515. Next, the processor 120 may control the second content 1515, according to the additional movement of the external object 202. For example, the processor 120 may move the second content 1515, along a movement path of the external object 202 on the display 201. As another example, the processor 120 may provide an effect as if the second content 1515 is thrown to and received from the external object 202, according to vibrations of the external object 202 on the display 201. As another example, the processor 120 may adjust the size of the second content 1515 or rotate the second content 1515, according to at least one of a distance change between the electronic device 101 and the external object 202 on the display 201, a shape change of the external object 202 or a rotation of the external object 202. As another example, the processor 120 may execute a procedure for purchasing the second content 1515.

Figure 16A:
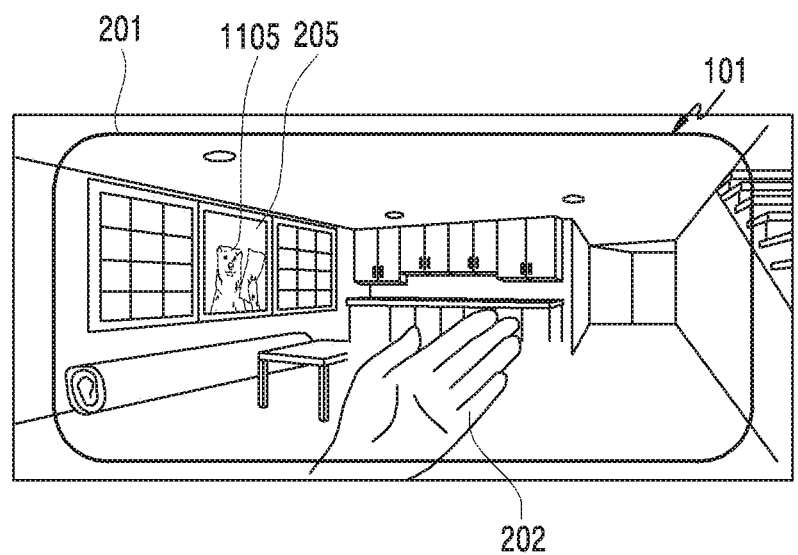
FIG. 16A, FIG. 16B, FIG. 16C and FIG. 16D are exemplary diagrams of a second content providing operation according to another example in FIG. 9.
Figure 16B:
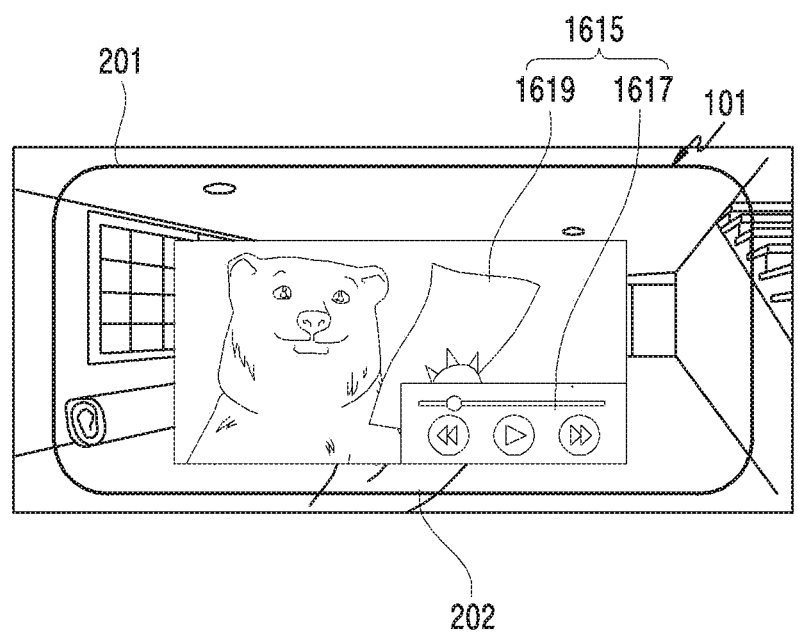
Figure 16C:
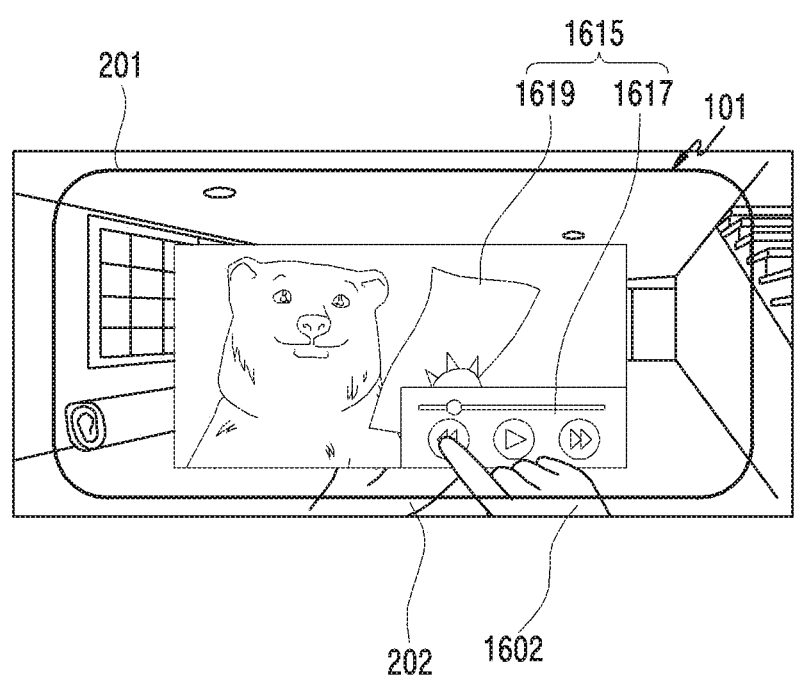
Figure 16D:
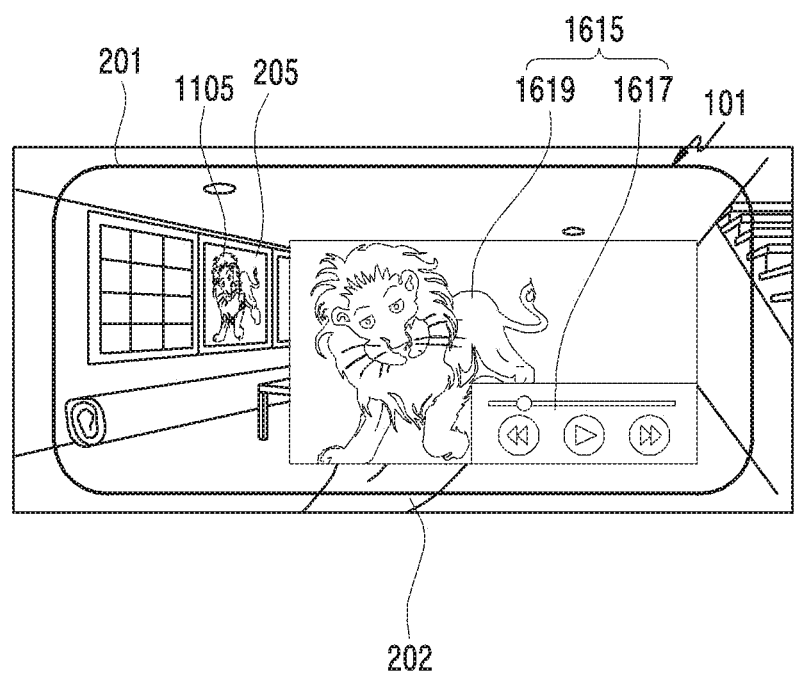

According to another embodiment, if identifying the movement of the external object 202 as shown in FIG. 16A, the processor 120 may display the second content 1615 in relation to the external object 202 in the second area 204 of the display 201 as shown in FIG. 16B. For example, the processor 120 may display control content 1617 for controlling the first content 1105 and third content 1619 corresponding to the first content 1105, as the second content 1615. Next, the processor 120 may control the second content 1615, according to the movement of another external object 1602 as shown in FIG. 16C. For example, the processor 120 may apply a command corresponding to the control content 1617 (e.g., reward rewind, play/stop, or forward) to the third content 1619 on the display 201, based at least on the movement of the another external object 1602. In addition, the processor 120 may apply the selected menu 1617 to the first content 1105. The processor 120 may move the second content 1615, according to the additional movement of the external object 202 as shown in FIG. 16D.

Figure 17A:
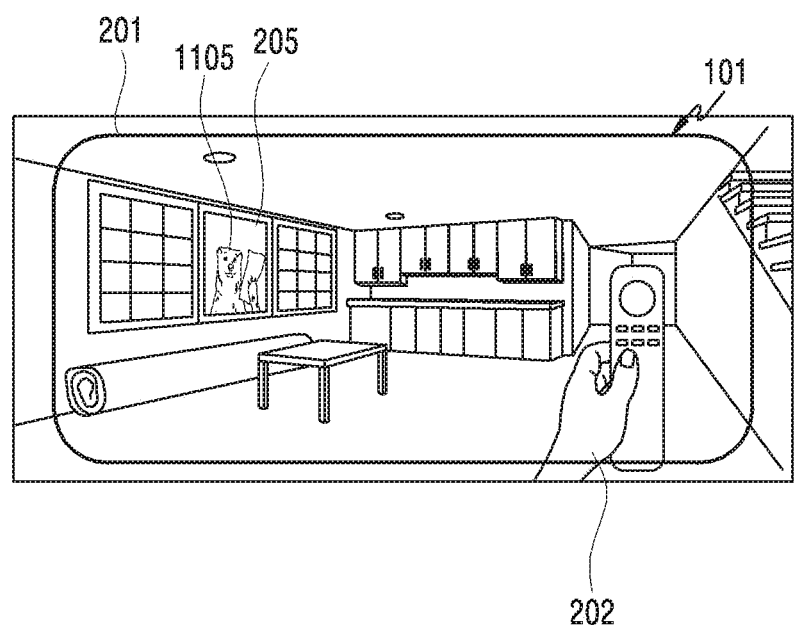
FIG. 17A, FIG. 17B, FIG. 17C and FIG. 17D are exemplary diagrams of a second content providing operation according to another example in FIG. 9.
Figure 17B:
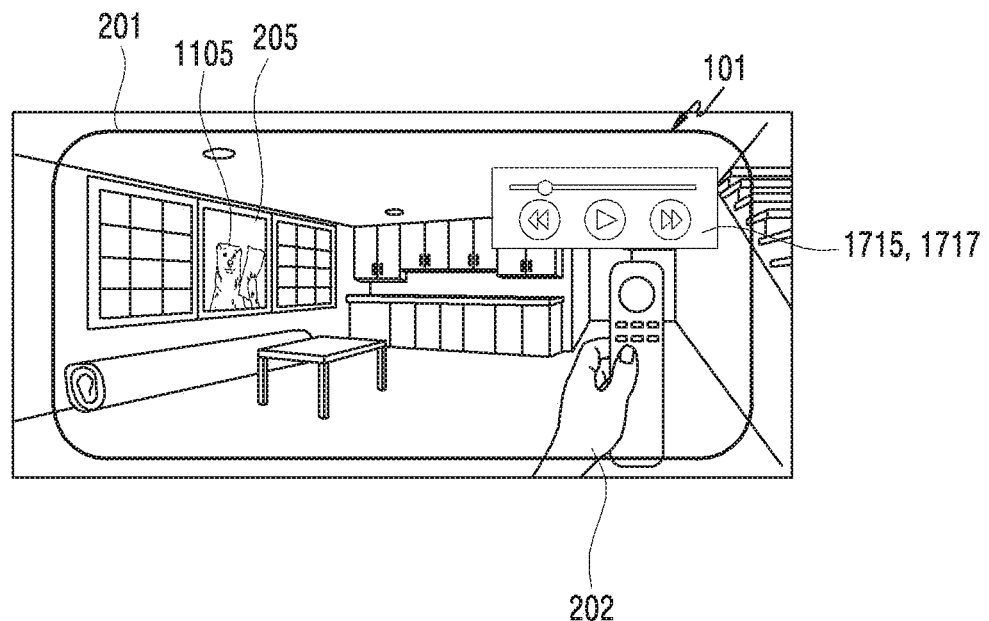
Figure 17C:
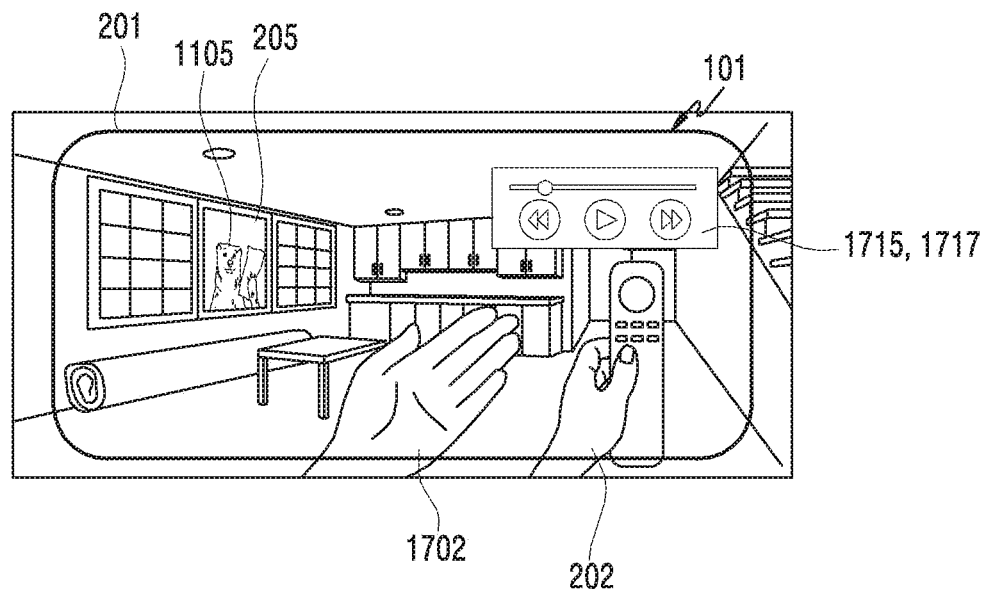
Figure 17D:
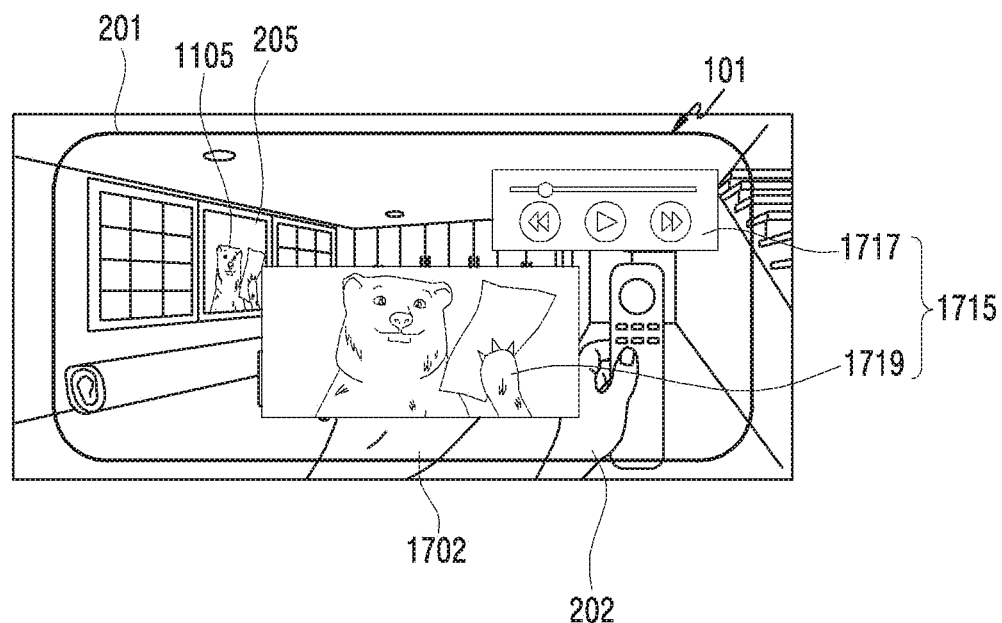
Figure 18A:
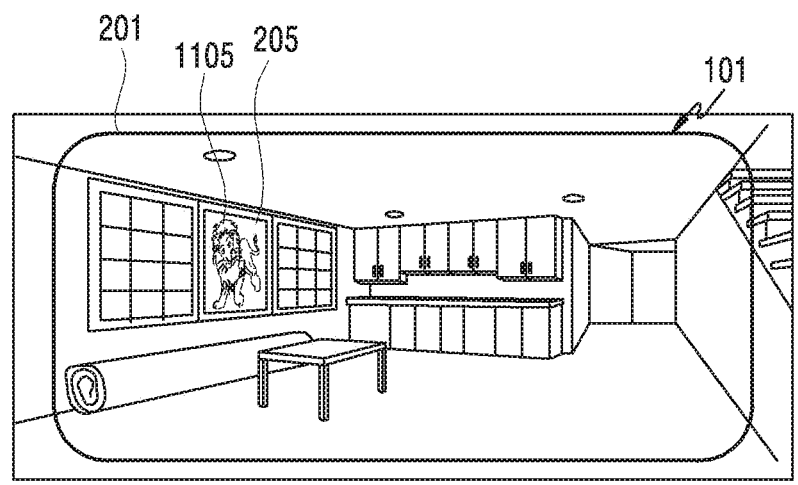
FIG. 18A and FIG. 18B are exemplary diagrams for explaining disappearance of an external object 202 in FIG. 14.
Figure 18B:
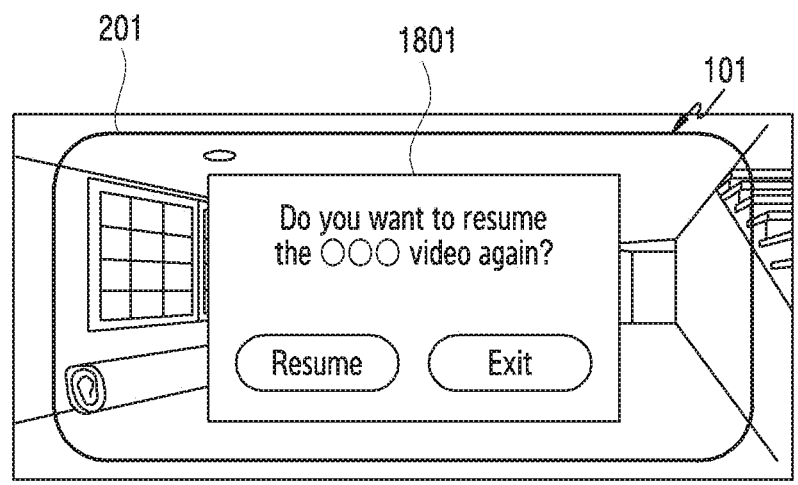

According to another embodiment, if identifying the movement of the external object 202 as shown in FIG. 17A, the processor 120 may display the second content 1715 in relation to the external object 202 in the second area 204 of the display 201 as shown in FIG. 17B. For example, the processor 120 may display control content 1917 for controlling the first content 1105, as the second content 1715. Next, the processor 120 may control the second content 1715, according to the additional movement of the external object 202. For example, the processor 120 may recognize the external object 202, that is, buttons of the remote controller using the camera module 180, and identify a user input for at least one of the buttons of the remote controller using the sensor module 176. Thus, the processor 120 may select the control content 1717 on the display 201, and apply the selected control content 1617 to the first content 1105. Alternatively, if identifying the movement of the another external object 1702 as shown in FIG. 17C, the processor 120 may further display third content 1719, as the second content 1715, corresponding to the first content 1105 as shown in FIG. 17D. The processor 120 may display the third content 1719 in relation to the another external object 1702. Next, according to the additional movement of the external object 202, the processor 120 may select the control content 1717 on the display 201, and apply the selected control content 1717 to the first content 1105 and the second content 1719.

The electronic device 101 may determine whether to remove the second content 1515, 1615, and 1715 in operation 1423. While displaying the second content 1515, 1615, and 1715 on the display 201, the processor 120 may continuously identify at least one of the additional movement of the external object 202 or the movement of another external object 1602 and 1702 using the sensor module 176. The processor 120 may determine whether to remove the second content 1515, 1615, and 1715, based on at least one of the additional movement of the external object 202 or the movement of the another external object 1602 and 1702. If the second content 1515, 1615, and 1715 is displayed in relation to the external object 202 on the display 201, the processor 120 may determine whether to remove the second object 1515, 1615, and 1715 based on the additional movement of the external object 202. If the second content 1515, 1615, and 1715 is displayed in relation to the external object 202 and the another external object 1602 and 1702 on the display 201, the processor 120 may determine whether to remove the second object 1515, 1615, and 1715 based on the movements of the external object 202 and the another external object 1602 and 1702. For example, the processor 120 may determine whether at least one of the external object 202 or the another external object 1602 and 1702 disappears on the display 201 (e.g., leaves the recognition range through the camera module 180 or the sensor module 176). As another example, the processor 120 may determine whether at least one of the additional movement of the external object 202 or the movement of the another external object 1602 and 1702 is a preset movement (e.g., clenching a fist).

If determining to remove the second content 1515, 1615, and 1715 in operation 1423, the electronic device 101 may remove the second content 1515, 1615, and 1715 in operation 1425. For example, if at least one of the external object 202 or the another external object 1602 and 1702 disappears on the display 201, the processor 120 may remove the second content 1515, 1615, and 1715. As another example, if at least one of the additional movement of the external object 202 or the movement of the another external object 1602 and 1702 is the preset movement, the processor 120 may remove the second content 1515, 1615, and 1715. The processor 120 may display the first content 1105 in the candidate area 205, even if the second content 1515, 1615, and 1715 is removed from the second area 204. According to an embodiment, after removing the second content 1515, 1615, and 1715, the processor 120 may display a message 1801 for asking whether to continuously display the first content 1105 as shown in FIG. 18A. The processor 120 may display the first content 1105 in the display area 205 of the second area 204 as shown in FIG. 18B, based on a user input for continuously displaying the first content 1105.

Figure 19:
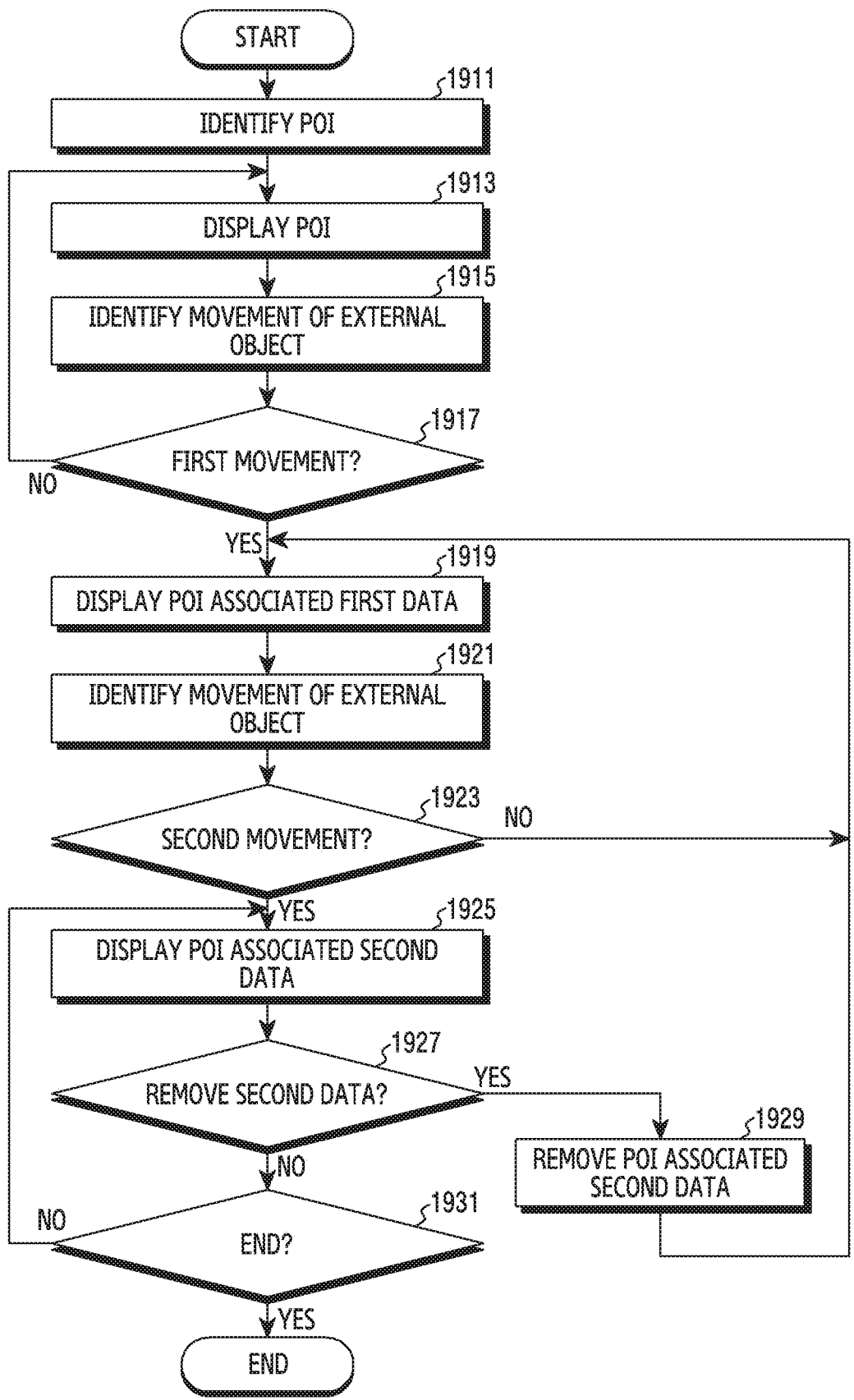
FIG. 19 is a flowchart of an operating method of an electronic device according to an embodiment.

FIG. 19 is a flowchart of an operating method of an electronic device 101 according to an embodiment. FIG. 20A, FIG. 20B, FIG. 20C, FIG. 20D and FIG. 20E are exemplary diagrams of an operating method of an electronic device 101 according to an embodiment.

Figure 20A:
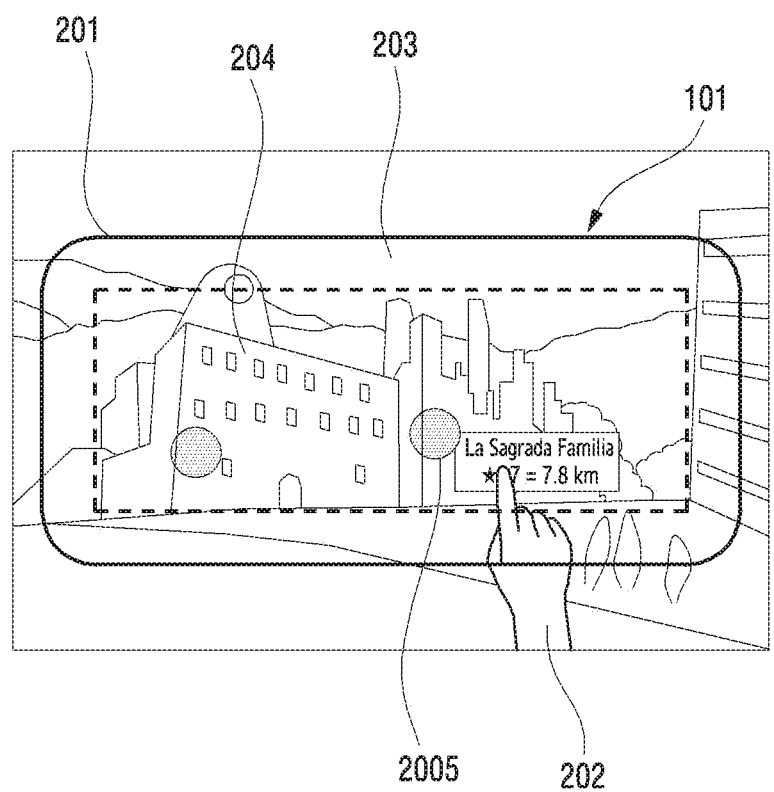
FIG. 20A, FIG. 20B, FIG. 20C, FIG. 20D and FIG. 20E are exemplary diagrams of an operating method of an electronic device according to an embodiment.

Referring to FIG. 19, the electronic device 101 may identify at least one point of interest (POI) 2005 in operation 1911. The processor 120 may determine location information for a current location of the electronic device 101 using the communication module 190. The processor 120 may identify the POI based on the location information. The electronic device 101 may display the POI 2005 on the display 201 in operation 1913. The electronic device 101 may display the POI 2005 as first content. The electronic device 101 may display the POI 2005, to superimpose on the real environment through the display 201. The processor 120 may display the POI 2005 in at least part of the second area 204 on the display 201 as shown in FIG. 20A.

The electronic device 101 may display the POI 2005 on the display 201, and identify the movement of the external object 202 in operation 1915. While displaying the POI 2005 in the second area 204, the processor 120 may identify the movement of the external object 202 in the visible direction of the user wearing the electronic device 101 on his/her face through the display 201. In operation 1917, the electronic device 101 may determine whether the movement of the external object 202 is a first movement for selecting the POI 2005.

Figure 20B:
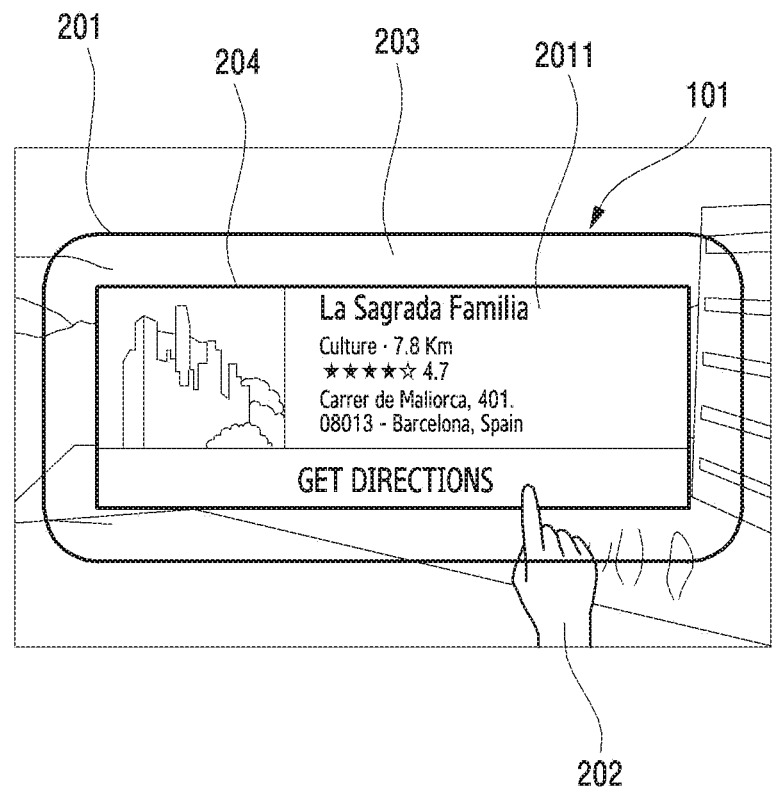
Figure 20C:
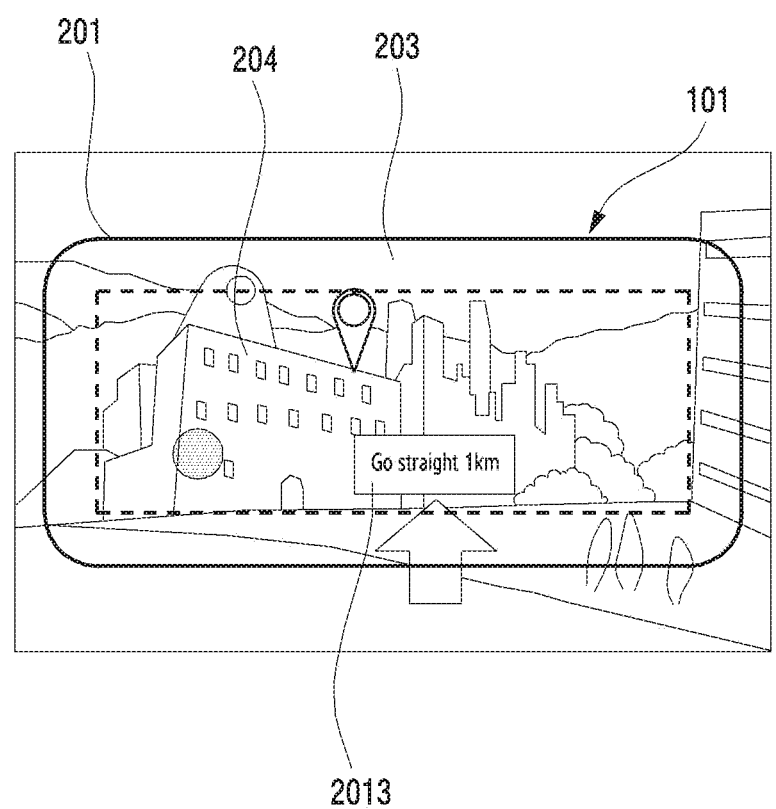

If determining in operation 1917 that the movement of the external object 202 is the first movement, the electronic device 101 may display first data 2011 associated with the selected POI 2005 on the display 201 in operation 1919. The electronic device 101 may display the first data 2011 to superimpose on the real environment through the display 201. The processor 120 may display the first data 2011 and 2013 associated with the selected POI 2005 in at least part of the second area 204 as shown in FIG. 20B or FIG. 20C. For example, the first data 2011 may include detailed data 2011, for example, at least one of an address or a distance from the current location, about the selected POI 2005 as shown in FIG. 20B, and may include road guide data 2013 for the selected POI 2005 as shown in FIG. 20C.

Figure 20D:
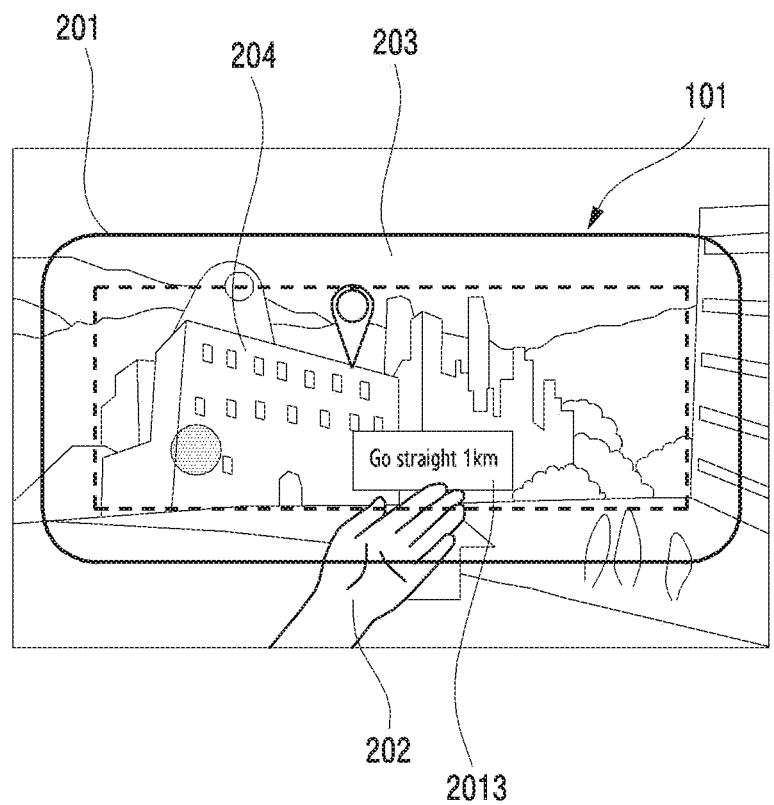

The electronic device 101 may identify the movement of the external object 202, while displaying the first data 2011 and 2013 on the display 201 in operation 1921. While displaying the first data 2011 and 2013 in the second area 204, the processor 120 may identify the movement of the external object 202 in the visible direction of the user wearing the electronic device 101 on his/her face through the display 201. The electronic device 101 may determine whether the movement of the external object 202 is a second movement for displaying the second data 2015 associated with the selected POI 2005 in operation 1923. The processor 120 may determine whether the movement of the external object 202 is the second movement as shown in FIG. 20D.

Figure 20E:
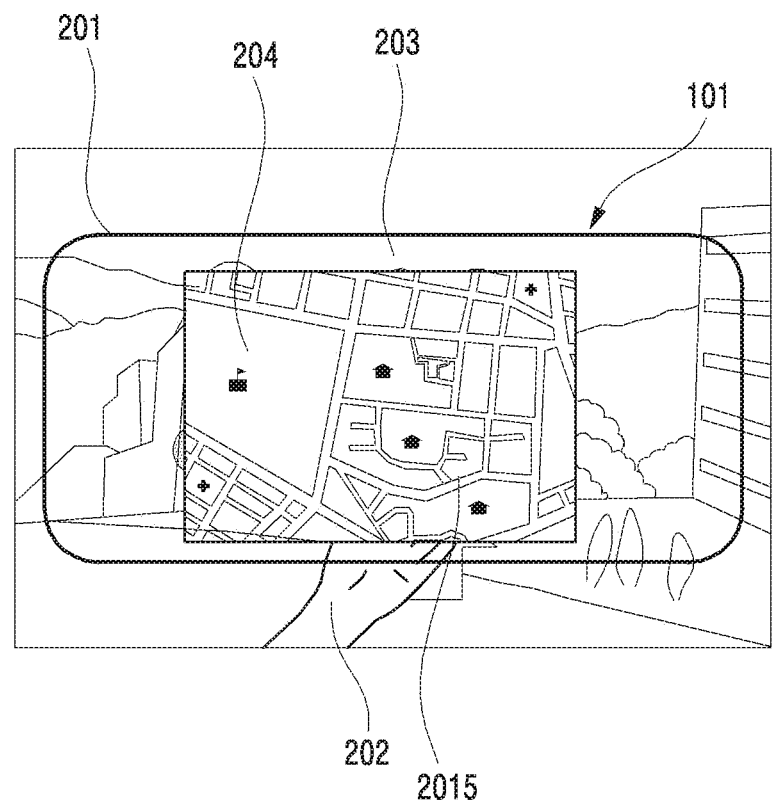

If determining in operation 1923 that the movement of the external object 202 is the second movement, the electronic device 101 may display the second data 2015 associated with the selected POI 2005 on the display 201 in operation 1925. The electronic device 101 may display the second data 2015 as the second content. The electronic device 101 may display the second data 2015, to superimpose on the real environment through the display 201. The processor 120 may display the second data 2015 in at least part of the second area 204 on the display 201 as shown in FIG. 20E. For example, the second data 2015 may include map data including the selected POI 2005.

The electronic device 101 may determine whether to remove the second data 2015 in operation 1927. While displaying the second data 2015 on the display 201, the processor 120 may continuously identify the movement of the external object 202 through the sensor module 120. The processor 120 may determine whether to remove the second data 2015, based on an additional movement of the external object 202. For example, the processor 120 may determine whether the external object 202 disappears (e.g., leaves the recognition range through the camera module 180 or the sensor module 176) through the display 201. As another example, the processor 120 may determine whether an additional movement of the external object 202 is a preset movement (e.g., clenching a fist, etc.). If determining to remove the second data 2015 in operation 1927, the electronic device 101 may remove the second data 2015 from the display 201 in operation 1929, and return to operation 1919.

If determining not to remove the second data 2015 in operation 1927, the electronic device 101 may determine in operation 1931 whether not to further display the first data 2011 and the second data 2015. According to an embodiment, the processor 120 may determine whether it arrives at the selected POI 2005. If determining not to further display the first data 2011 and the second data 2015 in operation 1931, the operating method of the electronic device 101 may be finished. If determining to continuously display the first data 2011 and the second data 2015 in operation 1931, the electronic device 101 may return to operation 1925.

Figure 21:
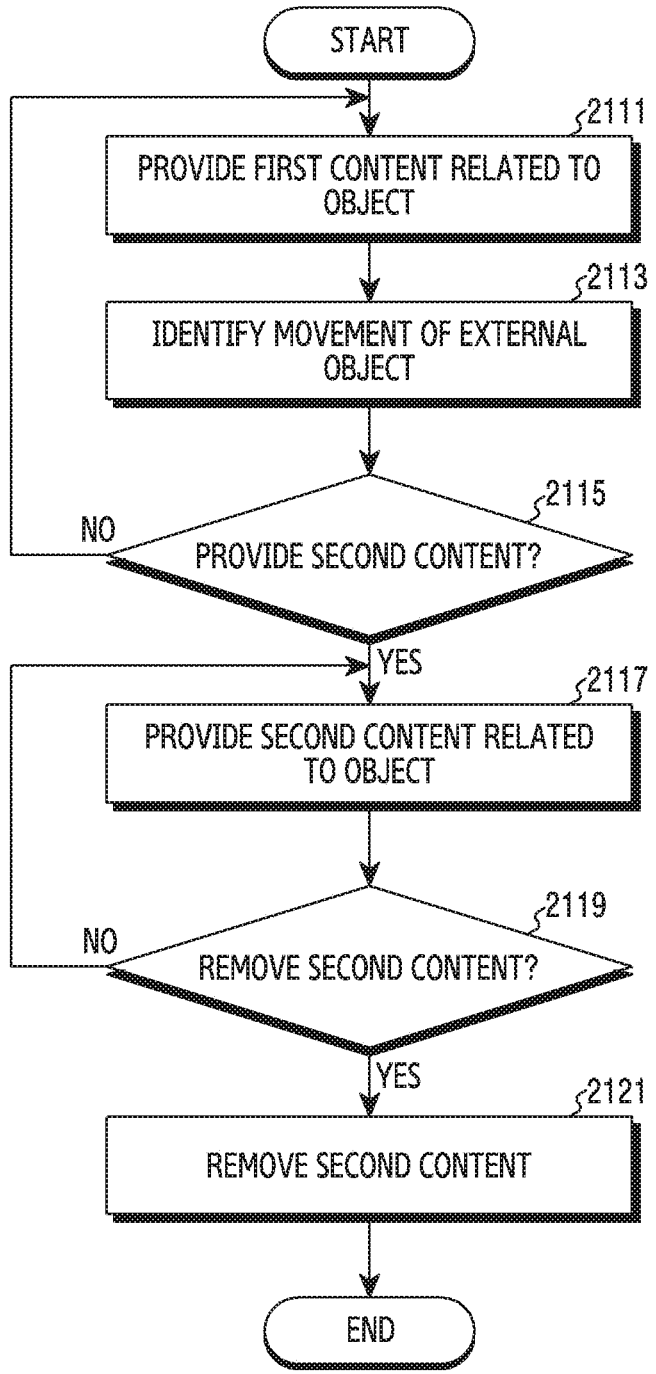
FIG. 21 is a flowchart of an operating method of an electronic device according to another embodiment.

FIG. 21 is a flowchart of an operating method of an electronic device 101 according to another embodiment. FIG. 22A, FIG. 22B, FIG. 22C, FIG. 23A, FIG. 23B, FIG. 23C, FIG. 23D, FIG. 23E, FIG. 24A, FIG. 24B, FIG. 24C, FIG. 24D, FIG. 25A, FIG. 25B, FIG. 25C, FIG. 26A, FIG. 26B, FIG. 26C, FIG. 27A, FIG. 27B, FIG. 27C, FIG. 28A, FIG. 28B and FIG. 28C are exemplary diagrams of an operating method of an electronic device 101 according to another embodiment.

Referring to FIG. 21, the electronic device 101 may provide first content 2205, 2305, 2405, 2505, 2605, 2705, and 2805 related to objects 2200, 2300, 2400, 2500, 2600, 2700, and 2800 through the display 201 in operation 2113. For example, the electronic device 101 may recognize the objects 2200, 2300, 2400, 2500, 2600, 2700, and 2800 from image data captured through the camera module 180. Using the camera module 180, the processor 120 may capture the image data of the visible direction of the user wearing the electronic device 101 on his/her face through the display 201. By analyzing the image data, the processor 120 may recognize the objects 2200, 2300, 2400, 2500, 2600, 2700, 2800 in the visible direction of the user wearing the electronic device 101 on the face through the display 201. Thus, the electronic device 101 may display first content 2205, 2305, 2405, 2505, 2605, 2705, and 2805 related to the object 2200, 2300, 2400, 2500, 2600, 2700, and 2800, to superimpose the first content 2205, 2305, 2405, 2505, 2605, 2705, and 2805 on the real environment through the display 201. The processor 120 may display the first content 2205, 2305, 2405, 2505, 2605, 2705, and 2805 in at least part of the second area 204 on the display 201.

The electronic device 101 may identify the movement of the external object 202, while providing the first content 2205, 2305, 2405, 2505, 2605, 2705, and 2805 through the display 201 in operation 2113. While displaying the first content 2205, 2305, 2405, 2505, 2605, 2705, and 2805 through the second area 204, the processor 120 may identify the movement of the external object 202 in the visible direction of the user of the electronic device 101 through the display 201. The electronic device 101 may determine whether the movement of the external object 202 is to provide second content 2215, 2315, 2415, 2515, 2615, 2715, and 2815 in operation 2115.

If determining in operation 2115 that the movement of the external object 202 is to provide the second content 2215, 2315, 2415, 2515, 2615, 2715, and 2815, the electronic device 101 may provide the second content 2215, 2315, 2415, 2515, 2615, 2715, and 2815 related to the object 2200, 2300, 2400, 2500, 2600, 2700, and 2800 through the display 201 in operation 2117. The electronic device 101 may superimpose and display the second content 2215, 2315, 2415, 2515, 2615, 2715, and 2815 on the real environment through the display 201. The processor 120 may display the second content 2215, 2315, 2415, 2515, 2615, 2715, and 2815 in relation to the external object 202 in at least part of the second area 204 on the display 201.

Figure 22A:
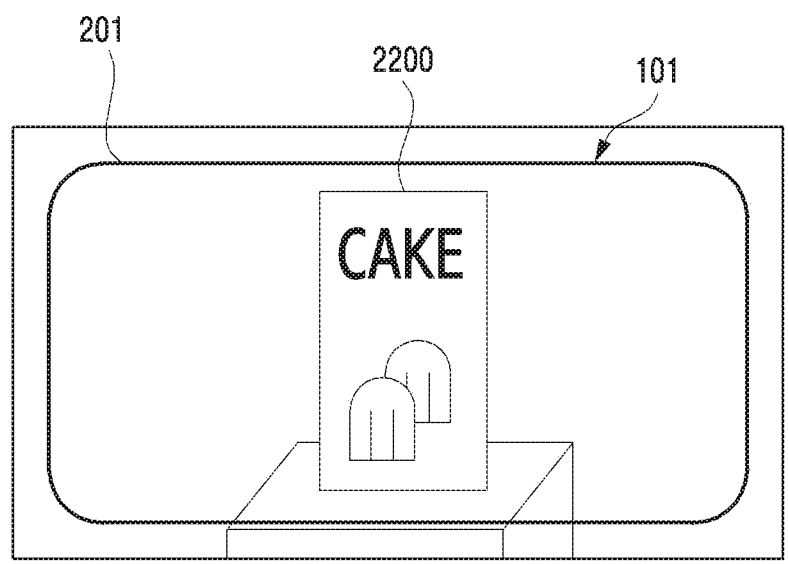
FIG. 22A, FIG. 22B, FIG. 22C, FIG. 23A, FIG. 23B, FIG. 23C, FIG. 23D, FIG. 23E, FIG. 24A, FIG. 24B, FIG. 24C, FIG. 24D, FIG. 25A, FIG. 25B, FIG. 25C, FIG. 26A, FIG. 26B, FIG. 26C, FIG. 27A, FIG. 27B, FIG. 27C, FIG. 28A, FIG. 28B and FIG. 28C are exemplary diagrams of an operating method of an electronic device according to another embodiment.
Figure 22B:
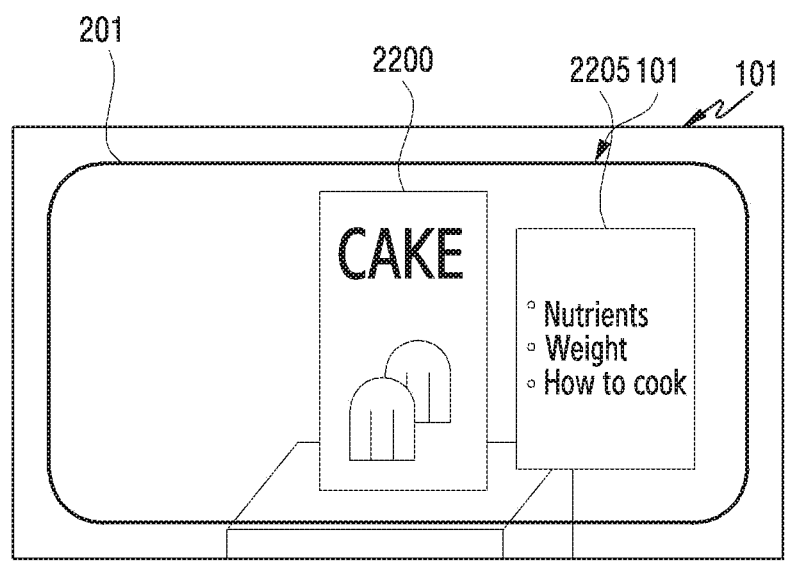
Figure 22C:
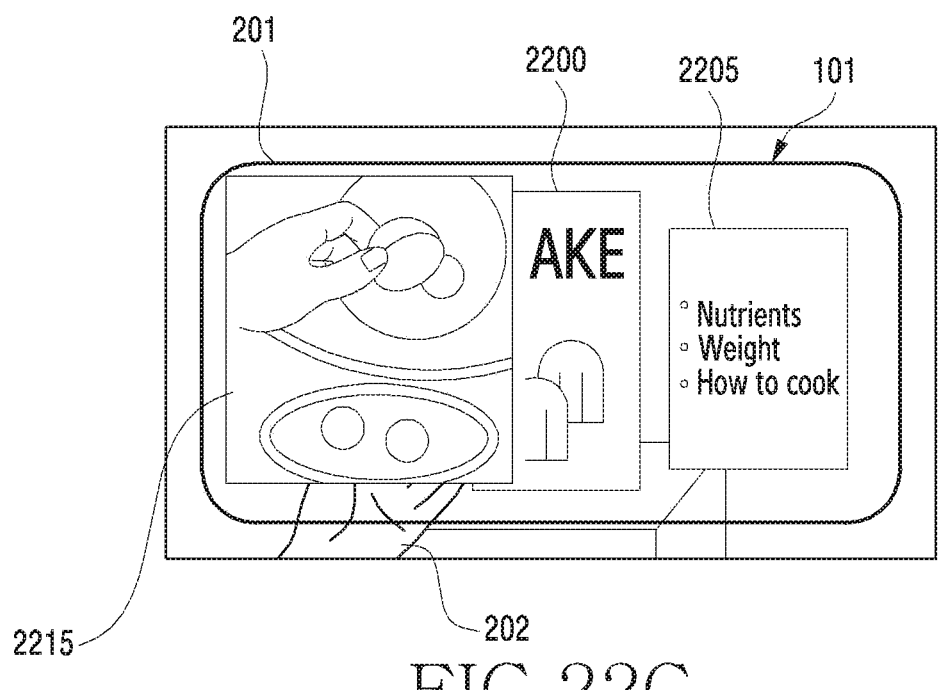

For example, the processor 120 may recognize an object 2200 representing a cake mix from image data captured through the camera module 180 as shown in FIG. 22A. Correspondingly, the processor 120 may display the first content 2205 indicating detailed data of the cake mix, for example, ingredients, nutrients, weight, cooking method, and so on through the display 201 as shown in FIG. 22B. Next, if identifying the movement of the external object 202, the processor 120 may display video data explaining how to cook the cake using the cake mix as the second content 2215, in relation to the external object 202 on the display 201 as shown in FIG. 22C.

Figure 23A:
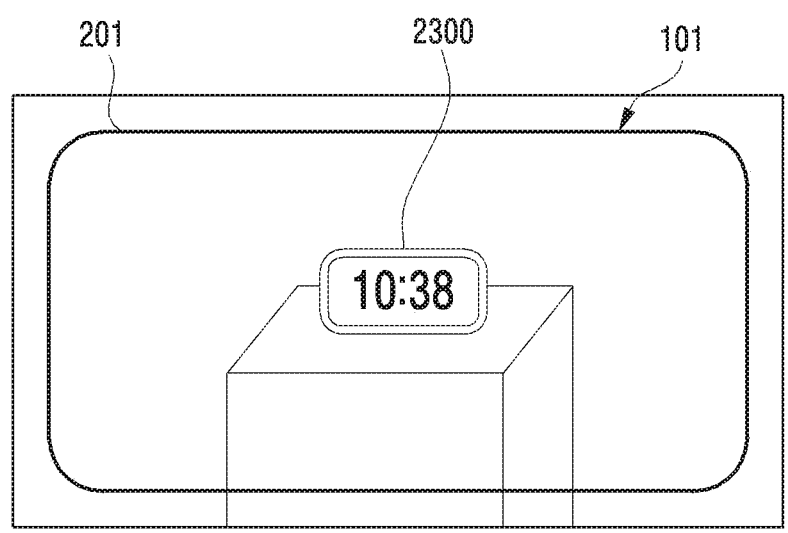
Figure 23B:
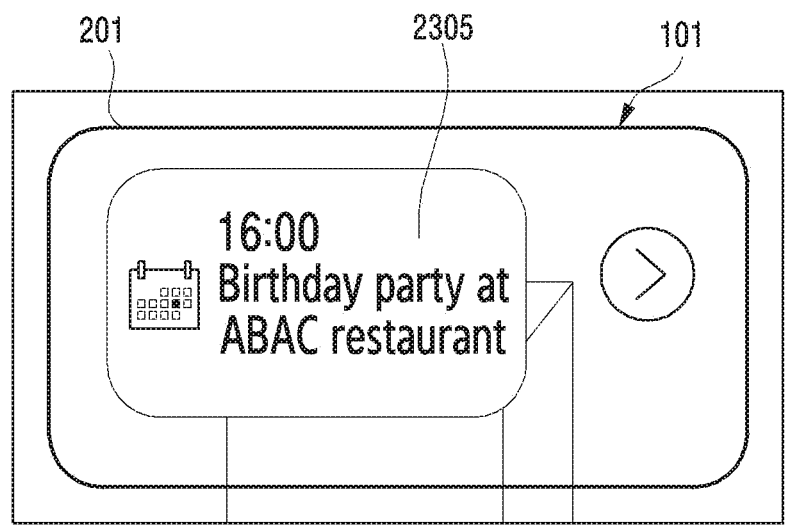
Figure 23C:
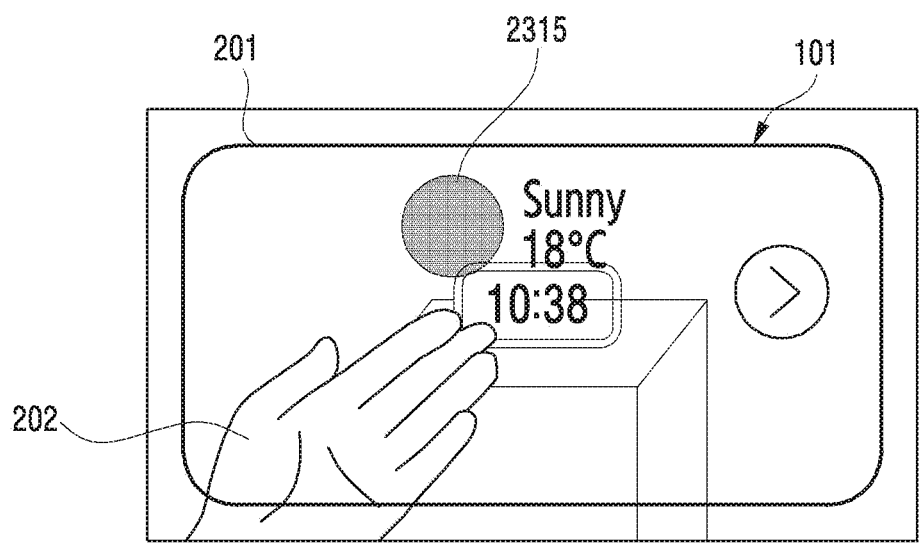
Figure 23D:
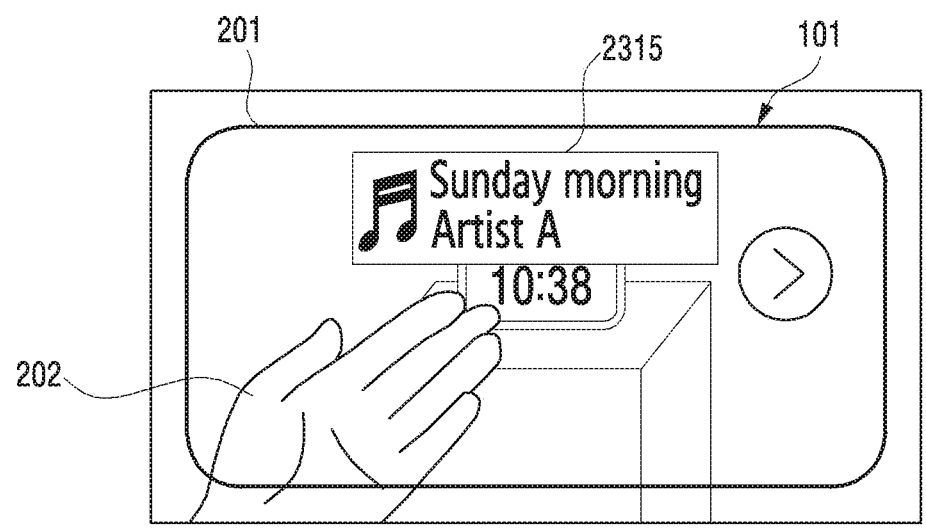
Figure 23E:
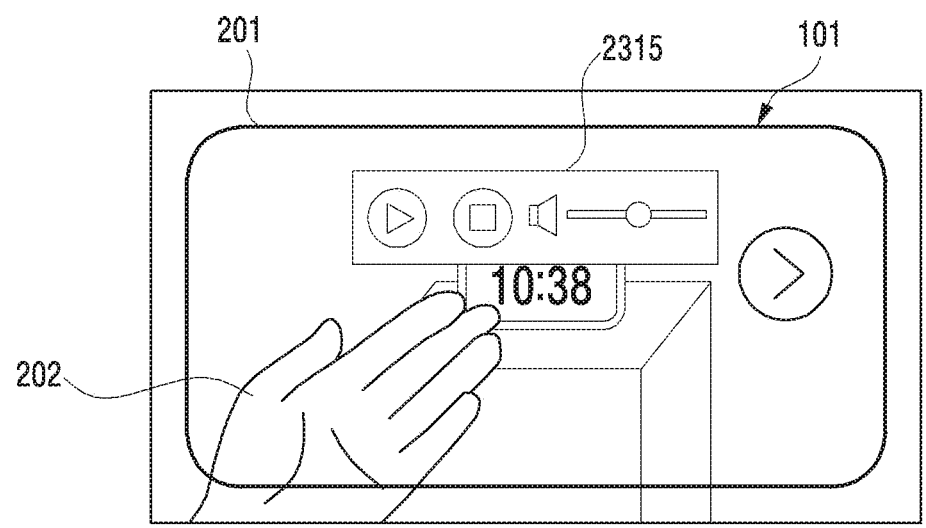

As another example, the processor 120 may recognize an object 2300 representing a clock from image data captured through the camera module 180 as shown in FIG. 23A. Correspondingly, the processor 120 may display first content 2305 indicating at least one schedule on the display 201 as shown in FIG. 23B. The processor 120 may display a schedule in chronological order from current time represented through the clock. Next, if identifying the movement of the external object 202, the processor 120 may display at least one of weather data related to the schedule or route guide data in the schedule as second content 2315, in relation to the external object 202 on the display 201 as shown in FIG. 23C. Alternatively, if identifying the movement of the external object 202, the processor 120 may display the second content 2315 indicating recommended music, in relation to the external object 202 on the display 201 as shown in FIG. 23D. The processor 120 may play the recommended music, while displaying the second content 2315. In addition, the processor 120 may control the recommended music, based on the movement of the external object 202 or another external object (not shown). Alternatively, if identifying the movement of the external object 202, the processor 120 may control the second content 2315 as control content for controlling an alarm, in relation to the external object 202 on the display 201 as shown in FIG. 23E. Thus, the processor 120 may control the alarm, by controlling the second content 2315, based on the movement of the external object 202 or another external object (not shown). Similarly, the processor 120 may recognize a remote device through the display 201, and thus control an operation of the remote device.

Figure 24A:
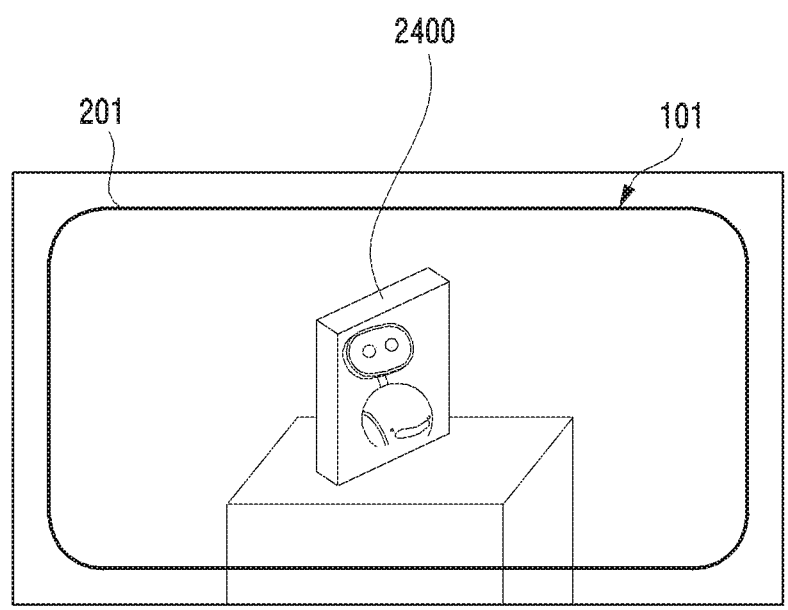
Figure 24B:
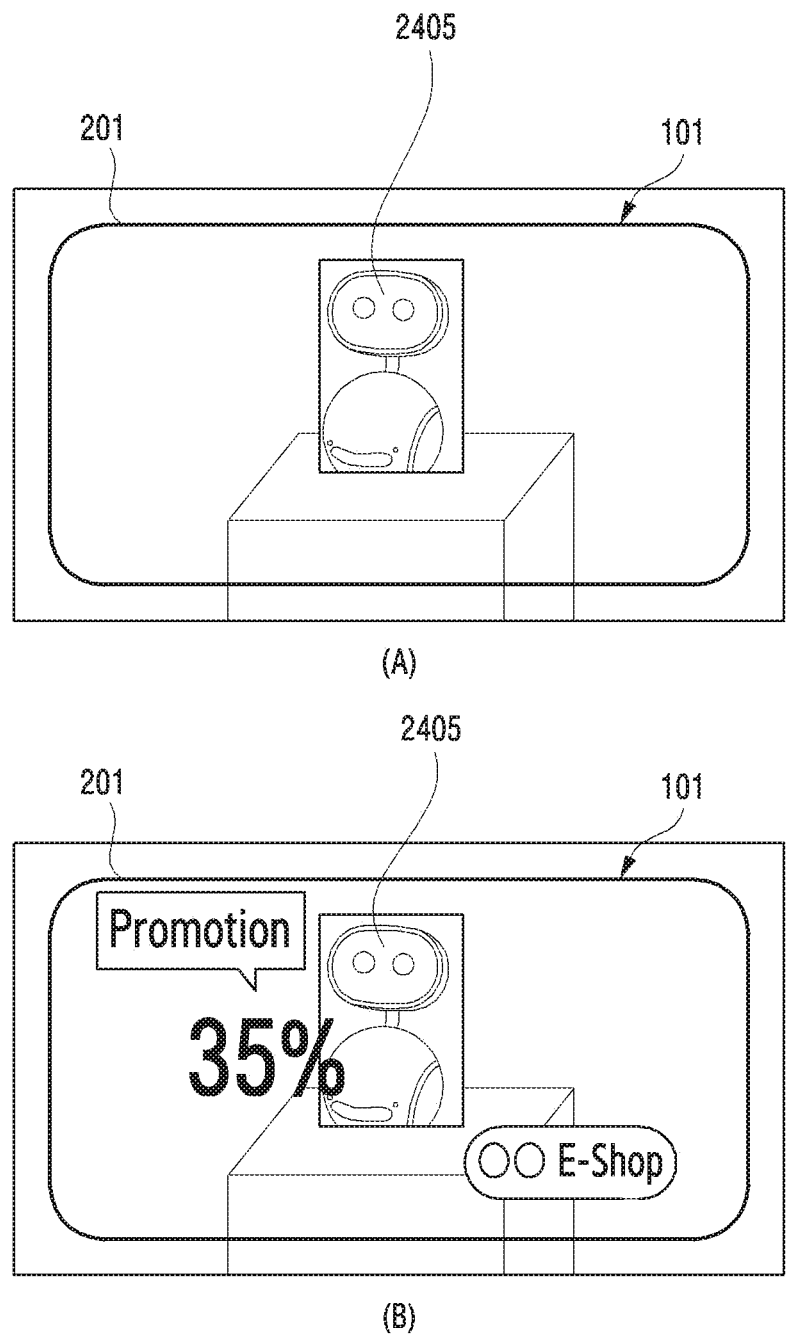
Figure 24C:
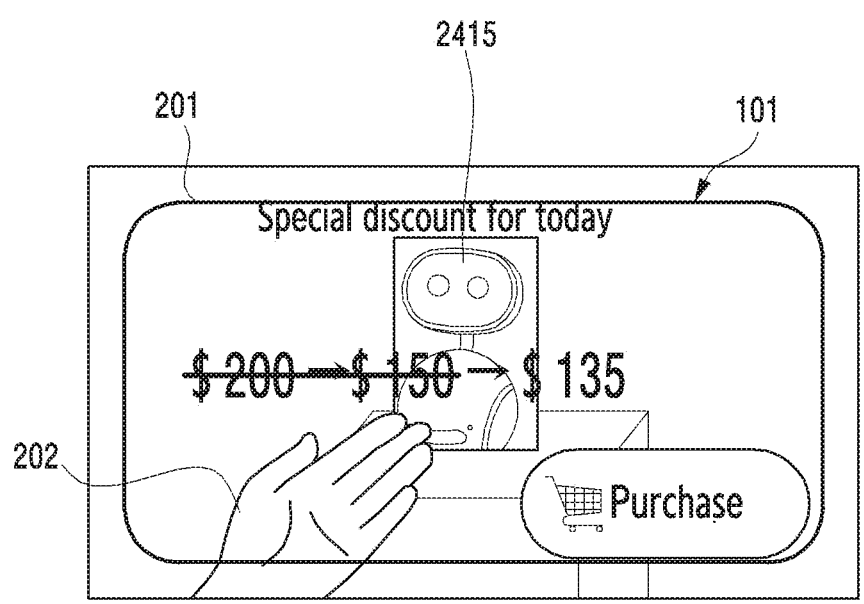
Figure 24D:
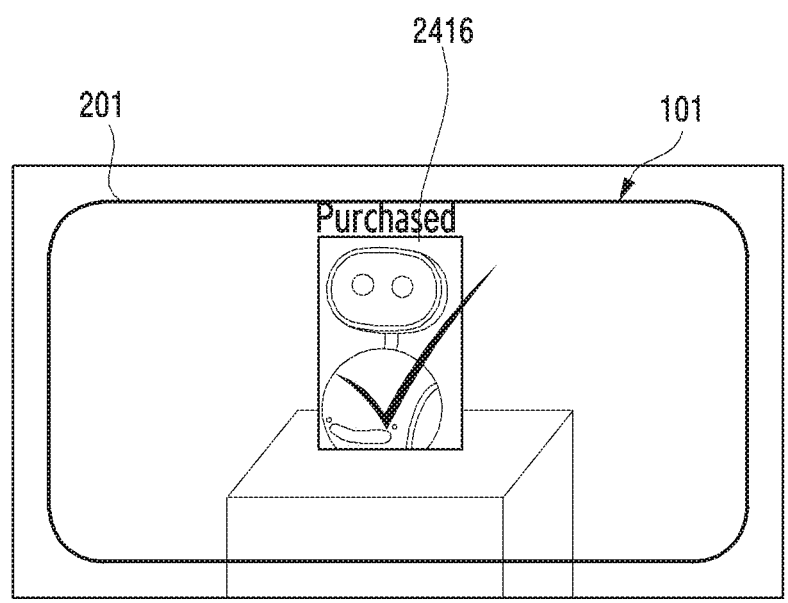

As another example, the processor 120 may recognize an object 2400 representing a plastic model from image data captured through the camera module 180 as shown in FIG. 24A. Correspondingly, the processor 120 may display first content 2405 indicating a complete assembly of the plastic model on the display 201 as shown in (a) of FIG. 24B. Alternatively, the processor 120 may display the first content 2405 indicating sales information of the plastic model on the display 201 as shown in (b) of FIG. 24B. Next, if identifying the movement of the external object 202, the processor 120 may display second content 2415 indicating data for purchasing the plastic model, for example, a price, in relation to the external object 202 on the display 201 as shown in FIG. 24C. Thus, the processor 120 may perform a purchase procedure for the plastic model, based on the second content 2415. Next, if finishing the purchase procedure for the plastic model, the processor 120 may display a purchase complete message 2416 on the display 201 as shown in FIG. 24D.

Figure 25A:
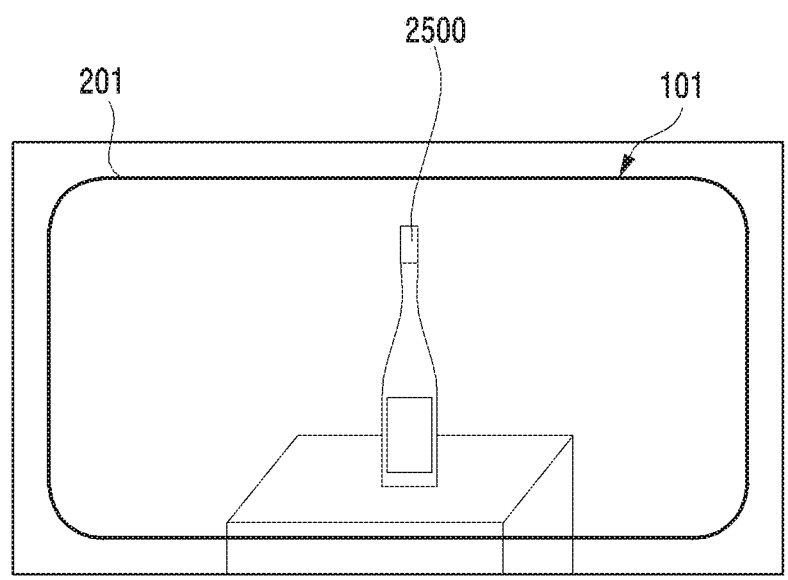
Figure 25B:
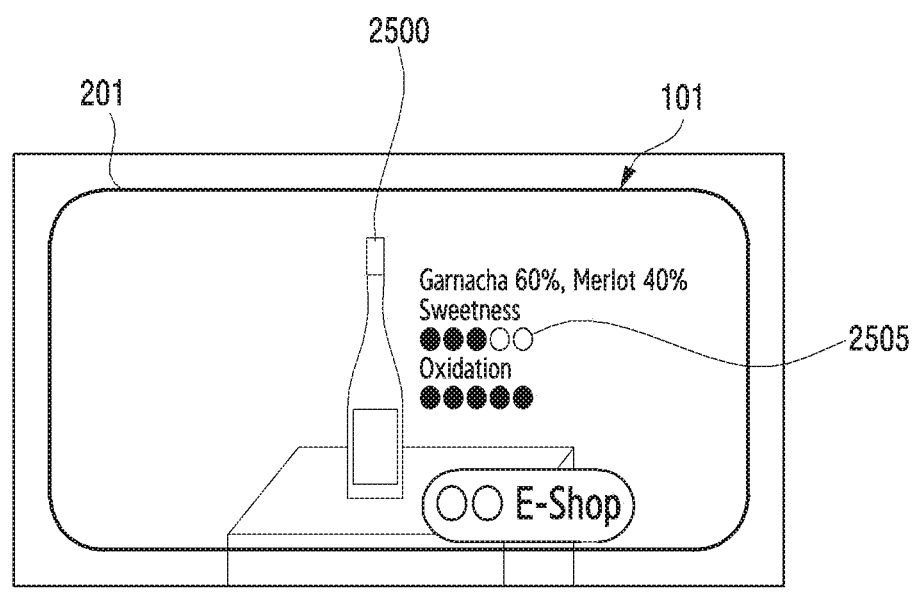
Figure 25C:
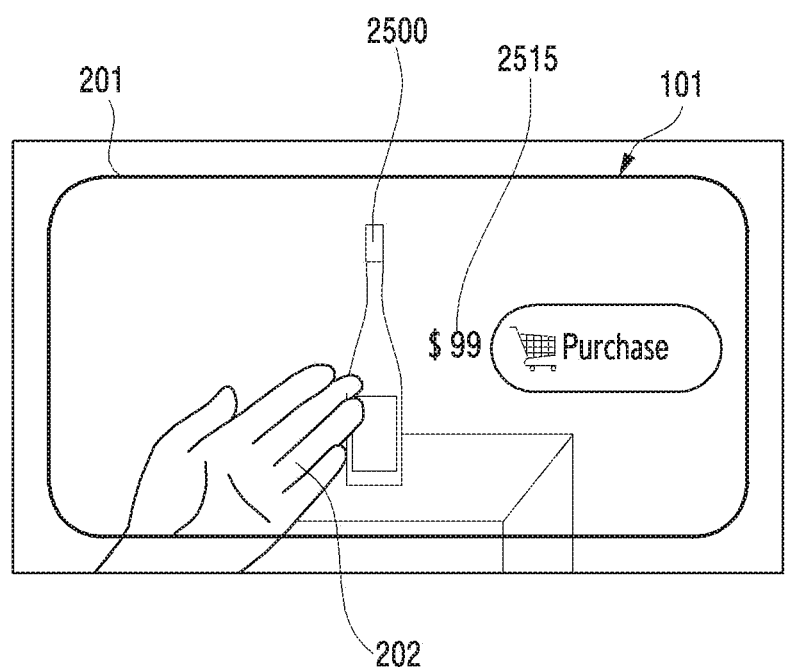

As another example, the processor 120 may recognize an object 2500 representing wine from image data photographed through the camera module 180 as shown in FIG. 25A. Correspondingly, the processor 120 may display first content 2505 indicating detailed data of the wine, such as, grape varieties, status (e.g., sugar content, acidity, maturity), and so on, on the display 201 as shown in FIG. 25B. Next, if identifying the movement of the external object 202, the processor 120 may display second content 2515 indicating data for purchasing the wine, for example, a price, in relation to the external object 202 on the display 201 as shown in FIG. 25C. Thus, the processor 120 may perform a purchase procedure for the wine, based on the second content 2515.

Figure 26A:
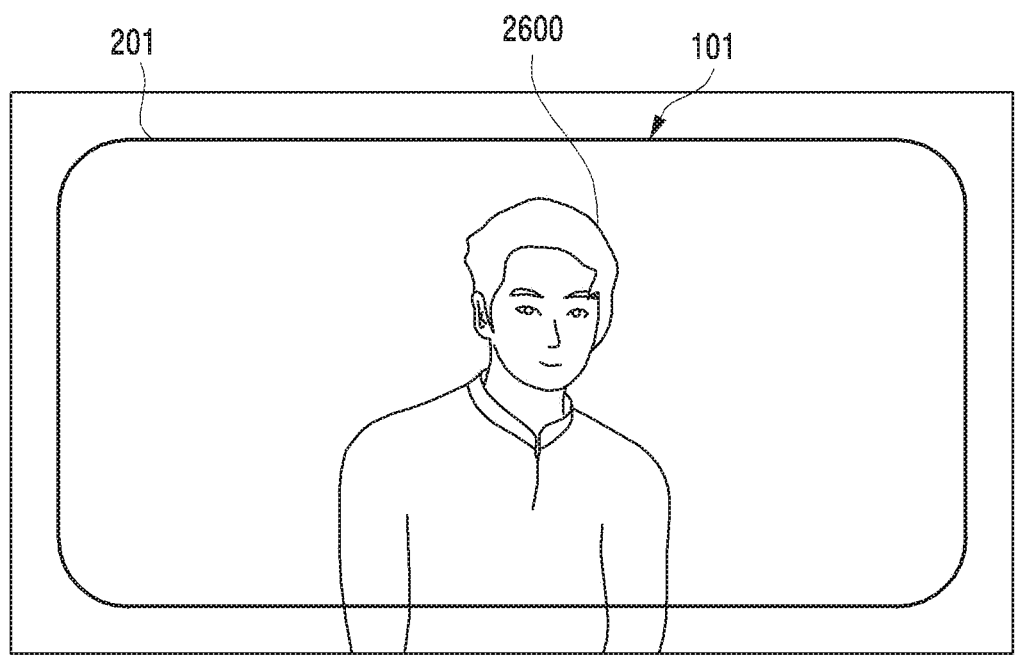
Figure 26B:
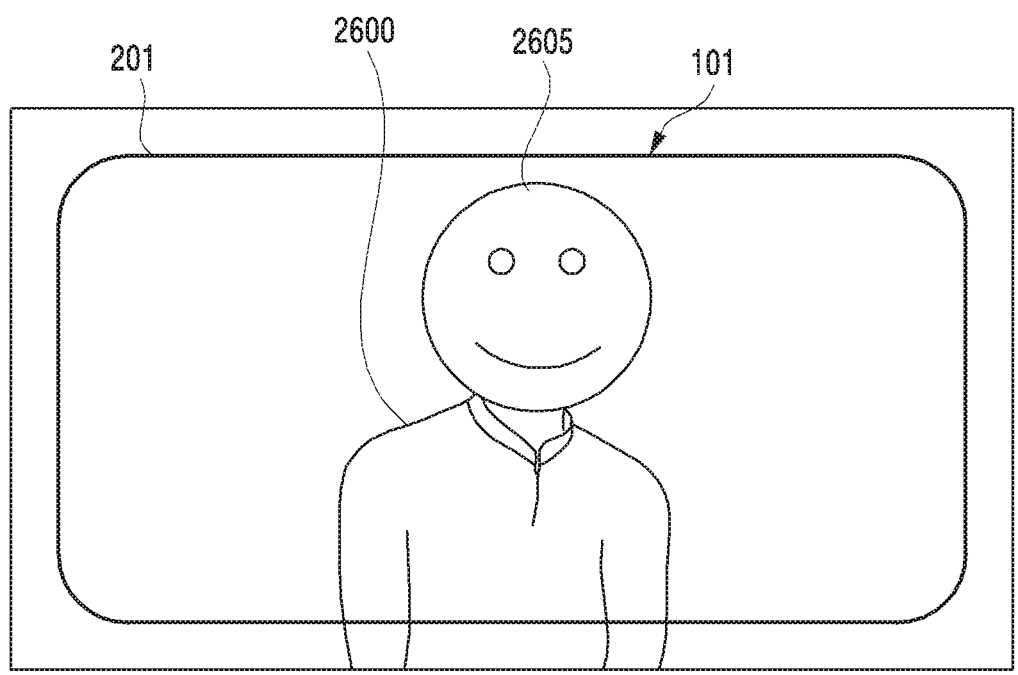
Figure 26C:
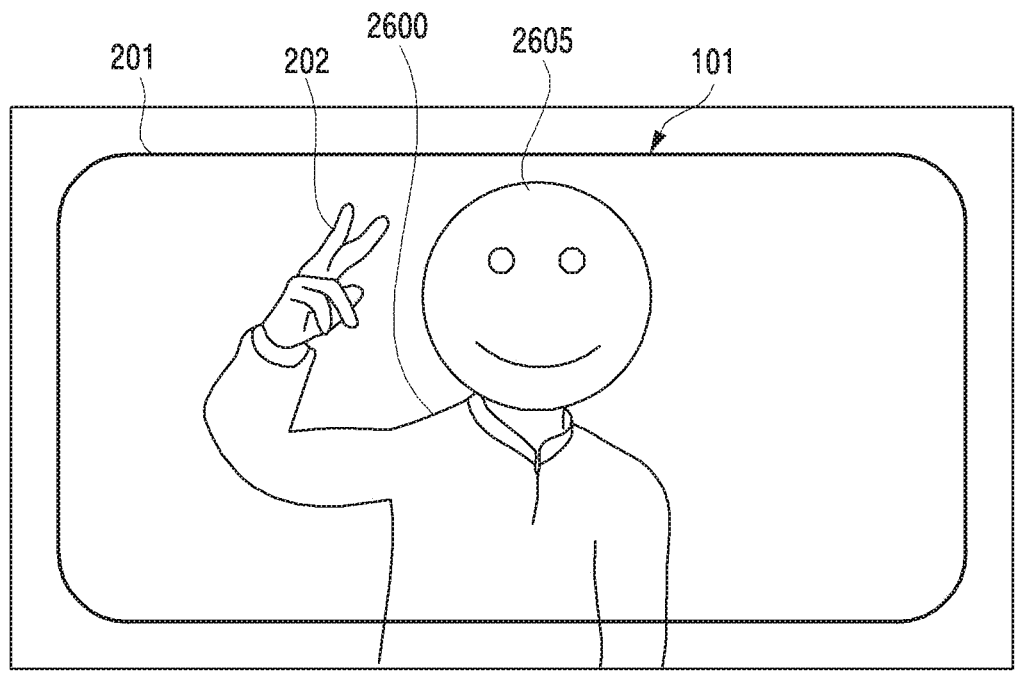
Figure 26C:
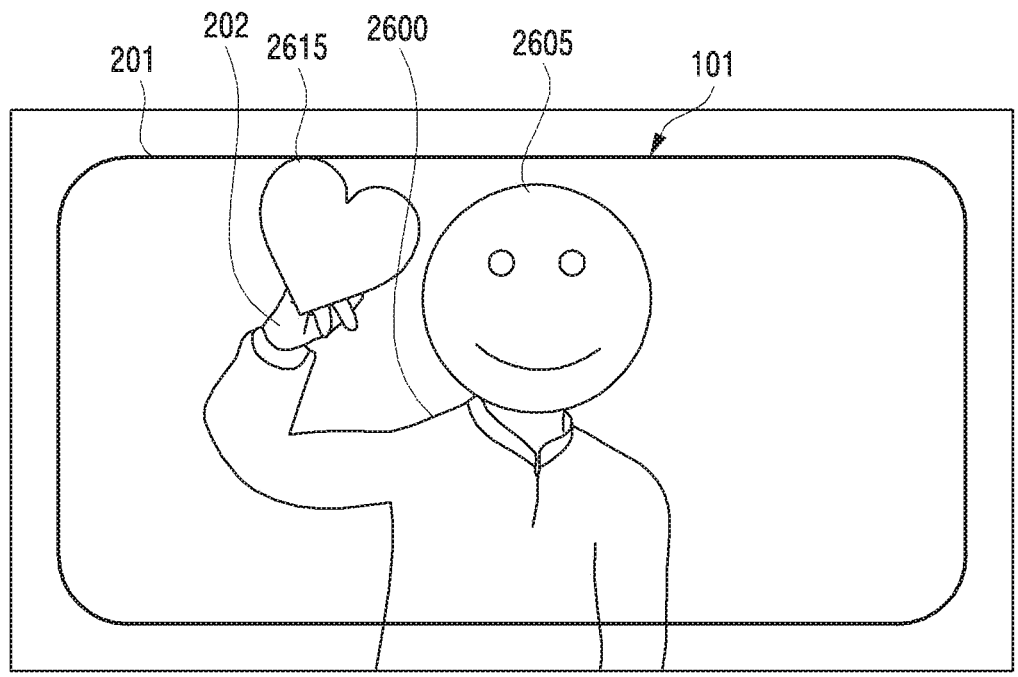

As another example, the processor 120 may recognize an object 2600 representing a face from image data captured through the camera module 180 as shown in FIG. 26A. Correspondingly, the processor 120 may display first content 2605 representing an avatar, in relation to the object 2600 on the display 201 as shown in FIG. 26B. Next, if identifying the movement of the external object 202 as shown in (a) of FIG. 26C, the processor 120 may display second content 2615 such as graphic animation, in relation to the external object 202 on the display 201 as shown in (b) of FIG. 26C. Thus, the processor 120 may store at least one of the first content 2605 or the second content 2615 together with image data, according to a user input received through the input device 150 or the communication module 190.

Figure 27A:
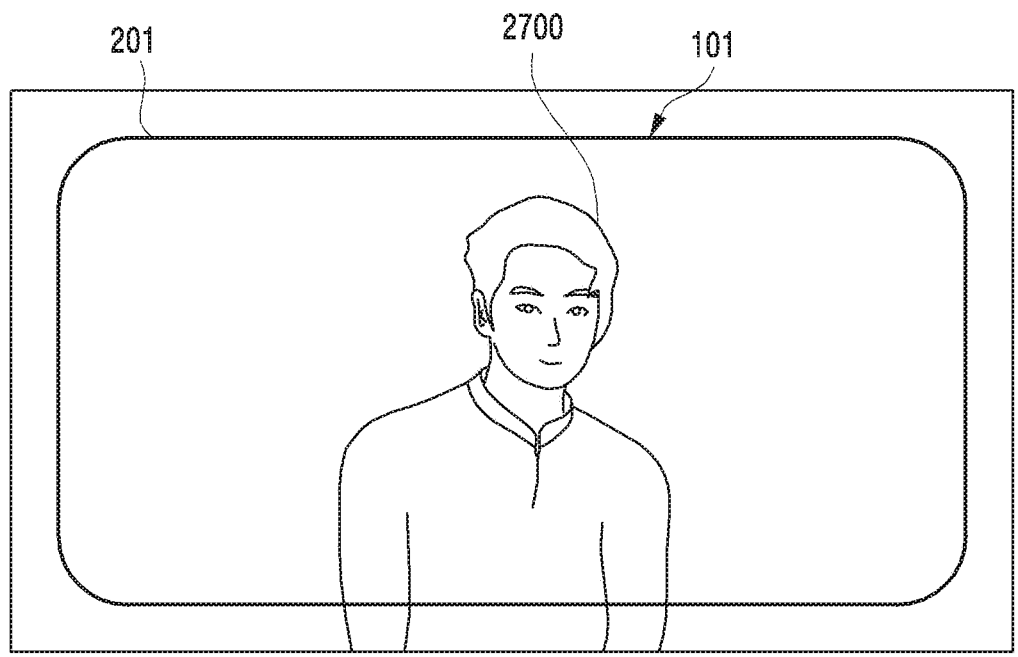
Figure 27B:
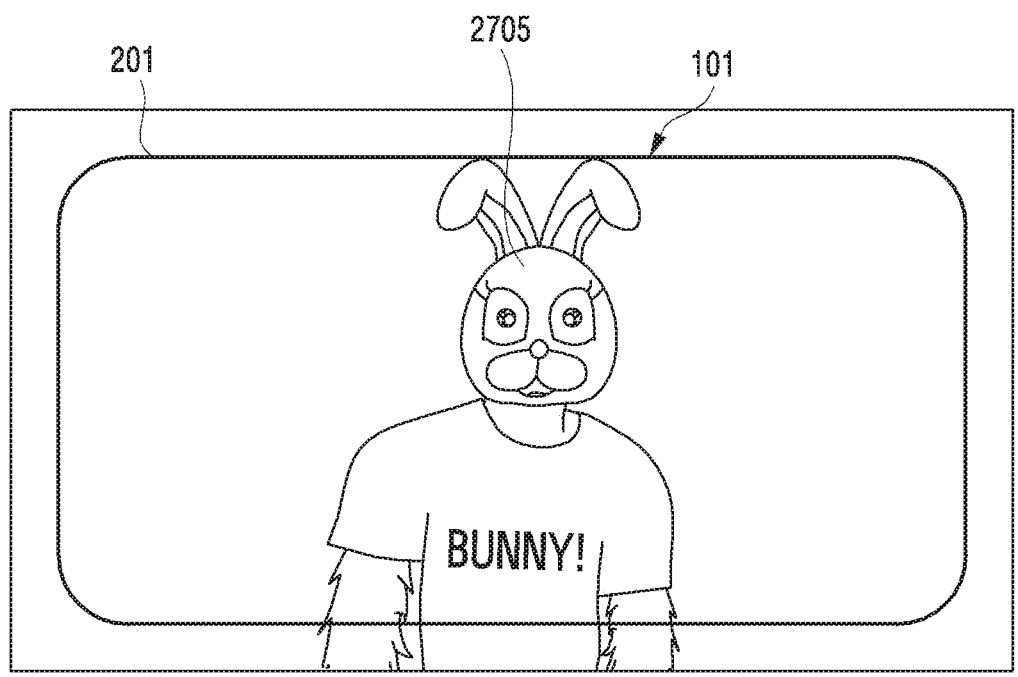
Figure 27C:
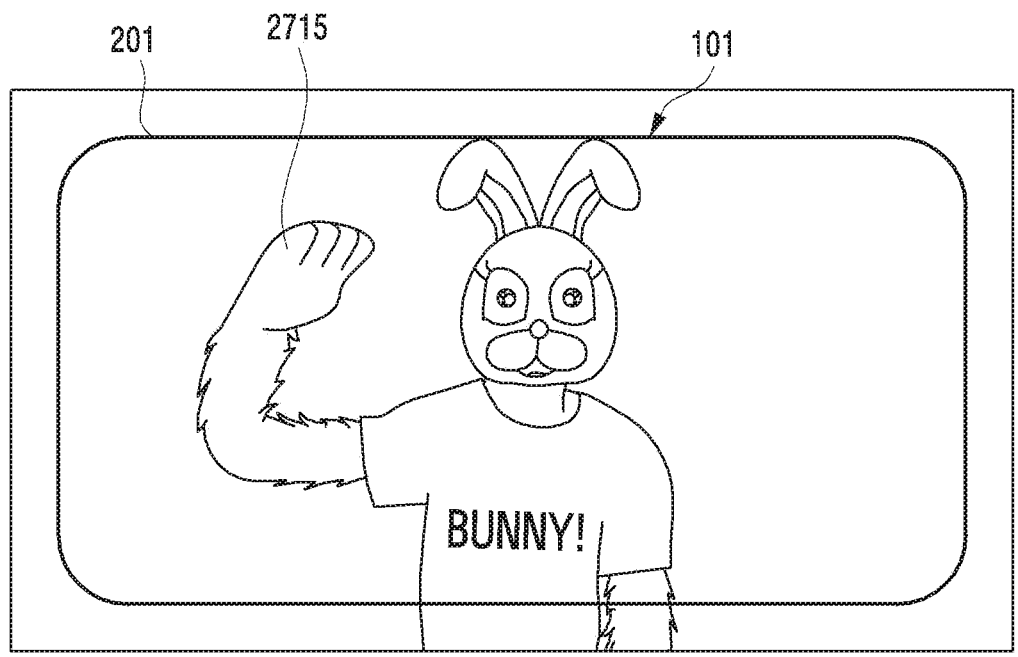

As another example, the processor 120 may recognize an object 2700 representing a face from an image captured through the camera module 180 as shown in FIG. 27A. Correspondingly, the processor 120 may display first content 2705 representing an avatar, such as a 3D character, in relation to the object 2700 on the display 201 as shown in FIG. 27B. Next, if identifying the movement of the external object 202 while displaying the first content 2705, the processor 120 may determine whether the movement of the external object 202 is a preset movement, for example, a preset shape. If the movement of the external object 202 is the preset movement, the processor 120 may display the second content 2715 with graphic animation as if the 3D character moves along the movement of the external object 202, in relation to the external object 202 on the display 201 as shown in FIG. 27C. Thus, the processor 120 may store at least one of the first content 2705 or the second content 2715 together with the image data, according to a user input received through the input device 150 or the communication module 190.

Figure 28A:
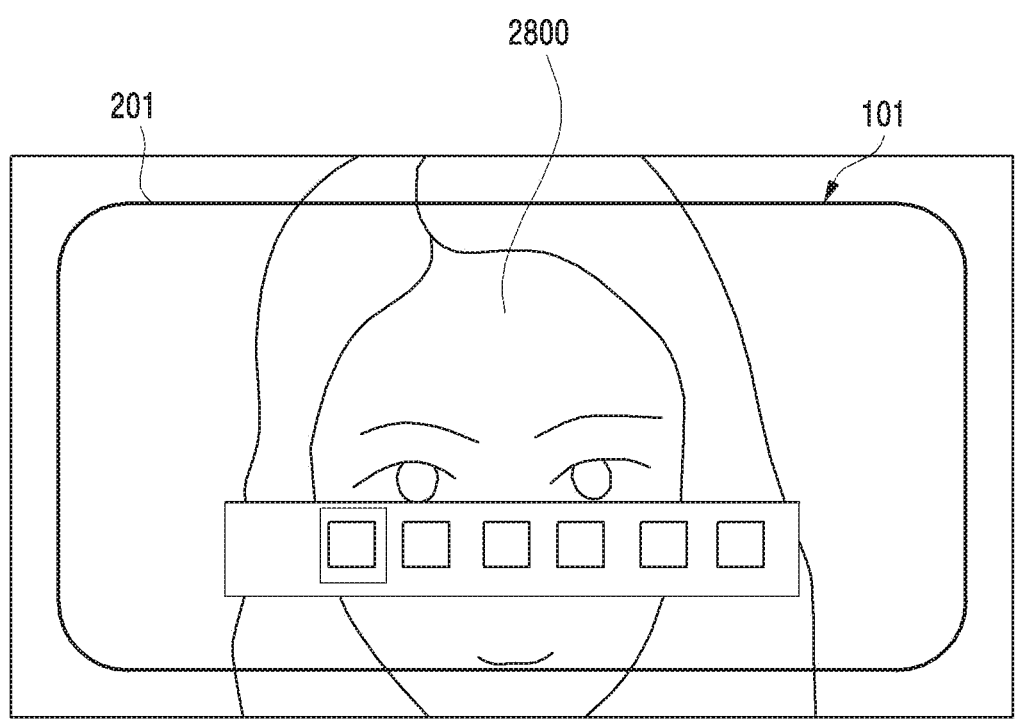
Figure 28B:
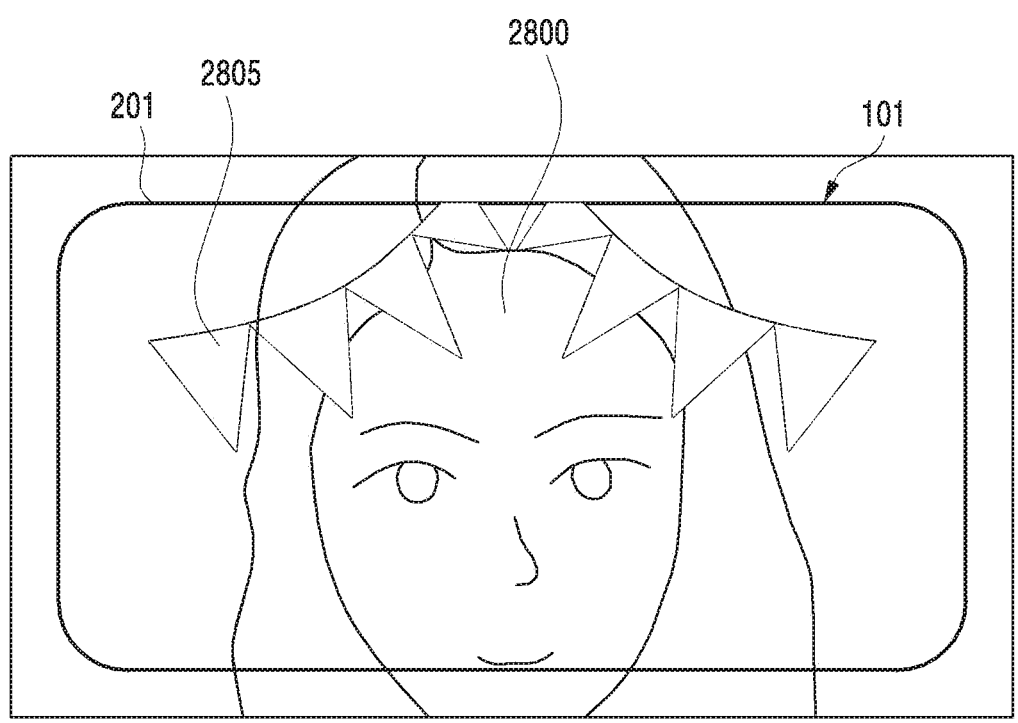
Figure 28C:
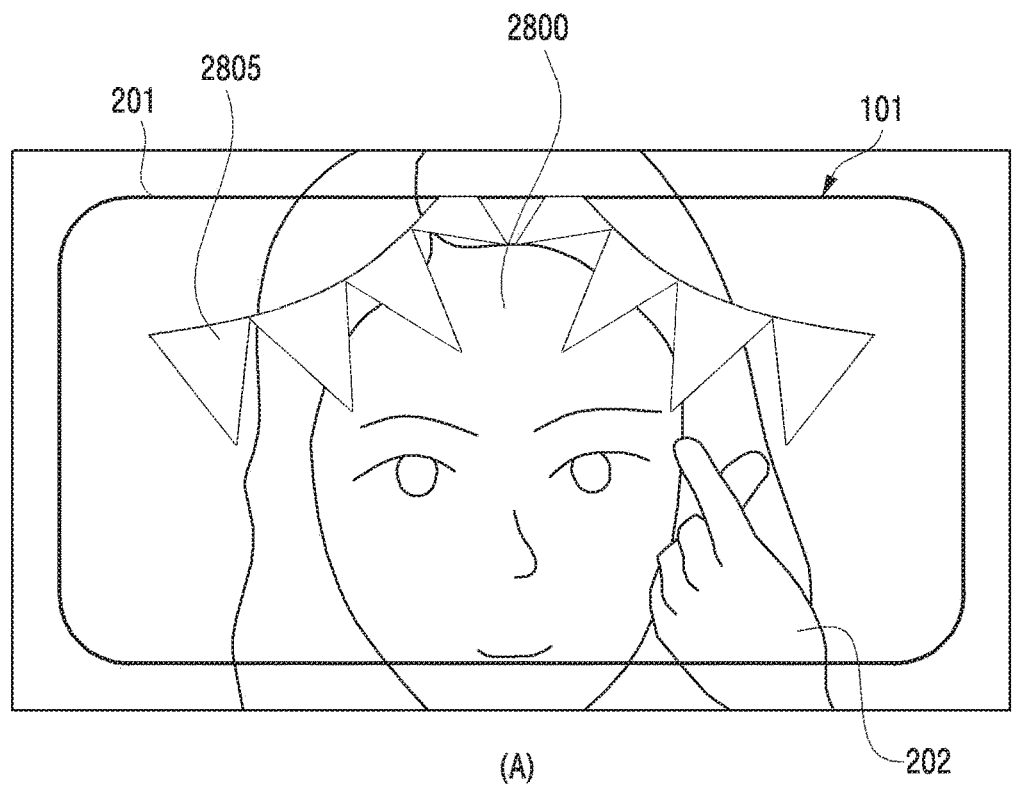
Figure 28C:
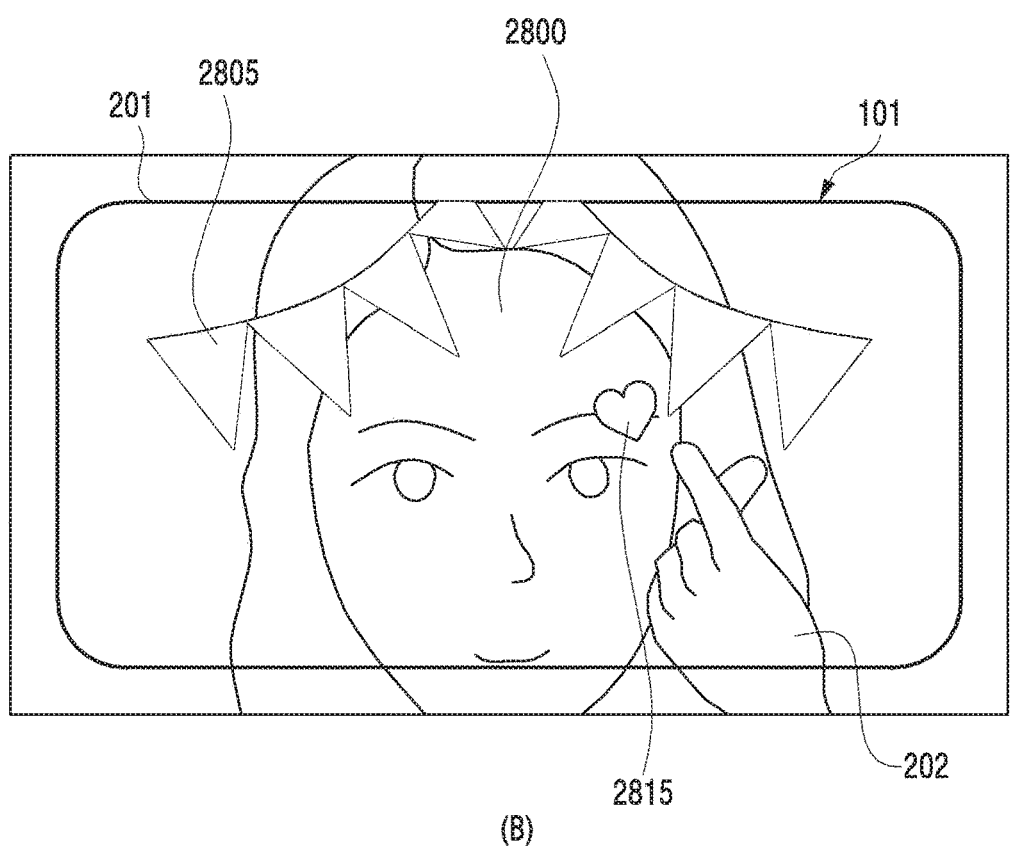

As another example, the processor 120 may determine first content 2805 such as a frame, in relation to an object 2700 of image data captured through the camera module 180 in FIG. 28A. The processor 120 may determine the frame according to a user input received through the input device 150 or the communication module 190, or may determine the frame in relation to the object 2800 by recognizing the object 2800 representing the face from the image data. Correspondingly, the processor 120 may display first content 2805, in relation to the object 2800 on the display 201 as shown in FIG. 28B. The processor 120 may display the frame at a preset position on the display 201, or may display the frame in a peripheral area of the face. Next, if identifying the movement of the external object 202 as shown in (a) of FIG. 28C, the processor 120 may display second content 2815 such as graphic animation, in relation to the external object 202 on the display 201 as shown in (b) of FIG. 28C. Thus, the processor 120 may store at least one of the first content 2805 or the second content 2815 together with the image data, according to a user input received through the input device 150 or the communication module 190.

The electronic device 101 may determine whether to remove the second content 2215, 2315, 2415, 2515, 2615, 2715, and 2815 in operation 2119. While displaying the second content 2215, 2315, 2415, 2515, 2615, 2715, and 2815 on the display 201, the processor 120 may continuously identify an additional movement of the external object 202 using the sensor module 176. Based on the additional movement of the external object 202, the processor 120 may determine whether to remove the second content 2215, 2315, 2415, 2515, 2615, 2715, and 2815. For example, the processor 120 may determine whether the external object 202 disappears (e.g., leaves the recognition range through the camera module 180 or the sensor module 176) through the display 201. As another example, the processor 120 may determine whether the additional movement of the external object 202 is a preset movement (e.g., clenching a fist, etc.). If determining to remove the second content 2215, 2315, 2415, 2515, 2615, 2715, and 2815 in operation 2119, the electronic device 101 may remove the second content 2215, 2315, 2415, 2515, 2615, 2715, and 2815 from display 201 in operation 2121.

An operating method of an electronic device 101 according to various embodiments, may include, providing first content using a display 201 of the electronic device 101, identifying a movement of an external object 202 in a visible direction of a user see-through or using the display 201 which provides the first content, using at least one sensor module 176, and providing second content to the user through at least part of the display 201 so as to display the second content related to the first content according to the movement in relation to the external object 202.

According to various embodiments, the second content may include control content for controlling the first content.

According to an embodiment, providing the first content may include providing the first content received from the external electronic device 206 through at least part of the display 201.

According to another embodiment, providing the first content may include, providing the first content related to an object recognized in a visible direction of the user see-through or using the display 201 through at least part of the display 201.

A non-transitory computer-readable storage medium according to various embodiments, may store one or more programs for providing first content using a display 201 of an electronic device 101, identifying a movement of an external object 202 in a visible direction of a user see-through or using the display 201 which provides the first content, and providing second content to the user through at least part of the display 201 so as to display the second content related to the first content according to the movement in relation to the external object 202.

According to various embodiments, in providing the augmented reality for the user, the electronic device 101 may provide a flexible interface between the electronic device 101 and the user. That is, the electronic device 101 may provide content received from the external electronic device 206 or the external server 208. In addition, the electronic device 101 may flexibly provide the content, based on the movement of the external device 202. Hence, the electronic device 101 may provide adequate content according to a user's situation. Therefore, user convenience of the electronic device 101 may be improved, and use efficiency of the electronic device 101 may be improved.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication circuitry;
a display;
at least one sensor; and
a processor,
wherein the processor is configured to:
control the display to display first content received from an external electronic device via the communication circuitry,
control the at least one sensor to identify a movement of an external object visible through the display,
based on an attribute of the external object, determine an attribute of second content related to the first content, the second content including at least one of moving image data or still image data, and
based on the determined attribute of the second content, control the display to display the second content related to the first content at a position in relation to the external object according to the movement.

2. The electronic device of claim 1, wherein the processor is further configured to:
identify a first movement which is set to select at least part of the first content from the movement, identify a second movement which is set to select the second content from the movement in relation to the external object, and based on the second movement, display the second content in relation to the external object.

3. The electronic device of claim 2, wherein the processor is further configured to:

based on the first movement, display guide content for guiding the second movement on at least part of the display which displays the first content.

4. The electronic device of claim 1, wherein the processor is further configured to:

control the at least one sensor to identify another movement of the external object or another external object visible through the display, and display the first content and the second content and control the second content on the display based at least on the another movement.

5. The electronic device of claim 4, wherein the processor is further configured to:

based at least on the control for the second content, control the first content.

6. An electronic device comprising:

a display;

at least one sensor; and a processor, wherein the processor is configured to:

control the display to display first content, control the at least one sensor to identify a movement of an external object visible through the display, based on an attribute of the external object, determine an attribute of second content related to the first content, the second content including at least one of moving image data or still image data, and based on the determined attribute of the second content, control the display to display the second content related to the first content at a position in relation to the external object according to the movement.

7. The electronic device of claim 6, wherein the second content comprises control content for controlling the first content.

8. The electronic device of claim 6, wherein the processor is further configured to:

control the at least one sensor to recognize an object visible through the display, and control the display to display the first content related to the object.

9. The electronic device of claim 6, wherein the processor is further configured to:

identify a first movement which is set to select at least part of the first content from the movement, identify a second movement which is set to display the second content from the movement in relation to the external object, and based on the second movement, control the display to display the second content related to at least part of the first content in relation to the external object.

10. The electronic device of claim 6, further comprising:

a camera, wherein the processor is further configured to:

control the camera to obtain an image, and wherein controlling the display to display the first content comprises displaying the first content based upon the image.

11. The electronic device of claim 10, wherein the processor is further configured to:

control the camera or the at least one sensor to identify a movement of the external object in a direction for acquiring the image.

12. The electronic device of claim 11, wherein the processor is further configured to:

identify a first movement which is set to select at least part of the first content from the movement, identify a second movement which is set to display the second content from the movement in relation to the external object, and based on the second movement, display the second content in relation to the external object.

13. The electronic device of claim 12, wherein the processor is further configured to:

based on the first movement, display guide content for guiding the second movement on at least part of the display which displays the first content.

14. The electronic device of claim 11, wherein the processor is further configured to:

identify another movement of the external object or another external object visible through the display, and display the first content and the second content and control the second content on the display based at least on the another movement.

15. The electronic device of claim 14, wherein the processor is further configured to:

based at least on the control for the second content, control the first content.

* * * * *